(12) United States Patent  
Iwai

(10) Patent No.: US 6,549,902 B1
(45) Date of Patent: Apr. 15, 2003

(54) DATABASE MANAGING DEVICE

(75) Inventor: Toshiyuki Iwai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 236 days.

(21) Appl. No.: 09/592,458

(22) Filed: Jun. 9, 2000

(30) Foreign Application Priority Data

Jun. 17, 1999  (JP) .......................................... 11-171681

(51) Int. Cl.[7] .............................................. G06F 17/30
(52) U.S. Cl. ...................................... 707/8; 707/500.1
(58) Field of Search .................. 707/8, 500.1; 709/229; 395/425

(56) References Cited

U.S. PATENT DOCUMENTS

| 5,157,777 | A | * | 10/1992 | Lai et al. ...................... 395/425 |
| 5,664,207 | A | | 9/1997 | Crumpler et al. ........... 395/766 |
| 5,710,922 | A | | 1/1998 | Alley et al. .................. 395/617 |
| 5,870,765 | A | | 2/1999 | Bauer et al. ................. 707/203 |
| 5,884,323 | A | | 3/1999 | Hawkins et al. ............. 707/201 |
| 5,926,816 | A | * | 7/1999 | Bauer et al. ..................... 707/8 |
| 6,324,581 | B1 | * | 11/2001 | Xu et al. ...................... 709/229 |

FOREIGN PATENT DOCUMENTS

| JP | 6693/1997 | 1/1997 |
| JP | 149308/1998 | 6/1998 |

OTHER PUBLICATIONS

"Personal Information Manager for Multimedia Power-PIMM" (M. Hiketa et al., Sharp Giho No. 68, pp. 36–38, Aug. 1998).

* cited by examiner

Primary Examiner—Safet Metjahic
Assistant Examiner—Nguyen Camlinh
(74) Attorney, Agent, or Firm—Nixon & Vanderhye P.C.

(57) ABSTRACT

An information processing device creates a dirty bit indicative of an update state for each combination of sharing bags between parties. A database processing section updates the dirty bit of a tip by monitoring any modification to the tip during a non-synchronous period. A synchronous process is carried out between two information processing devices, in which whether it is required to transfer the tip and transfer direction are decided after transfer of the dirty bit. Further, the dirty bit which relates to the synchronous process is updated and the update is transferred to the other dirty bit which corresponds to the tip. As a result, it is possible to reduce communication data volume and to find a coincidence in tips between three or more information processing devices, thereby realizing a database managing device which can reduce communication data volume in the synchronous process in a database system in which associating data can be independently updated by a plurality of devices.

29 Claims, 45 Drawing Sheets

|  |  | ADDITION BIT BI | |
|---|---|---|---|
|  |  | ON | OFF |
| DELETION BIT BO | ON | K | O |
|  | OFF | I | X |

F I G. 3 1

|  | MAINTAIN ||| UPDATE ||| OUTSIDE OF BAG || NO DIRTY BIT |
|  | STILL MAINTAIN | INSERT MAINTAIN | REMOVE MAINTAIN | STILL UPDATE | INSERT UPDATE | REMOVE UPDATE | NO EFFECT ||
|  | Xp | Ip | Op | Xm | Im | Om | K |  |
| CREATE TIP | — | — | — | — | — | — | — | Im |
| UPDATE TIP | Xm | Im | Om | Xm | Im | Om | K | — |
| DELETE TIP | Op | Op | Op | Om | Om | Om | K | — |
| INTO BAG | — | — | Ip | — | — | Im | Im | Im |
| OUT OF BAG | Op | Op | — | Om | Om | — | — | — |

| | | |
|---|---|---|
| MAINTAIN:p vs MAINTAIN:p | → | NO CONTENT UPDATE<br>MAINTAIN p |
| MAINTAIN:p vs UPDATE:m | → | CONTENT CONFORM<br>WITH UPDATE SIDE<br>MAINTAIN p |
| UPDATE:m vs UPDATE:m | → | COLLISION<br>MAINTAIN p |

SID
| MACHINE NUMBER MID | TIP NUMBER |

FIG. 64

| PROCESSED TIME | TIPS IN INFORMATION PROCESSING DEVICE 2a | | TRANSFER DIRECTION | TIPS IN INFORMATION PROCESSING DEVICE 2b | |
|---|---|---|---|---|---|
| | PROCESS | LAST UPDATED TIME | | LAST UPDATED TIME | |
| 1:00 | CREATE TIP | 1:00 | | — | CREATE TIP |
| 2:00 | SYNCHRONIZE | 1:00 | → | 1:00 | SYNCHRONIZE |
| 3:00 | TIP CORRECTION | 3:00 | | 1:00 | — |
| 4:00 | TIP CORRECTION | 4:00 | | 1:00 | — |
| 5:00 | SYNCHRONIZE | 4:00 | → | 4:00 | SYNCHRONIZE |
| 6:00 | — | 4:00 | | 4:00 | — |
| 7:00 | SYNCHRONIZE | 4:00 | × | 4:00 | SYNCHRONIZE |
| 8:00 | — | 4:00 | | 8:00 | TIP CORRECTION |
| 9:00 | SYNCHRONIZE | 8:00 | ← | 8:00 | SYNCHRONIZE |

FIG. 65

| PROCESSED TIME | TIPS IN INFORMATION PROCESSING DEVICE 2a | | TRANSFER DIRECTION | TIPS IN INFORMATION PROCESSING DEVICE 2b | |
|---|---|---|---|---|---|
| | PROCESS | LAST UPDATE PARTY | | LAST UPDATE PARTY | |
| 1:00 | CREATE TIP | 2a | | — | CREATE TIP |
| 2:00 | SYNCHRONIZE | 2a | → | 2a | SYNCHRONIZE |
| 3:00 | TIP CORRECTION | 2a | | 2a | — |
| 4:00 | TIP CORRECTION | 2a | | 2a | — |
| 5:00 | SYNCHRONIZE | 2a | → | 2a | SYNCHRONIZE |
| 6:00 | — | 2a | | 2a | — |
| 7:00 | SYNCHRONIZE | 2a | × | 2a | SYNCHRONIZE |
| 8:00 | — | 2a | | 2b | TIP CORRECTION |
| 9:00 | SYNCHRONIZE | 2b | ← | 2b | SYNCHRONIZE |

| PROCESSED TIME | TIPS IN INFORMATION PROCESSING DEVICE 2a | | TRANSFER DIRECTION | TIPS IN INFORMATION PROCESSING DEVICE 2b | |
|---|---|---|---|---|---|
| | PROCESS | UPDATE ID | | UPDATE ID | |
| 1:00 | CREATE TIP | 0 (2a) | | — | CREATE TIP |
| 2:00 | SYNCHRONIZE | 0 (2a) | → | 0 (2a) | SYNCHRONIZE |
| 3:00 | TIP CORRECTION | 1 (2a) | | 1 (2a) | — |
| 4:00 | TIP CORRECTION | 2 (2a) | | 1 (2a) | — |
| 5:00 | SYNCHRONIZE | 2 (2a) | → | 2 (2a) | SYNCHRONIZE |
| 6:00 | — | 2 (2a) | | 2 (2a) | — |
| 7:00 | SYNCHRONIZE | 2 (2a) | × | 2 (2a) | SYNCHRONIZE |
| 8:00 | — | 2 (2a) | | 3 (2b) | TIP CORRECTION |
| 9:00 | SYNCHRONIZE | 3 (2b) | ← | 3 (2b) | SYNCHRONIZE |

| $T_{1a}$ | MODIFICATION | SYNCHRONOUS PROCESS | TO OUTSIDE | TO INSIDE |
|---|---|---|---|---|
| | $D_{1ab}$ | X | 0 | 1 |
| LAST UPDATE DATE JAN. 1 | MOVED NUMBER | 0 | 1 | 2 |

| $T_{1b}$ | MODIFICATION | SYNCHRONOUS PROCESS | TO OUTSIDE | TO INSIDE | TO OUTSIDE | TO INSIDE | TO INSIDE |
|---|---|---|---|---|---|---|---|
| | $D_{1ba}$ | X | 0 | 1 | 0 | 1 | 0 |
| LAST UPDATE DATE FEB. 16 | MOVED NUMBER | 0 | 1 | 2 | 3 | 4 | 5 |

DATABASE MANAGING DEVICE

FIELD OF THE INVENTION

The present invention relates to a database managing device for creating the same contents between parties which are ready to communicate, and particularly to a database managing device capable of reducing the volume of data transmitted or processed during a synchronous process, and the invention also relates to a recording medium recording a program of such a database managing device.

BACKGROUND OF THE INVENTION

Conventionally, information processing devices have been in wide use, and it is not rare in recent years for one individual to own a plurality of information processing devices, for example, such as a high-performance information processing device like a desk-top personal computer and a portable information processing device like a portable information terminal. When personal information, for example, such as schedules and address book are to be managed by these plurality of information processing devices, there is need to maintain the same contents of data in any of databases provided in these information processing devices. Thus, in the case of managing, for example, personal information between a personal computer and a portable information terminal, a master database is managed by the personal computer and the data of the master database are copied to the database (portable database) of the portable information processing device, thus carrying the personal information.

In this manner, in managing the same data between a plurality of database managing devices, when data is changed in one database managing device, it is required to update the database of all the other database managing devices. Here, if each database managing device is in communications all the time, the change in data is immediately reflected in each one of these devices when the updated database managing device informs the other database managing devices that the data has been changed. However, it is not always the case that each database managing device is in communications all the time with the other devices, for example, as in the case where the database managing device is a portable information terminal. In such a case, a change in data in one device is not reflected in the databases of the other database managing devices at the time when the change is made. Thus, in order to maintain the same database, it is required to carry out a process for creating the same contents in database between parties at the time when communications are engaged between the database managing devices; namely, a synchronous process is required.

In the case of the above example, when data is changed in the portable information terminal, a synchronous process is carried out at the time when the portable information terminal is brought back to home or office, in which time data become the same between the portable database of the portable information terminal and the master database of the computer.

As an example of a conventional synchronous process, upload and download are known. Specifically, when data are changed in the personal computer, the contents of the master database are copied to the portable information terminal (download). On the other hand, when data are changed in the portable information terminal, the contents of the portable database are copied to the personal computer (upload).

Another conventional example is a synchronous process employing a sum of sets. In this synchronous process, the contents of both databases are compared at the time when communications are engaged between the two database managing devices, and a sum of sets, which contains all the information added to each database is created as a new database. Thereafter, the database thus created is stored in the both database managing devices.

For example, when the both databases initially contain data "A", and data "B" is added to one database managing device X, and data "C" is added to the other database managing device Y, the database managing device X sends its contents "A+B" to the database managing device Y. The database managing device Y creates a sum of sets "A+B+C" from the data "A+B" received and its contents "A+C" and stores the sum of sets as a database. The database managing device Y then sends the contents of the database "A+B+C" back to the database managing device X. As a result, the contents of the database of the database managing device X are updated to "A+B+C", which are the same as that of the database managing device Y.

However, the conventional database managing device carrying out the described synchronous process has the problem of extremely large data volume (communications volume) transmitted between the database managing devices in the synchronous process and extremely large data volume computed in each database managing device.

Specifically, in download and upload, all the contents of one database are transmitted to the other database managing device regardless of the number of data updated. For example, in the case of a database having the data of 1000 items, the data of all the 1000 items are sent even when only one item is changed. As a result, the communications volume transmitted between the database managing devices is increased. Further, the contents of the database of the database managing device of the receiving end are replaced with the database of the sending end, and thus a change in data on the receiving end is lost.

Also, in the synchronous process employing a sum of sets, in order to create a sum of sets, a database of one party is sent to the other database, and the sum of sets created is sent back as a new database. Thus, in this synchronous process, all the contents of the database are required to be sent back and forth between the database managing devices, which further increases the communications volume in the synchronous process.

Further, in the case where data is deleted only in one of the devices, the data remain in the other device. Thus, the data is included again in a new database and it is not deleted. As a result, the memory space required for storing the database is increased, and the communications volume in the synchronous process is further increased.

In order to solve these problems, another example of the synchronous process is disclosed, for example, in Japanese Unexamined Patent Publication No. 6693/1997 (Tokukaihei 9-6693) (Published Date: Jan. 10, 1997), in which update information indicative of a change or no change in data is given to each data contained in the database. Specifically, each database managing device stores, per each data stored in the database, ID information for identifying the data and update information indicative of no change/correction/addition/deletion, and when data is changed, the update information corresponding to this data is updated. In the synchronous process, ID information and update information of all data are transferred between database managing devices. The database managing device of the receiving end searches through its database data associating with the data changed in the device of the sending end based on the ID information received and compares the update information of the both parties. When data is changed only in one party, unchanged data is replaced with the data changed. When data are changed in the both parties, the data of one party is added to the database of the other party, and vice versa. In this way, in the case where data are not changed in any of the database managing devices, sending of data can be omitted, thus reducing the communications volume in the synchronous process.

However, even with the above arrangement, it is still required to transmit the ID information and update information with respect to the entire database. Further, when change is made in the both parties, the data changed in one party needs to be added to the database of the other party. Thus, the communications volume in the synchronous process is still not reduced to a sufficient level. Further, when data are changed in the both parties, the number of data in the databases is increased, which in turn increases the required memory space for storing the database, and this may result in increase in communications volume in the synchronous process.

SUMMARY OF THE INVENTION

The present invention was accomplished in the light of the foregoing problems and it is an object of the present invention to provide a database managing device which requires a less memory space required for storing presence or absence of change, and which is capable of further reducing the data volume transferred and processed during a synchronous process, and also to realize a recording medium storing a program of such a database managing device.

In order to achieve the foregoing object, a database managing device in accordance with the present invention includes: a sharing region associating section for associating a second sharing region of a second database stored in each of a plurality of other database managing devices with a first sharing region of a first database stored in the database managing device; a state information storing section for storing state information indicative of an update state of first data in the non-synchronous period per each combination of the first sharing region and the second sharing region of one of the other database managing devices; and a synchronize processing section for carrying out a synchronous process between the first sharing region and the second sharing region of one of the other database managing devices one at a time based on the state information associated with the first sharing region and the second sharing region so as to find a coincidence of the two sharing regions and for updating the state information relating to the second sharing region and transferring the updated state information to state information associated with other second sharing regions.

With this arrangement, different state information is provided for each of the second databases, and a change in one state information is transferred to other state information, making it possible to carry out the synchronous process among three or more database managing devices even though the synchronous process based on state information is performed only between two database managing devices.

Further, by repeating the synchronous process for each different combination, data can be matched for each combination and the state information is transferred subsequently. Thus, unlike the client/server system, it is not required at all to associate all database managing devices with a specific database managing device (server). As a result, when constructing a database system from database managing devices, less restriction of is imposed on the database system with regard to data association.

Further, associating data are placed in the first sharing region, and data are associated with each other in the unit of sharing regions. Also, the synchronous process is carried out based on the state information. Thus, compared with the synchronous process in which associations are made per data or first and second data are exchanged, data volume transferred between the database managing devices in the synchronous process can be reduced.

Further, in order to achieve the foregoing object, the database managing device in accordance with the present invention includes: a data managing number storing section for storing a data managing number which corresponds to each data contained in the first sharing region; and a data managing number setting section for setting the data managing number, the data managing number setting section setting a data managing number for a combination of a database managing number having a value different from that of any of the other database managing devices and a data number having a different value from that of any other data contained at least in the first sharing region with respect to data newly added in the first sharing region by a process other than the synchronous process, and, with respect to data which was added in the synchronous process, the data managing number setting section setting a data managing number which has already been given to the newly added data in the other database managing device, wherein the synchronize processing section specifies the associating data between the databases based on the data managing number.

With this arrangement, the state information indicative of an update state in a non-synchronous period is stored with respect to the first data contained in the first sharing region even once in the non-synchronous period. Thus, even when the first data was moved in and out of the first sharing region during the non-synchronous period, presence or absence of update can be identified by referring to the state information, making it possible to omit transfer of data which was not updated. Further, since the data managing number storing section and data managing number setting section are provided, a distinct data managing number can be provided regardless of whether the database managing device is in communication with the other database managing device, and the synchronize processing section can identify any association of data with ease by referring to the data managing number. Further, associating data are placed in the first sharing region and data are associated with each other in the unit of sharing regions, and the synchronous process is carried out based on the state information. As a result, it is possible to reduce transferred data volume between database managing devices in the synchronous process.

Further, in order to achieve the foregoing object, the database managing device in accordance with the present invention includes: a moved time storing section or moved number storing section for storing last moved time or last moved number with respect to data which was moved in and out of the first sub-set, and the synchronize processing section decides whether to place other associating data in their respective sub-sets in accordance with more recent last updated time or greater moved number when finding a coincidence between the first sub-set and the second sub-set.

With this arrangement, data are associated with each other in a unit of sub-sets, and when associating data are moved in and out of each sub-set, the data are placed either inside or outside of each sub-set. Thus, even when the synchronous process is carried out after data are moved in and out of the sub-set, increase in number of data can be reduced, thus reducing transferred data volume during the synchronous process.

Further, in order to achieve the foregoing object, the database managing device in accordance with the present invention includes: a state information storing section for storing state information indicative of an update state of the first data in the first sharing region per each combination of the first sharing region and the sharing region (second sharing region) of the other database managing device, and when carrying out the synchronous process to find a coincidence between the first and second sharing regions, the synchronize processing section confirms presence or absence of any update by sending and receiving the state information, and when update is made in a plurality of sharing regions, judges whether the data are the same and decides whether to replace remaining of the associating data with data contents of which party.

With this arrangement, when data are updated in a plurality of sharing regions, after judging whether the data are the same, priority data is selected out from the associating data and remaining data (non-priority data) is replaced with the contents of the priority data. Thus, compared with the case where data are all added as separate data to each database, increase in number of data can be prevented and transferred data volume during the synchronous process can be reduced.

For a fuller understanding of the nature and advantages of the invention, reference should be made to the ensuing detailed description taken in conjunction with the accompanying drawings.

BRIEF DESCRIPTION OF THE DRAWINGS

FIG. 31 is an explanatory drawing showing changes in dirty bit in accordance with various operations in a non-synchronous period in the database system.

FIG. 64 is an explanatory drawing showing a process and transfer direction of tips when the database system employs last updated time as a reference for matching judgment.

FIG. 65 is an explanatory drawing showing a process and transfer direction of tips when the database system employs last update party as a reference for matching judgment.

DESCRIPTION OF THE EMBODIMENTS

First Embodiment

The following will describe one embodiment of the present invention referring to FIG. 1 through FIG. 50. Namely, a database system in accordance with the present embodiment is a system which is suitably adopted when there is need to maintain the same contents in associating data between a plurality of databases, each of which can update its data independently, whose communications time is limited, for example, as in the case where personal information is managed by a plurality of database managing devices. The system structure may vary, and in the present embodiment, explanations will be given through the case where the system is composed of portable information terminals; namely, a database system which is composed of equivalent database managing devices.

Figure 2:
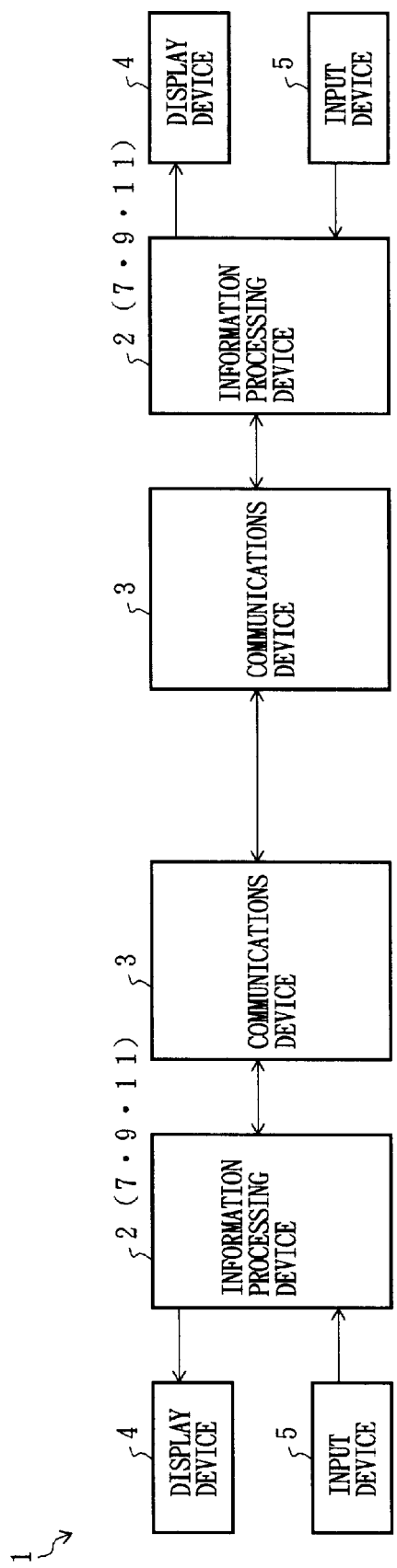
FIG. 2 is a block diagram showing an example of a database system structured from the information processing device.

Specifically, for example, as shown in FIG. 2, a database system 1 in accordance with the present embodiment includes information processing devices (database managing devices) 2 for storing databases, and each information processing device 2 is connected to a communications device (communications means) 3 for communicating with the other information processing device 2, and to a display device 4 and an input device 5 for performing input and output processes with the user.

The communications device 3, for example, is an interface such as a LAN interface or an RS232C interface, a modem, an IR ray transmitter, or a radio wave transmitter, and can communicate with the other communications device 3 via at least one of various communications media, such as a cable, a public telephone line network, an IR ray, and a radio wave in accordance with an instruction from the information processing device 2. The display device 4, for example, is a CRT display or a liquid crystal display, and can display various information such as database contents of the information processing device 2 and the results of operation on the database, in accordance with an instruction from the information processing device 2. The input device 5, for example, is a keyboard, a mouse, a pen, or a touch panel provided on the display device 4, though which user's instructions are inputted to the information processing device 2.

Figure 1:
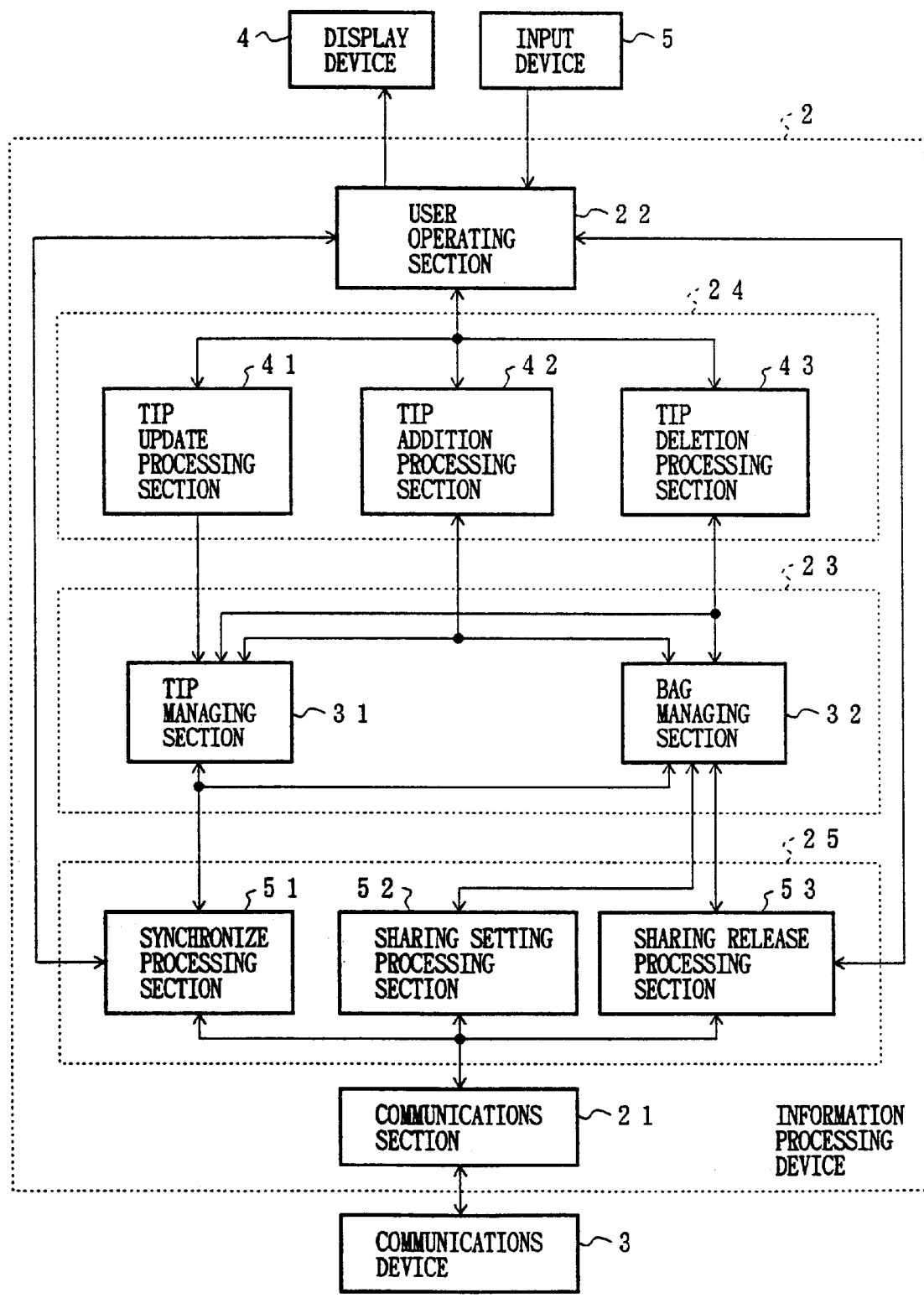
FIG. 1 is a block diagram showing a main component of an information processing device in accordance with one embodiment of the present invention.

As shown in FIG. 1, the information processing device 2 in accordance with the present embodiment includes a communications section 21, connected to the communications device 3, for communicating with the other information processing device 2 via the communications device 3, a user operating section 22, connected to the display device 4 and the input device 5, constituting a user interface, a database managing section 23 storing a database DB, a database processing section 24 for controlling the database managing section 23 in accordance with an instruction from the user operating section 22, and a synchronizing section 25 for controlling the communications section 21 and the database managing section 23 so as to perform a process associated with synchronization with the other database DB. Note that, the database managing section 23 corresponds to the first database and state information storing means of the claims.

Figure 3:
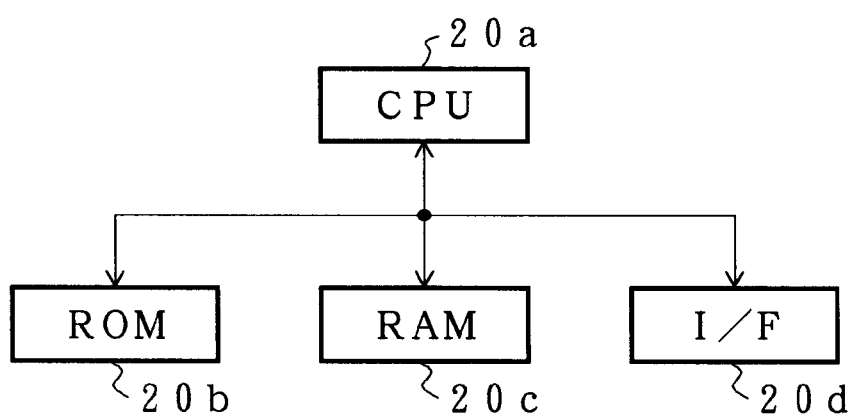
FIG. 3 is a block diagram showing one example of a hardware structure of the information processing device.

These members may be realized by hardware, or by functional blocks which are realized by execution of a predetermined program stored in a ROM 20b or RAM 20c by a CPU 20a as shown in FIG. 3. The latter is easier because it can realize the above members by providing a recording medium storing the predetermined program and only by running the recording medium on a computer which can read such a recording medium. Note that, I/F 20d is an interface for connecting the CPU 20a and the communications device as shown in FIG. 1.

The recording medium may be a memory, for example, such as a RAM or ROM, or, alternatively, when a program reading device is to be connected as an external memory device of the computer, program media which can be read out by the program reading device. The program media may be, for example, tapes such as a magnetic tape and cassette tape, magnetic disks such as a floppy disk and hard disk, or disks such as a CD-ROM, magneto-optical disk (MO), minidisk (MD), and digital video disk (DVD). Alternatively, the program media may be cards such as IC card and optical card, or semiconductor memory such as a mask ROM, EPROM, EEPROM, or flash memory. Note that, as long as the recording medium is computer readable, it may be rewritable (writable) or may store a program permanently.

Further, a program may be downloaded from a connected communication network such as the Internet. Alternatively, a program may be recorded or downloaded in the form of data which can be reconstructed into a program. The information processing device 2 in accordance with the present embodiment, as shown in FIG. 2, communicates with the other information processing device 2 via communications device 3, and thus the communications device 3 can also be used with relative ease as an element for communicating with the communication network. Note that, here, a downloaded program is preferably stored in the information processing device 2 in advance, or preferably installed from a recording (communication) medium other than the medium used in downloading.

Figure 4:
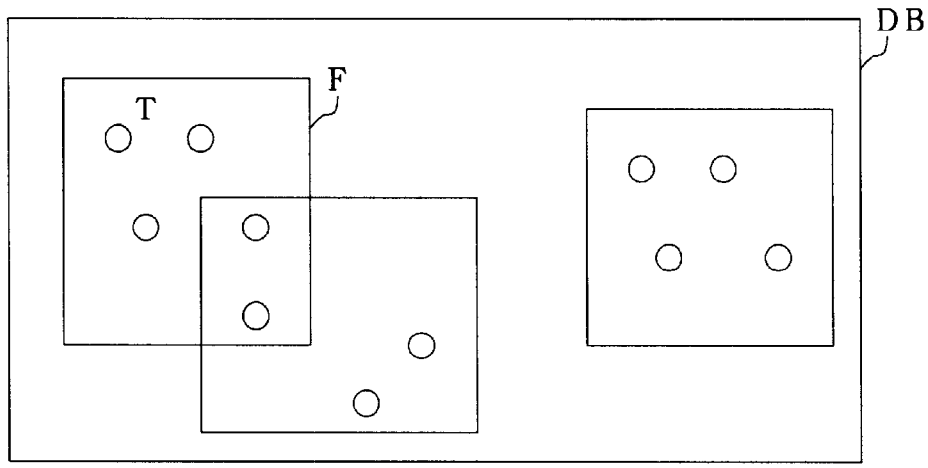
FIG. 4 is an explanatory drawing showing a relationship between a tip indicative of single data and a bag which is a set of tips in the information processing device.

In the present embodiment, as shown in FIG. 4, the database DB is managed in the unit of a tip T, indicative of single data, and a bag F, which is a set of tips T, and the database managing section 23 includes a tip managing section 31 and a bag managing section (subset setting means) 32 for storing a database. The database processing section 24 includes a tip update processing section 41, a tip addition processing section 42, and a tip deletion processing section 43 for updating, adding, and deleting tips T, respectively. Note that, the database processing section 24 also includes elements associated with other operations of the database DB, for example, such as searching and displaying of tips T and changing of a relationship of inclusion between tips T and bags F, which allows a tip T satisfying desired conditions, such as a tip T with predetermined contents to be searched to generate a bag F, or a desired tip T to be selected from displayed tips T for insertion into a desired bag F.

The synchronizing section 25 includes a synchronize processing section 51 for carrying out a synchronous process of tips T, a sharing setting processing section 52 (sharing region associating means and sub-set associating means) for carrying out sharing setting (mentioned later) prior to the synchronous process, and a sharing release processing section 53 for releasing the sharing setting, for example, when the synchronous process is no longer required. Note that, the structures of the database processing section 24 and the synchronizing section 25 are closely associated with the data stored in the database managing section 23, and they are characterized by operations in accordance with the stored data in the database managing section 23. Thus, the following explanations only deal with the structure of the database managing section 23, and the structures of the database processing section 24 and the synchronizing section 25 will be described in relation to their operations.

Figure 5:
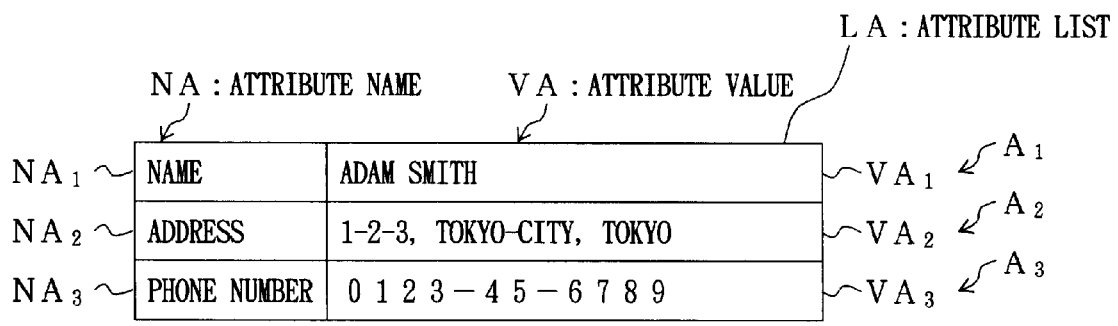
FIG. 5 is an explanatory drawing showing how the tips are stored in the information processing device.

Specifically, the tip managing section 31 manages single data with a data structure called a "tip". Each tip T includes a tip ID for distinguishing itself from the other tips T in the database DB, and an attribute list LA storing single data. As shown in FIG. 5, the attribute list LA stores a list in combination of attribute name NA indicative of a type of attribute A and attribute value VA indicative of a value of attribute A within the data stored in the tip T.

Taking the case of storing addresses in the database DB as an example, each tip T corresponds to single address data. When the address data is to be composed of three kinds of data, indicative of name, address, and phone number, each tip T is defined as a set of three attributes $A_1$ through $A_3$ of the name, address, and phone number, and the attribute list LA of the tip T is represented by a list as shown in FIG. 5, in which combinations of attribute name NA and attribute value VA are listed in order. For example, the attribute list LA of a first tip stores, as attribute $A_1$, a combination of attribute $NA_1$ "Name" and attribute value $VA_1$ "Adam Smith". In the same manner, a combination of "Address" and "1-2-3, Tokyo City, Tokyo", and a combination of "Phone Number" and "0123-45-6789" are stored in the attribute list LA.

Figure 6:
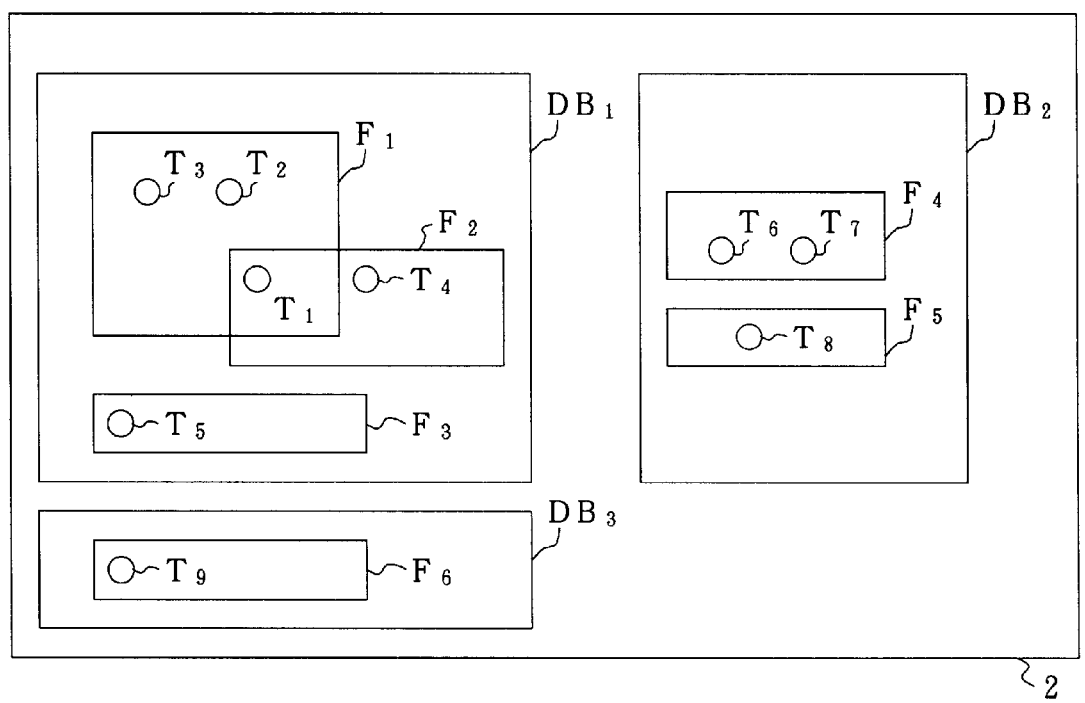
FIG. 6 is an explanatory drawing showing a relationship between tips, bags, and a database in the information processing device.
Figure 7:
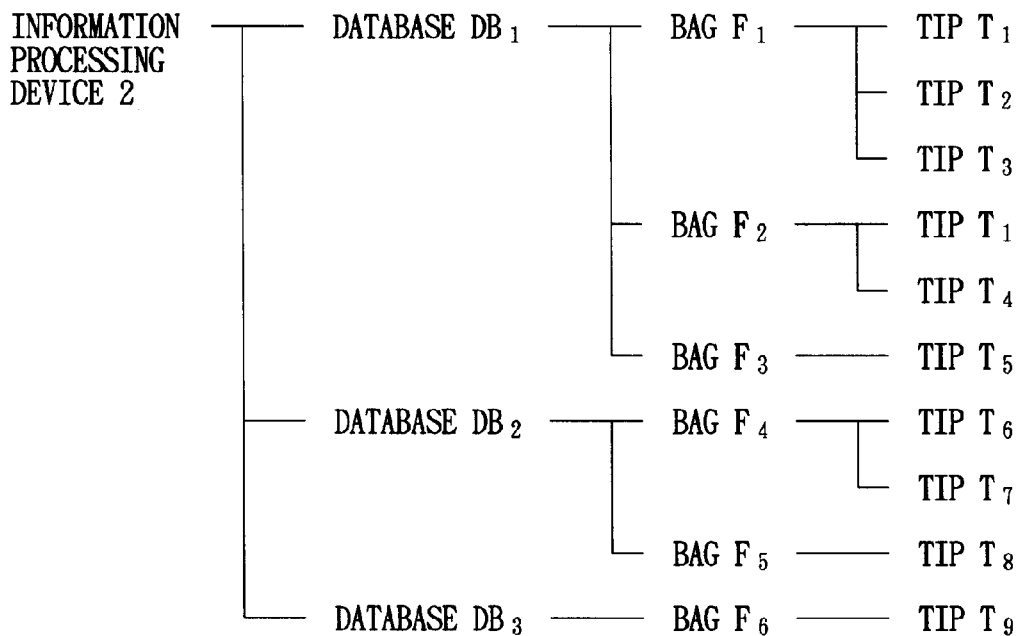
FIG. 7 is an explanatory drawing of a tree structure composed of tips, bags, and databases, showing how the tips are stored.

The bag managing section 32 stores bags F contained in the database DB and a relationship of inclusion between each tip T and bags F. As shown in FIG. 6, for example, in the case where a single information processing device 2 contains a plurality of databases $DB_1$, $DB_2$, and $DB_3$, the relationship of information processing device 2 ∋ database DB ∋ bag F ∋ tip T is established. The bag managing section 32 stores this relationship in the form of a tree structure S as shown in FIG. 7.

Figure 8:
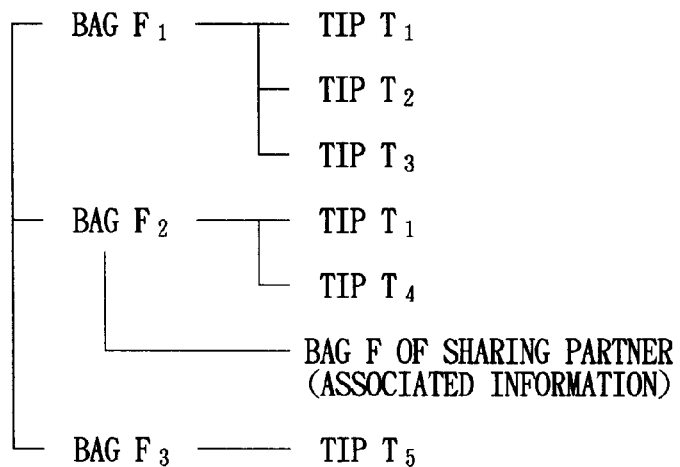
FIG. 8 is an explanatory drawing showing one example of a data structure managed by a bag managing section of the information processing device.

In the tree structure S1, a tip T may be contained in a single bag ($F_1$) as shown by $T_2$, or in a plurality of bags ($F_1$ and $F_2$) as shown by tip $T_1$. Thus, tip $T_1$ contained in a plurality of bags $F_1$ and $F_2$ can be represented as shown in FIG. 6. In the present embodiment, as will be mentioned later, each bag F can be associated with a plurality of bags F. Thus, as shown in FIG. 8, the tree structure S1 includes information of a sharing partner and its associated information for each bag F being shared (sharing bag SF).

Note that, as long as the tree structure S1 is stored, the tree structure S may be stored entirely, or it may be stored in the form of a plurality of lists by dividing it into a number of lists including a list of databases DB contained in the information processing device 2, a list of bags F of each database DB, and a list of tips T of each bag F. In the present embodiment, as with the tip T, an ID is also given to each information processing device 2, database DB, and bag F to distinguish them from each other, and thus the lists of information processing device 2, database DB, and bag F are stored as the lists of IDs.

Figure 9:
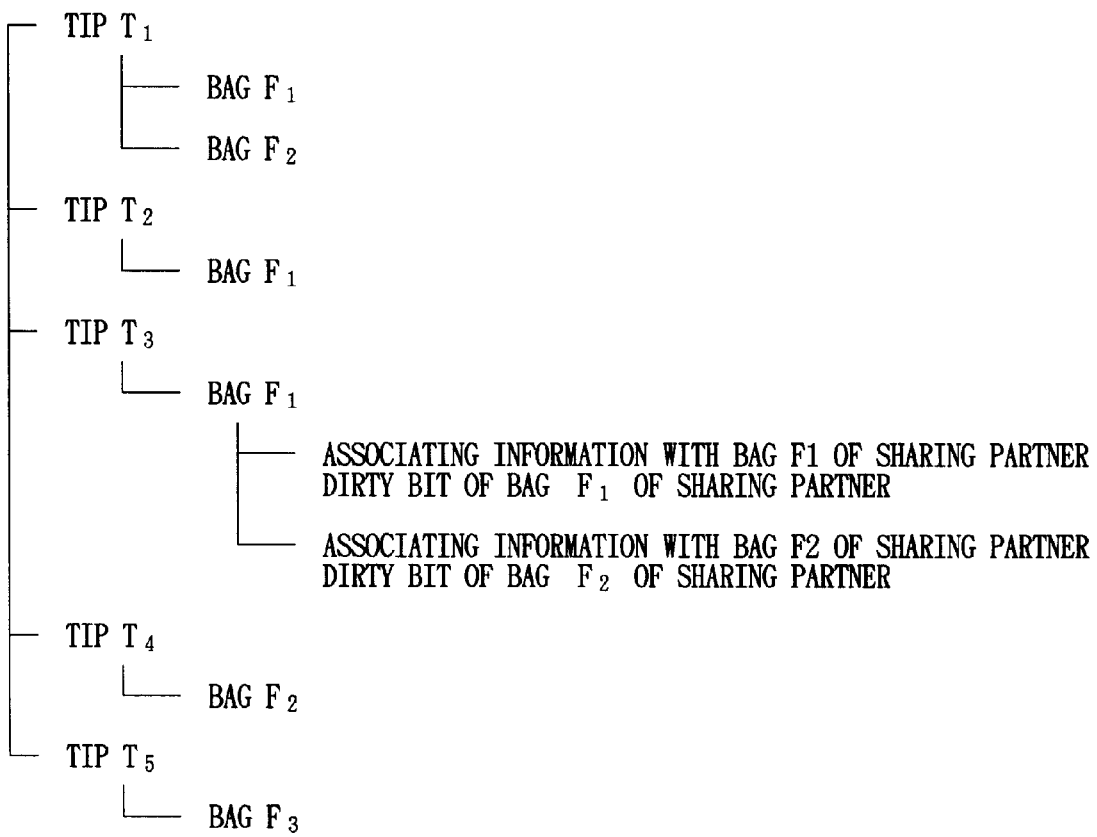
FIG. 9 is an explanatory drawing showing one example of a data structure managed by a tip managing section of the information processing deice.

Note that, a tip T of a certain bag F can be found immediately by trailing the tree structure S1 from the information processing device 2 to the databases DB in this order. However, to find bags F containing a certain tip T makes the worst case where the entire tree structure S1 needs to be searched. Thus, to save search time, as shown in FIG. 9, the tip managing section 31 in accordance with the present embodiment includes, in addition to the tree structure S1, a tree structure S2 which includes bags F for each tip T contained therein, as well as dirty bits (described later) or associating information, etc. The dirty bit is provided for each combination of sharing bags SF between parties, and thus the tree structure S2 includes dirty bits or associating information, etc., for each combination of the sharing bags SF.

Figure 10:
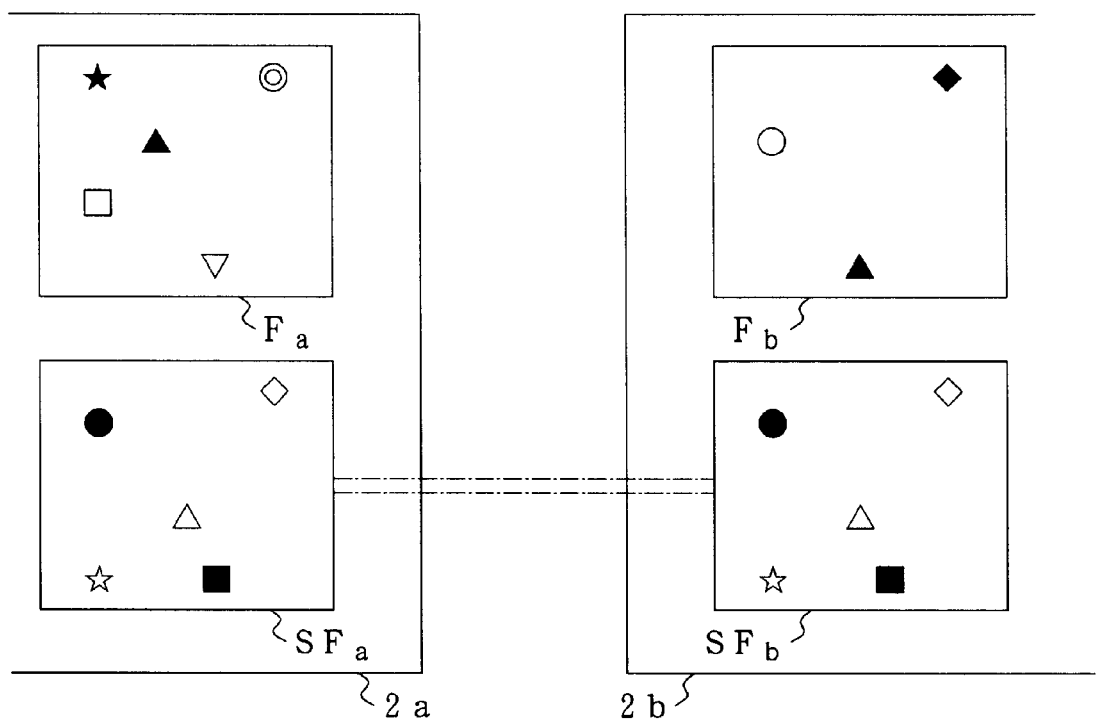
FIG. 10 is an explanatory drawing showing a relationship between a sharing bag as a sharing region of the information processing device and a sharing bag of another information processing device in the database system.

In the database system 1 in accordance with the present embodiment, as shown in FIG. 10, a region (sharing region) to be subjected to the synchronous process is determined in the unit of a bag F, and whether or not a tip T is to be shared between databases DB is determined by whether the tip T belongs to a bag (sharing bag SF) for which sharing has been set beforehand.

As a rule, an access to other information processing device 2 via a device such as the communications device 3 is considerably slow as compared with the case where an access is made internally within the information processing device 2, and for this reason the time required for the synchronous process tends to be long, raising need to reduce time required for the synchronous process and a volume of data transferred between the information processing devices 2. Note that, an internal access within the information processing device 2 is relatively fast, and thus there is no large increase in processing time even when a processed volume in a period (non-synchronous period) between a previous synchronous process and a next synchronous process is increased.

In order to reduce data volume, the bag managing section 32 in accordance with the present embodiment stores a dirty bit list LD composed of dirty bits D, each indicative of a state of each tip T in a non-synchronous period. The dirty bit list LD is managed such that the order of dirty bits D in one information processing device 2 is the same between associating tips T as that of the dirty bits D in the other information processing device 2, and as will be described later, the dirty bit list LD also indicates associations of tips T. The bag managing section 32 also stores sink limit Lim indicative of the number of tips T which were associated in the previous synchronous process, making it possible to judge whether tips T corresponding to the dirty bits D have already been associated with the tips T of the sharing bag SF of the other information processing device 2.

Figure 11:
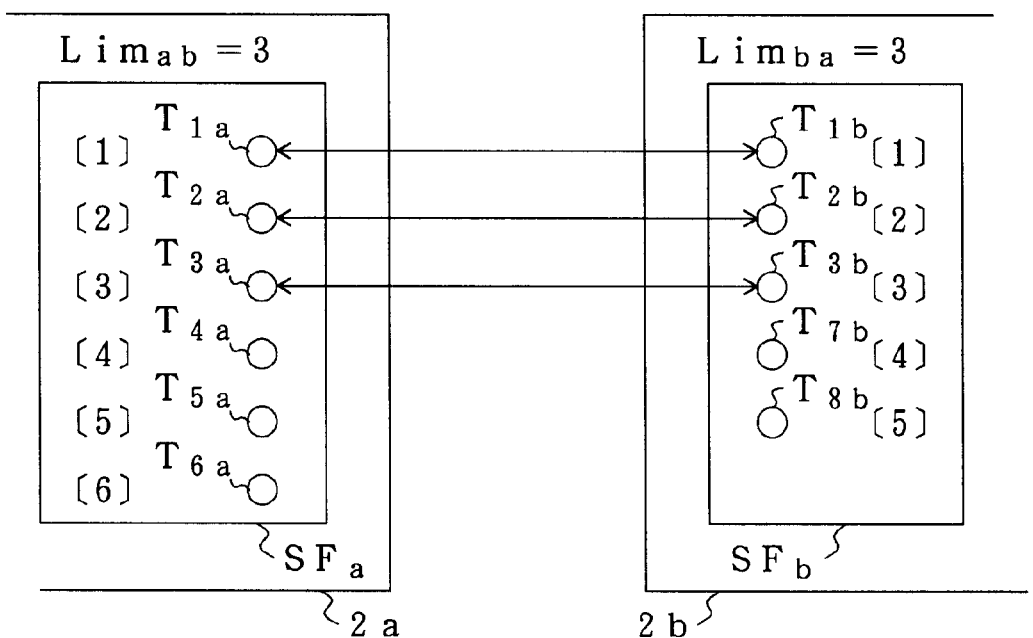
FIG. 11 is an explanatory drawing showing associations of tips and how the associations are stored in the database system.
Figures 12, 13:
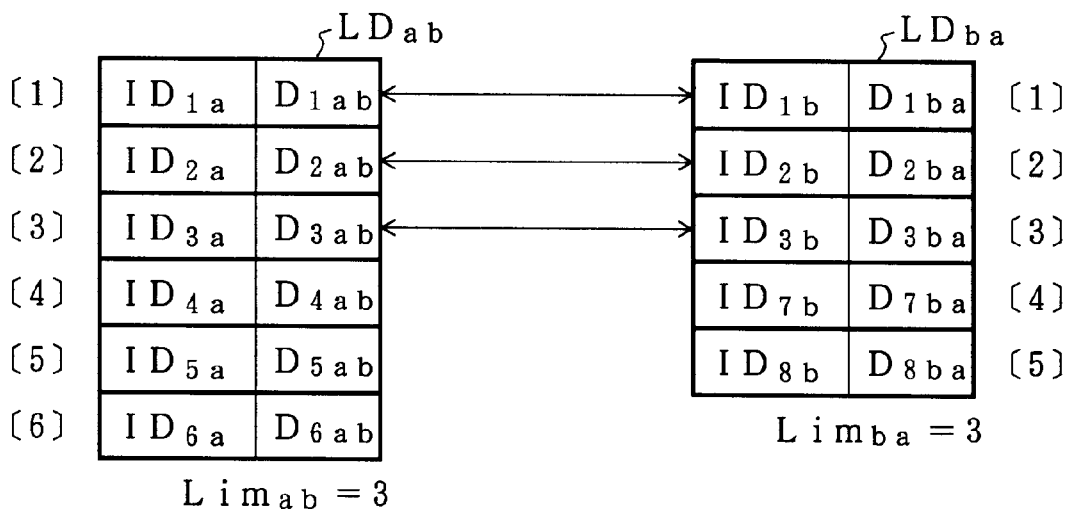
FIG. 12 is an explanatory drawing showing a dirty bit list stored in each information processing device in the database system.
FIG. 13 is an explanatory drawing showing how a movement parameter of a dirty bit making up the dirty bit list is stored.

For example, as shown in FIG. 11, in the case where three tips T ($T_{1a}$ through $T_{3a}$ and $T_{1b}$ through $T_{3b}$) are associated with each other between the sharing bags $SF_a$ and $SF_b$, "3" is stored as a sink limit Lim in each of the information processing devices 2a and 2b. Also, as shown in FIG. 12, a dirty bit list $LD_{ab}$ of the information processing device 2a stores dirty bits $D_{1ab}$ through $D_{6ab}$ corresponding to tips $T_{1ab}$ through $T_{6ab}$ in this order. Similarly, a dirty bit list $LD_{ba}$ of the information processing device 2b stores dirty bits $D_{1ba}$ through $D_{3ba}$ corresponding to tips $T_{1b}$ through $T_{3b}$ in this order, and also dirty bits $D_{7ba}$ and $D_{8ba}$ corresponding to tips $T_{7b}$ and $T_{8b}$ in this order. In this case, because the sink limit Lim is "3", tips $T_{4a}$ through $T_{6a}$ and tips $T_{7b}$ and $T_{8b}$, with their dirty bits D being stored after the third position of the lists are not associated with the tips T of the sharing bag SF of the other party. Note that, FIG. 12 only shows one example of how the dirty bit list LD is stored, in which a combination of a dirty bit D and a corresponding tip ID is stored in succession.

Note that, in the following, for convenience of explanation, the position of a dirty bit D in the dirty bit list LD will be referred to as a sink tag and represented by a number in bracket [ ]. Also, a dirty bit D corresponding to a tip T will be represented by the same subscript as that of the corresponding tip T together with a subscript indicative of a sharing partner, for example, as in dirty bit $D_{1ab}$ corresponding to $tip_{1a}$. Further, information stored in the information processing device 2a will be represented by subscript "a", as in tip $T_{1a}$, so as to distinguish it from information stored in the information processing device 2b, to which subscript "b" is given. Note that, when there is no need to indicate any correspondence of information, or when referring to information in general, subscripts are omitted.

The dirty bits D are created, corresponding one to one to the tips T which have existed in the sharing bags SF even once during a non-synchronous period, and each dirty bit D includes an update parameter indicative of whether associating tips T have been updated during a non-synchronous period, and a movement parameter indicative of whether the tips T have been moved in and out of the sharing bags SF during a non-synchronous period. The update parameter takes the value of either "m", which indicates update, or "p", which indicates maintain. The movement parameter takes the value of either "X", which indicates still, or "I", which indicates insert, or "O", which indicates remove. More specifically, "X", indicates that the tip T has been existing in the sharing bag SF since the last synchronous process, and "I" indicates that the tip T has been inserted or re-inserted into the sharing bag SF since the last synchronous process, and "O" indicates that the tip T has been removed or inserted once but later removed from the sharing bag SF since the last synchronous process. The movement parameter, for example, as shown in FIG. 13, is stored as a combination of an addition bit BI, which indicates that a tip T has been added to the sharing bag SF, and a deletion bit BO, which indicates that a tip T has been deleted from the sharing bag SF. Also, when it is no longer required to monitor the state of a tip T in subsequent processes, for example, as in the case where a tip T is judged to exist outside of the sharing bag SF as a result of the synchronous process, the addition bit BI and the deletion bit BO are both set to ON state. In the following, this state will be referred to as No Effect "K", regardless of the value of the update parameter. Thus, a tip T can take seven states which can be identified from the dirty bit D: Still Maintain "Xp", Still Update "Xm", Insert Maintain "Ip", Insert Update "Im", Remove Maintain "Op", Remove Update "Om", and No Effect "K".

Incidentally, a non-synchronous period is generally different for each sharing between different sharing bags SF even when the sharing bag SF of one party is the same in each sharing. Thus, in the present embodiment, the dirty bit list LD and sink limit Lim are provided for each combination (pair) of sharing bags SF between parties.

Figures 14, 15:
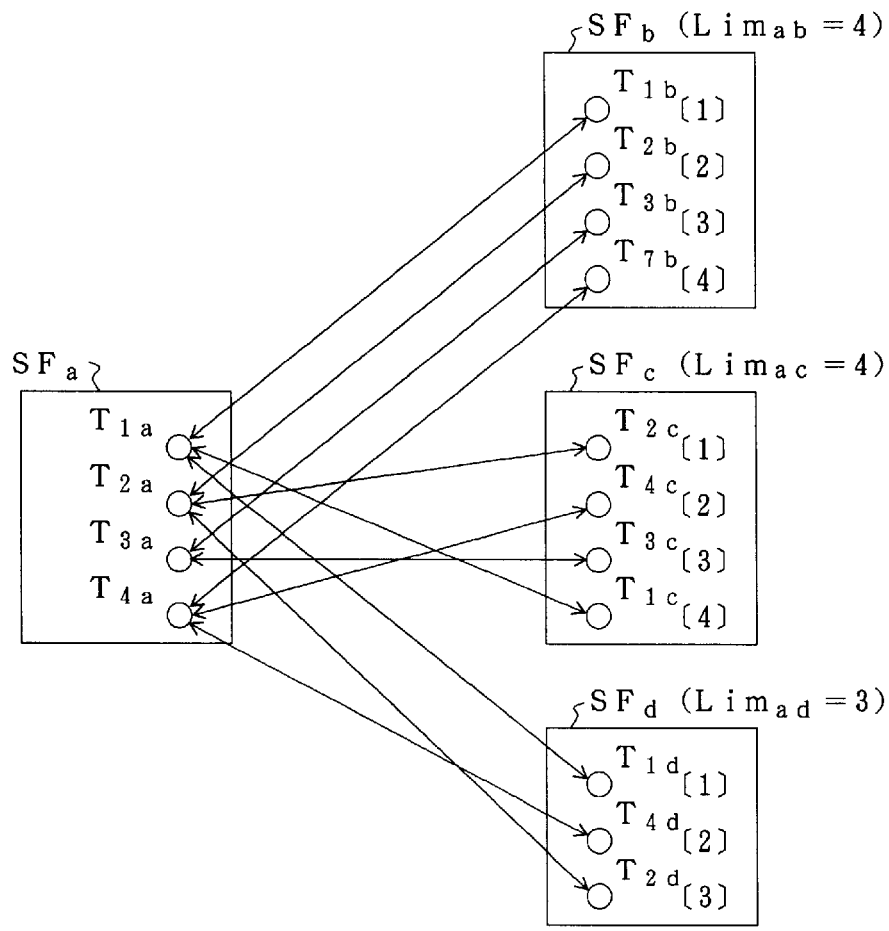
FIG. 14 is an explanatory drawing showing associations of tips between one sharing bag and a plurality of sharing bags.
FIG. 15 is an explanatory drawing showing dirty bit lists in accordance with the associations of tips in FIG. 14.

For example, as shown in FIG. 14, when a sharing bag $SF_a$ is associated with three different sharing bags $SF_b$, $SF_c$, and $SF_d$, as shown in FIG. 15, dirty bit lists $LD_{ab}$, $LD_{ac}$, and $LD_{ad}$, and sink limits $Lim_{ab}$, $Lim_{ac}$, and $Lim_{ad}$, respectively corresponding to each combination are provided. As shown in FIG. 14 and FIG. 15, as long as the orders of the dirty bit lists $LD_{ab}$, $LD_{ac}$, and $LD_{ad}$ are the same as the orders of the dirty bit lists LD of their respective partners, the orders and values of the dirty bits D, or the sink limit Lim may be different among the dirty bit lists (e.g. $LD_{ab}$ and $LD_{ac}$) having a common partner. For example, in the dirty bit list $LD_{ab}$, a dirty bit $D_{2ab}$ (having a value of Im) indicative of tip $T_{2a}$ is stored in the second position, whereas in the dirty bit list $LD_{ac}$, a dirty bit $D_{2ac}$ (having a value of Xp) is stored in the first position. Also, in the dirty bit list $LD_{ba}$ of the sharing bag $SF_b$, a dirty bit $D_{2ba}$ indicative of tip $T_{2b}$ is stored in the second position, whereas a dirty bit $D_{2ca}$ is stored in the first position in the dirty bit list $LD_{ca}$.

The bag managing section 32 in accordance with the present embodiment also includes, in addition to the dirty bit lists LD, a sharing party list LS indicative of a sharing party of a sharing bag SF for each sharing bag SF. By referring to the sharing party list LS, all sharing partners of a certain sharing bag SF can easily be searched for. Therefore, when a change, such as addition, deletion, or contents update is made, for example, with respect to a tip T of the sharing bag SF, all the dirty bits D corresponding to the tip T can be updated faster.

Figure 16:
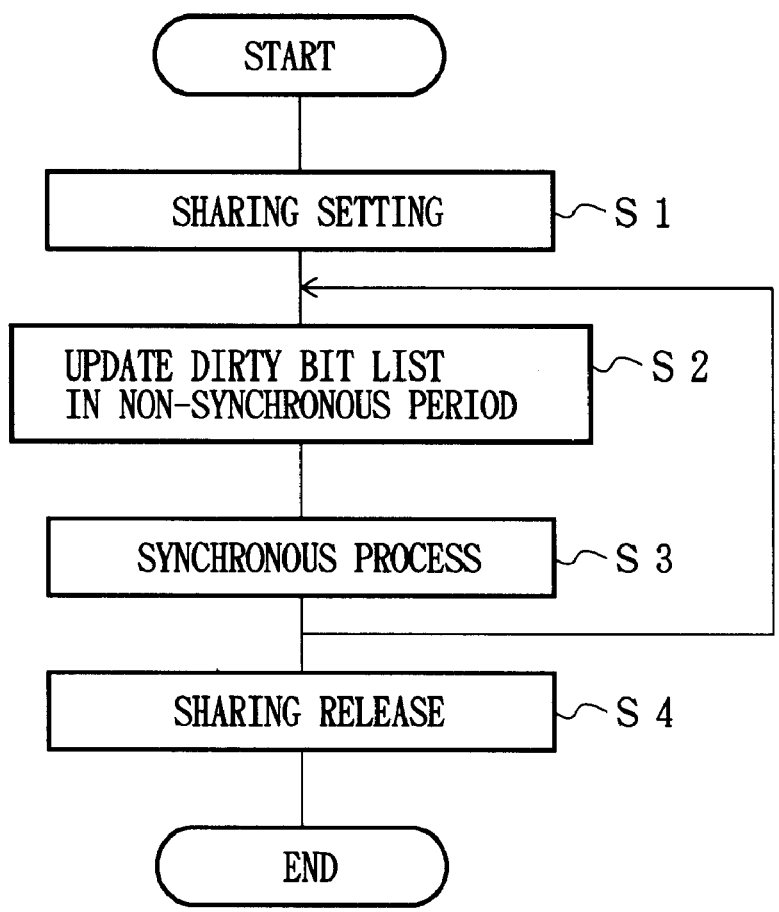
FIG. 16 is a flowchart schematically showing an operation of the database system.

In the database system 1 having the described structure, as schematically shown in FIG. 16, sharing is set prior to the actual synchronous process, and the sharing setting processing section 52 of each information processing device 2 (i.e., 2a and 2b) carries out various processes required for the synchronous process, such as setting of sharing bags SF and generation of dirty bit lists LD and sink limits Lim (S1). Note that, at this stage, it is only registered in the information processing devices 2a and 2b that the sharing bags $SF_a$ and $SF_b$ are in the sharing region, and the contents of the sharing bags $SF_a$ and $SF_b$ do not coincide until the synchronous process is carried out.

Basically, a release of sharing merely cancels associations between sharing bags SF, and it is not necessarily the case that the contents of the sharing bags SF coincide with each other at this stage. Thus, to find a coincidence in the contents of the sharing bags SF, a synchronous process is carried out before sharing is released, either automatically or by an instruction of the user.

Note that, although sharing setting and the synchronous process are described separately in the above explanation, they may be simultaneously carried out. In such a case, the contents of the sharing bags SF coincide at the time when, for example, sharing setting is finished. However, in the present embodiment, the sharing setting and the synchronous process are separated from each other to save time of sharing setting. Thus, the total operation time by the both users can be reduced when the both information processing devices 2 confirm sharing setting to their respective users at the time when sharing is set and only one of the information processing devices 2 is operated by the user at the time of the synchronous process, thereby improving security and reducing operation time.

Regardless of whether the information processing devices 2a and 2b are ready to communicate, the dirty bit list LD of each information processing device is updated based on an operation on the database DB during a non-synchronous period (S2). When the information processing devices 2a and 2b are ready to communicate, the synchronous process is carried out, and the number and the contents of the tips T of the sharing bags SF of the both parties are arranged referring to the dirty bit lists LD and the sink limits Lim, and the dirty bit lists LD and the sink limits Lim are also updated (S3). The use of sharing bags which become consistent by an intentional synchronous process as in S3 is very useful when the communications line of the information processing devices 2a and 2b is connected and disconnected intermittently.

Note that, because a tip T can be contained in a plurality of bags F, a synchronous process associated with any sharing setting might change a tip T which belongs to a sharing bag SF playing no part in the synchronous process. However, regardless of whether the synchronous process being carried out is associated with any sharing setting, the tip T is not inserted into or removed from a bag F other than the sharing bag SF.

The processes of S2 and S3 are repeated as required, and when the synchronous process is no longer required, the sharing setting is released in S4. Note that, in FIG. 16, S2 is carried out following S1. However, as long as the steps S2 and S3 are carried out alternately, the order of S2 and S3 may be reversed.

FIG. 16 only deals with a process of the database system 1 between two information processing devices 2. However, as shown in FIG. 14, in the present embodiment, a bag $F_a$ of a certain information processing device 2a can be shared with sharing bags $SF_b$, $SF_c$, and $SF_d$ of a plurality of information processing devices 2b, 2c, and 2d, and as shown in FIG. 15, dirty bit lists $LD_{ab}$, $LD_{ac}$, and $LD_{ad}$ are created for each pair of the sharing bags SF. Thus, the processes of S1 to S4 are independently carried out for each pair of the sharing bags SF for which sharing is set.

Here, when the contents of a tip T are updated as a result of a synchronous process between the sharing bags SF of one pair, all the dirty bits D associated with the updated tip T are also updated. Thus, a change in tip T in the synchronous process between sharing bags SF of one pair is reflected in the dirty bits D of the sharing bags of the other pairs as a change in tip T in the non-synchronous period. Therefore, by repeating the synchronous process one after another between two arbitrarily chosen information processing devices among information processing devices 2a to 2d, the contents of the sharing bags $SF_a$ to $SF_d$ corresponding to each other in the information processing devices 2a to 2d can be maintained the same even though only one synchronous process is performed at one time between two information processing devices 2.

Further, because the synchronous process is repeated one after another between arbitrarily chosen two sharing bags SF among sharing bags $SF_a$ to $SF_d$, each sharing bag SF only needs to be shared with at least one of the other sharing bags SF to have the same contents with that of the other sharing bags SF. For example, in the example of FIG. 14, the sharing bags $SF_a$ to $SF_d$ can have the same contents even though the sharing bags $SF_b$ to $SF_d$ are only shared with the sharing bag $SF_a$. As a result, data can be made consistent entirely within the database system 1 without being associated with a certain information processing device 2 as in the client/server system.

Figure 17:
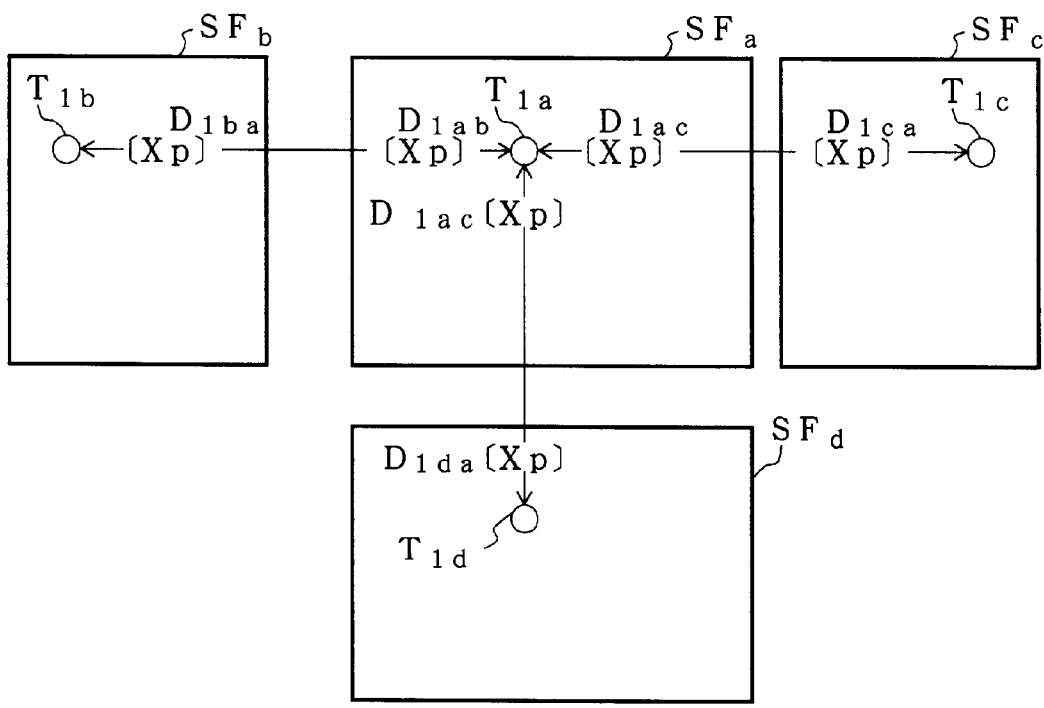
FIG. 17 is an explanatory drawing showing how associations are made between a plurality of sharing bags in the database system.

The following describes, referring to FIG. 17 to FIG. 29, an operation in which sharing is set between the sharing bag $SF_a$ and each of the sharing bags $SF_b$ to $SF_d$ as an example of the synchronous process with three or more sharing bags SF. As shown in FIG. 17, in a stable state after the synchronous processes of the sharing bag $SF_a$ with the sharing bags $SF_b$ to $SF_d$ have been finished, the number of tips T contained in each of the sharing bags $SF_a$ to $SF_d$ are the same, and the contents of associated tips T coincide with one another. Note that, in the following, for convenience of explanation, associating tips T will be represented by the subscripts of the same number, for example, as in $T_{1a}$ and $T_{1d}$, and tips T contained in the same sharing bag SF will be represented by the subscripts of the same alphabet (small letter), for example, as in $T_{1a}$ and $T_{2a}$ which will be described later. Further, for example, when there is no need to specify associations and the sharing bags SF, the subscripts will be omitted partially or entirely from the description as in $T_1$, $T_a$, and T.

Figure 18:
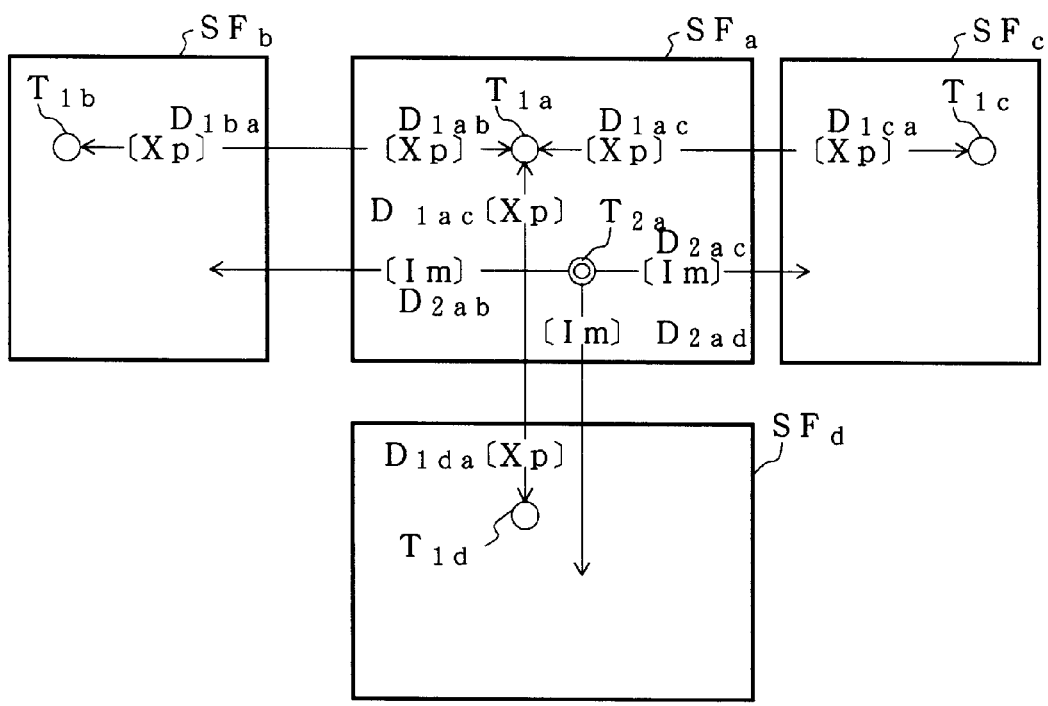
FIG. 18 is an explanatory drawing showing the case where a tip is added in a certain sharing bag in the database system.
Figure 19:
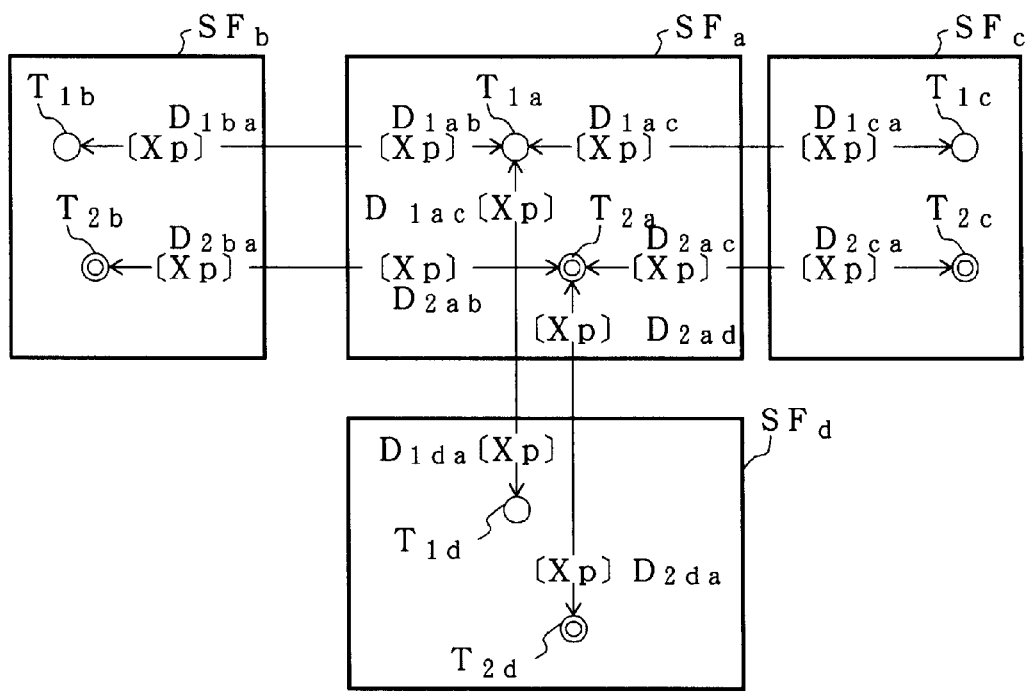
FIG. 19 is an explanatory drawing showing a synchronous process after FIG. 18.

As shown in FIG. 18, when tip $T_{2a}$ is added to the sharing bag $SF_a$ in this state, the dirty bits $D_{2ab}$ to $D_{2ad}$ of the tip $T_{2a}$ are set to "Im" indicative of Insert/Update. Then, the synchronous process is carried out successively in pairs, between sharing bags $SF_a$ and $SF_b$, between sharing bags $SF_a$ and $SF_c$, and between sharing bags $SF_a$ and $SF_d$, and, as shown in FIG. 19, tips $T_{2b}$ to $T_{2d}$ each having the same contents as that of the tip $T_{2a}$ are added to the sharing bags $SF_b$ to $SF_d$, respectively, and the dirty bits $D_{2ab}$, $D_{2ba}$, $D_{2ca}$, $D_{2ac}$, $D_{2da}$, and $D_{2ad}$ of the sharing bags $SF_a$ to $SF_d$ are set to "Xp" indicative of Still/Maintain.

Figure 20:
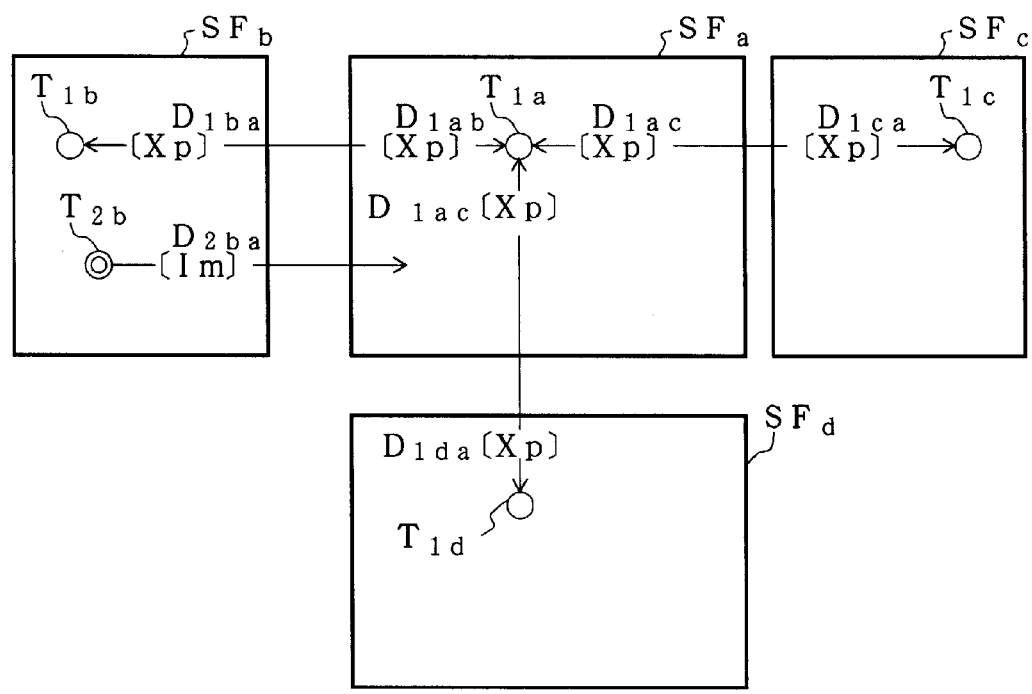
FIG. 20 is an explanatory drawing showing the case where a tip is added to another sharing bag in the database system.
Figure 21:
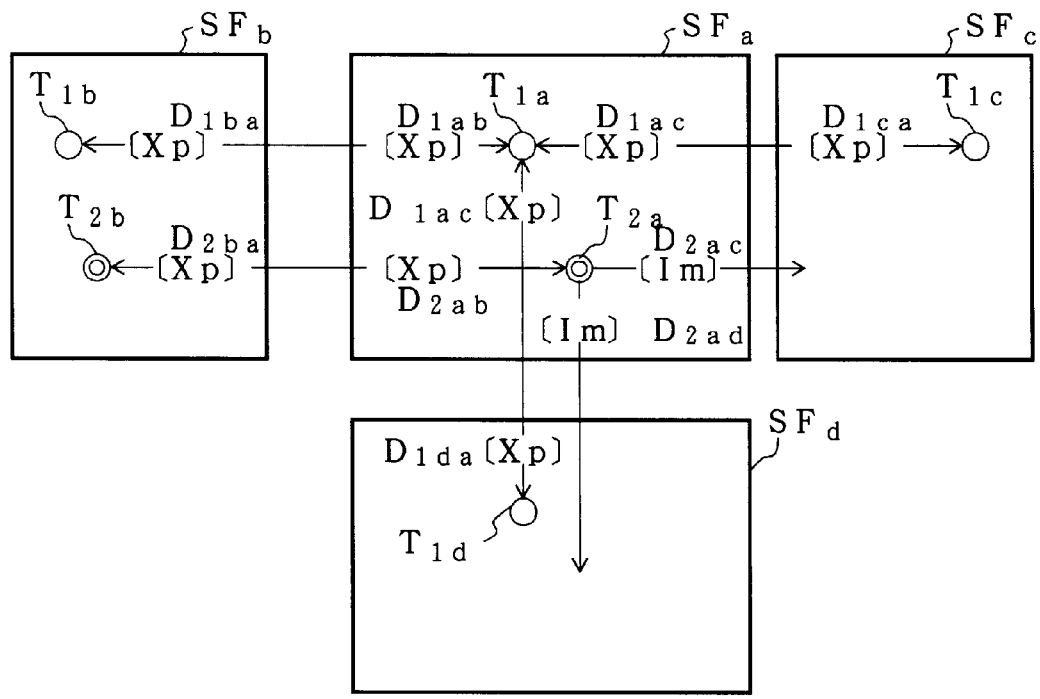
FIG. 21 is an explanatory drawing showing a synchronous process after FIG. 20.

On the other hand, as shown in FIG. 20, when tip $T_{2b}$ is added to the sharing bag $SF_b$ which is shared only with the sharing bag $SF_a$ in the state as shown in FIG. 17, the dirty bit $D_{ba}$ of the tip $T_{2b}$ is set to "Im" indicative of Insert/Update in the information processing device $2_b$, as shown in FIG. 20. Further, in the synchronous process between the sharing bags $SF_b$ and $SF_a$, as shown in FIG. 21, tip $T_{2a}$ having the same contents as that of tip $T_{2b}$ is added to the sharing bag $SF_a$ of the information processing device 2a, and in the dirty bit lists $LD_{ab}$ and $LD_{ba}$ of the information processing devices 2a and 2b, the dirty bits $D_{2ab}$ and $D_{2ba}$ are set to "Xp" indicative of Still/Maintain.

Here, other than the sharing bag $SF_b$, the sharing bag $SF_a$ is also shared with the sharing bags $SF_c$ and $SF_d$. Thus, the synchronize processing section 51 of the information processing device 2a creates dirty bits $D_{2ac}$ and $D_{ad}$, respectively in dirty bit lists $LD_{ac}$ and $LD_{ad}$, which correspond to the tip $T_{2a}$, and "Im" indicative of Insert/Update is set. As a result, upon the synchronous process between the sharing bag $SF_a$ and the sharing bags $SF_c$ and $SF_d$, the contents of the sharing bags $SF_a$ to $SF_d$ become the same, as with the case of FIG. 19, even though no direct sharing is set between the sharing bag $SF_b$ and the sharing bags $SF_c$ and $SF_d$.

The above described the case where the tip T is inserted. However, the contents of sharing bags SF can be made the same in the same manner by repeating the synchronous process in pairs one at a time even when the tip T is deleted or the contents are updated, or the tip T is moved in and out of the sharing bag SF.

Figure 22:
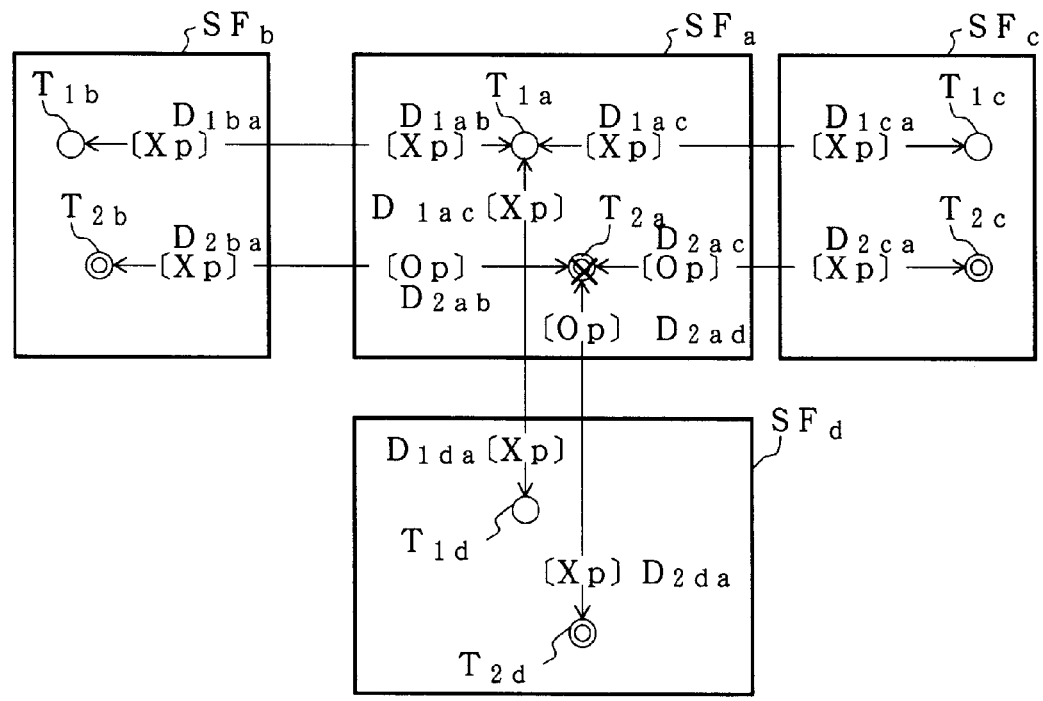
FIG. 22 is an explanatory drawing showing the case where a tip is erased from a certain sharing bag in the database system.
Figure 23:
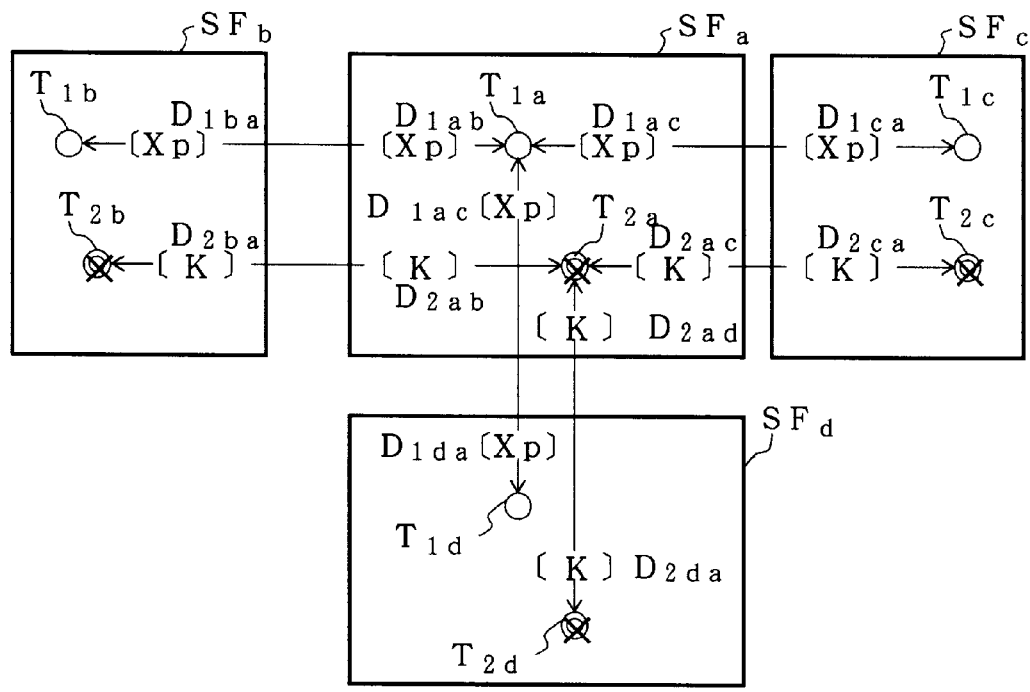
FIG. 23 is an explanatory drawing showing a synchronous process after FIG. 22.
Figure 24:
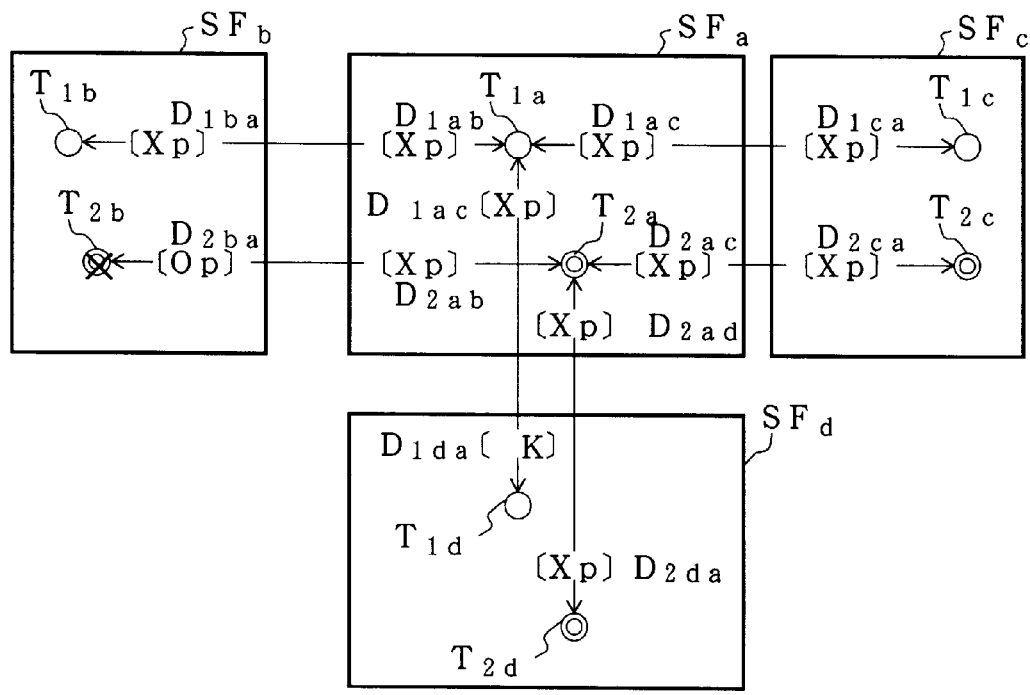
FIG. 24 is an explanatory drawing showing the case where a tip is erased from another sharing bag in the database system.
Figure 25:
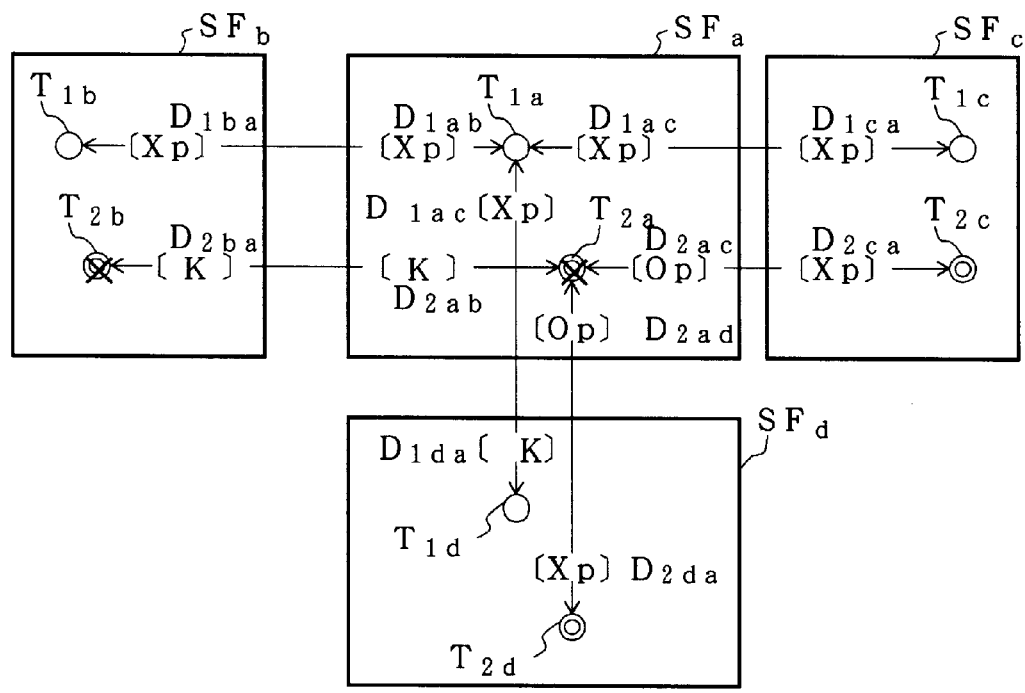
FIG. 25 is an explanatory drawing showing a synchronous process after FIG. 24.
Figure 26:
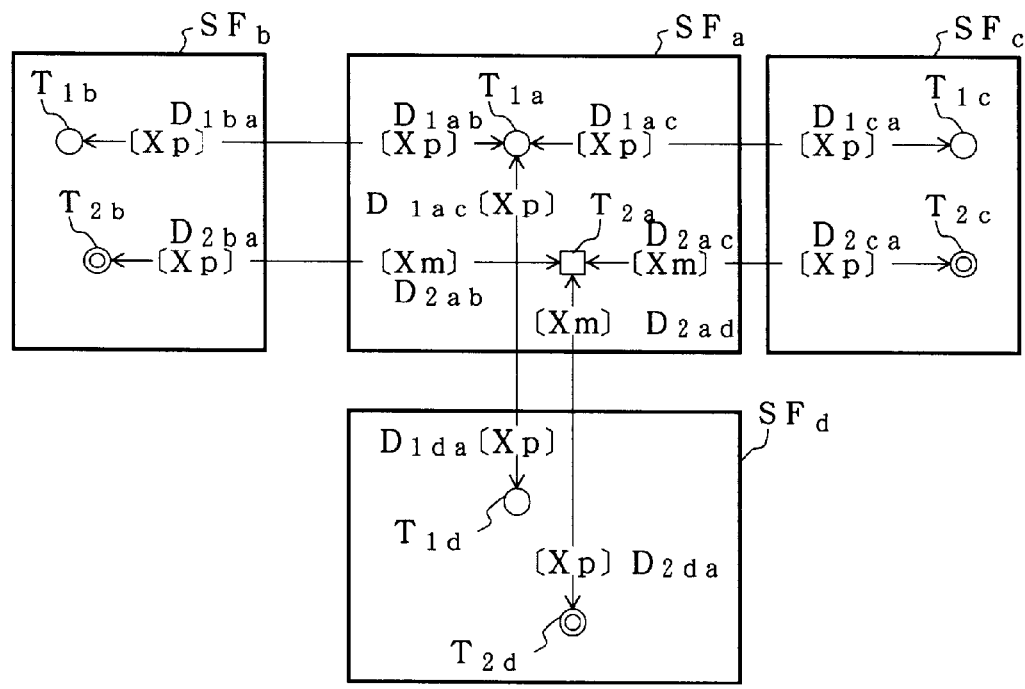
FIG. 26 is an explanatory drawing showing the case where a tip is updated in a certain sharing bag in the database system.
Figure 27:
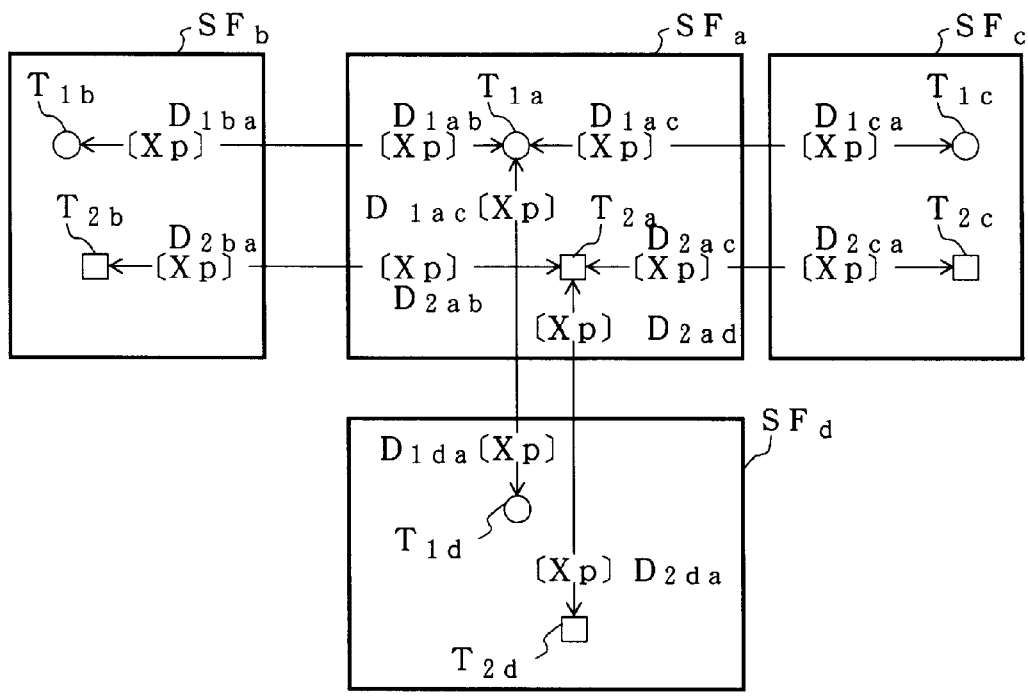
FIG. 27 is an explanatory drawing showing a synchronous process after FIG. 26.
Figure 28:
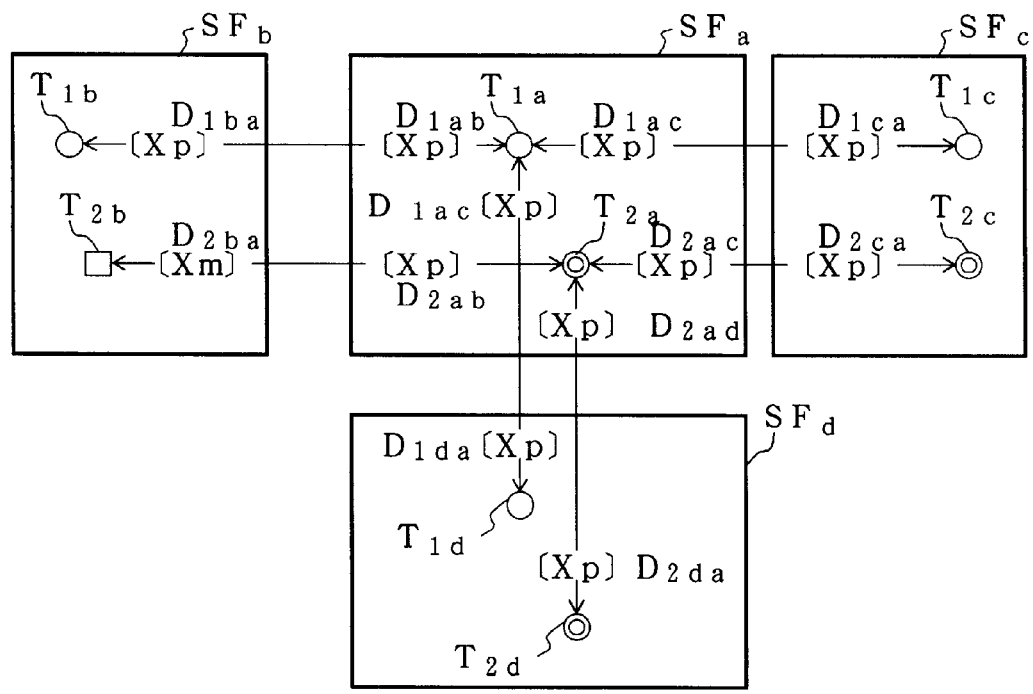
FIG. 28 is an explanatory drawing showing the case where a tip is updated in another sharing bag in the database system.
Figure 29:
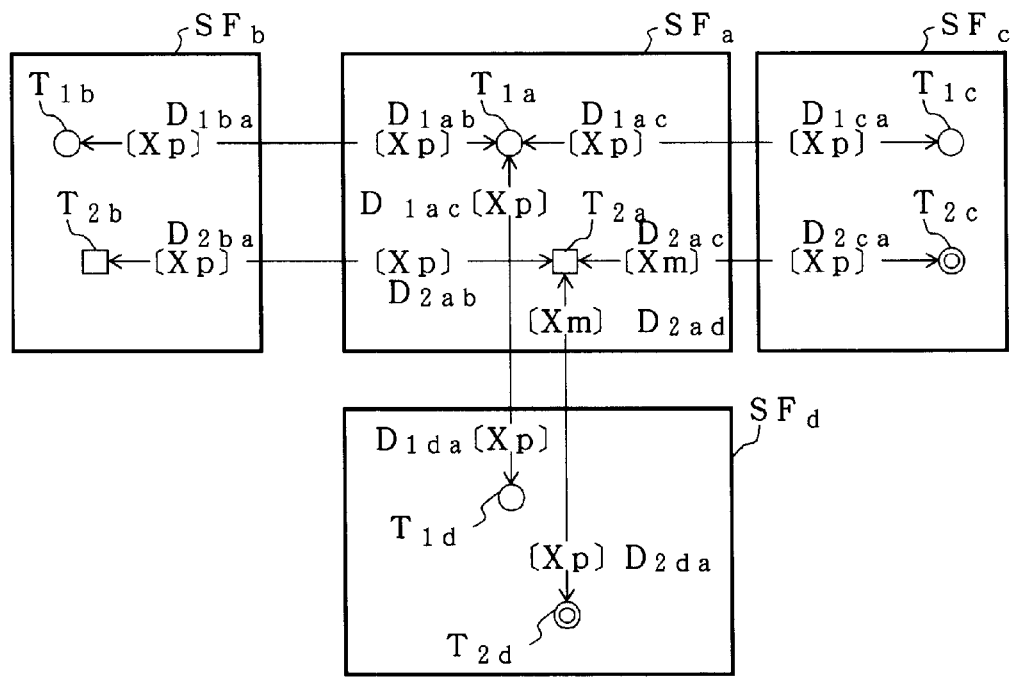
FIG. 29 is an explanatory drawing showing a synchronous process after FIG. 28.

For example, as shown in FIG. 22, when the tip $T_{2a}$ is deleted, by the synchronous process between the sharing bag $SF_a$ and the sharing bags $SF_b$ to $SF_d$, as shown in FIG. 23, the tips $T_{2a}$ to $T_{2d}$ are all deleted. Also, as shown in FIG. 24, when the tip $T_{2b}$ is deleted, as shown in FIG. 25, the tips $T_{2a}$ to $T_{2d}$ are all deleted after the tip $T_{2a}$ is deleted. Similarly, as shown in FIG. 26, when the contents of the tip $T_{2a}$ is updated, as shown in FIG. 27, the tips $T_{2a}$ to $T_{2d}$ are also updated in the same manner. Further, as shown in FIG. 28, when the contents of the tip $T_{2b}$ is updated, as shown in FIG. 29, the tips $T_{2a}$ to $T_{2d}$ are also updated after the tip $T_{2a}$ is updated.

The following describes the process of S1 to S4 of FIG. 16 in more detail. Note that, sharing setting models include a bag fused model in which sharing is set between bags $F_a$ and $F_b$ which already exist, a bag drawing model in which a bag F existing in one information processing device 2 is designated and a new bag F corresponding to the designated bag F is created in the other information processing device 2, and a new bag creating model in which new bags $F_a$ and $F_b$ are created in their respective information processing devices 2 for sharing. In the following, the description will be given though the case of the bag fused type.

Figure 30:
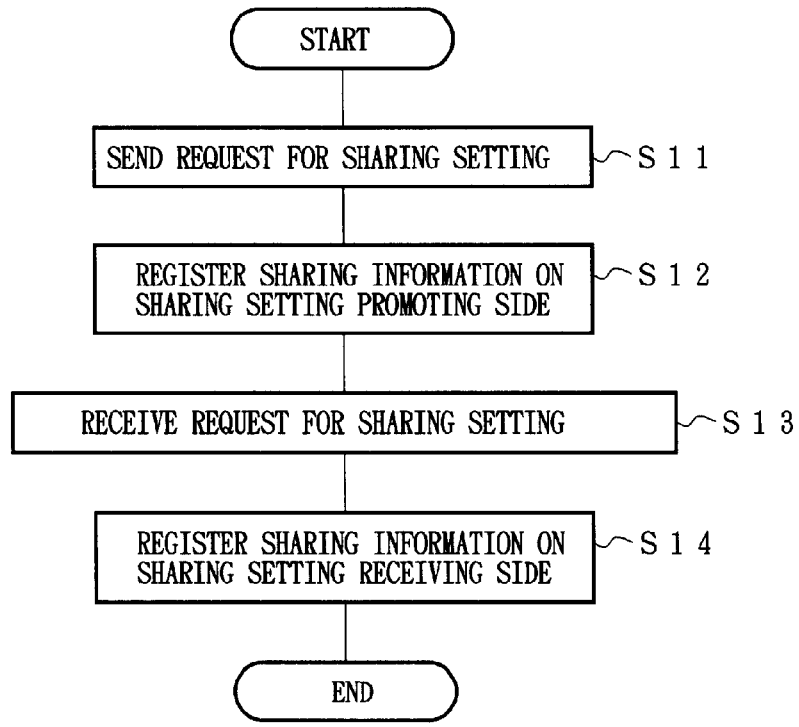
FIG. 30 is a flowchart showing a detailed operation of sharing setting in the database system.

As shown in FIG. 30, when the information processing devices 2a and 2b are ready to communicate, the sharing setting processing section 52 of the information processing device 2a in S11 sends a sharing setting request to the information processing device 2b. The request includes a machine ID indicative of the information processing device 2a, a bag ID indicative of the bag $F_a$ of the information processing device 2a, and a bag ID indicative of the bag $F_b$ of the information processing device 2b to which the sharing is directed. Note that, in the following, the side which sends the sharing setting request will be referred to as a sharing setting promoting side, and the side which receives the sharing setting request will be referred to as a sharing setting receiving side.

Then, in S12, the sharing setting processing section 52 of the sharing setting promoting side registers, as sharing information, information analogous to the sharing setting request. Also, the sharing setting processing section 52 creates a sharing party list LS corresponding to the bag $F_a$ so as to register the bag ID of the other party. As a result, the bag $F_a$ becomes a sharing bag $SF_a$. Also, a dirty bit list LD and a sink limit Lim, corresponding to a combination of the sharing bag $SF_a$ and the bag $F_b$ of the other party are created.

The information processing device 2b on the sharing setting receiving side, upon receiving the sharing setting request by the sharing setting processing section 52 in S13, registers sharing information based on the sharing setting request in S14. The sharing information includes a machine ID indicative of the information processing device 2b, a bag ID to be subjected to sharing in the information processing device 2a, a bag ID to be subjected to sharing in the information processing device 2b, and an option which is decided in the sharing setting. The sharing setting processing section 52 of the information processing device 2b, as with the sharing setting promoting side, registers the bag ID of the other party in a sharing party list LS corresponding to the bag $F_b$ so as to create a sharing bag $SF_b$ and a dirty bit list LD and a sink limit Lim, corresponding to a combination of the sharing bag $SF_b$ and the sharing bag $SF_a$ of the other party.

The following will describe in detail the process of S2 in FIG. 16, that is, the process during the non-synchronous period. In the non-synchronous period, the dirty bits D corresponding to tips T are updated as shown in FIG. 31 based on manipulation made on the tips T, and the dirty bit list LD and sink limit Lim at the time of the manipulation.

Figure 32:
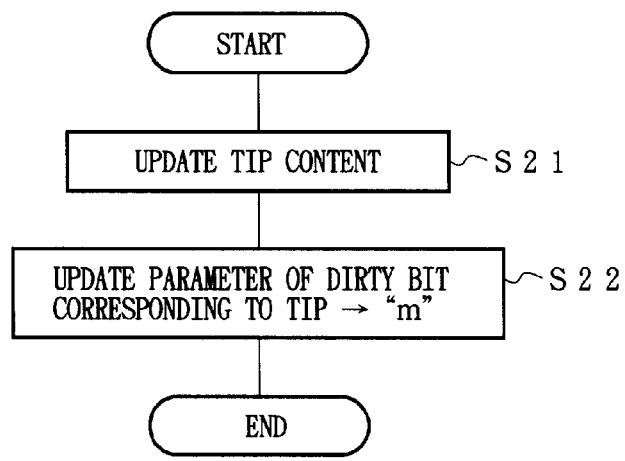
FIG. 32 is a flowchart showing an update process of tip contents, explaining a detailed operation in a non-synchronous period in the database system.

Specifically, when the contents update of a tip T is instructed, in S21 of FIG. 32, the tip update processing section 41 (see FIG. 1) receives the instruction from the user operating section 22 and updates the contents of the tip T in accordance with the instruction. Then, in S22, the update parameter is set to "m" with respect to the dirty bit D corresponding to the tip T. Note that, the values of the movement parameter remain unchanged.

The tip T can belong to a plurality of sharing bags $SF_1$ and the sharing bag SF may be shared with a plurality of sharing bags SF. Therefore, in the information processing device as a whole, there may be a plurality of dirty bits D corresponding to the tip T. For this reason, all the dirty bits D corresponding to the tip T are searched and updated. Searching of corresponding dirty bits D may be carried out referring to all the dirty bit lists LD, or, in order to save search time, by creating a list of dirty bits D corresponding to the tip T in advance and by referring to it.

In any case, in the present embodiment, a dirty bit D is created with respect to a tip T which has belonged to the sharing bag SF even once during the non-synchronous period, and the dirty bit D is updated by monitoring any manipulation on the tip T. Therefore, for example, even when the tip T has been moved and does not currently exist in the sharing bag SF, it is ensured that the dirty bit D is updated.

Figure 33:
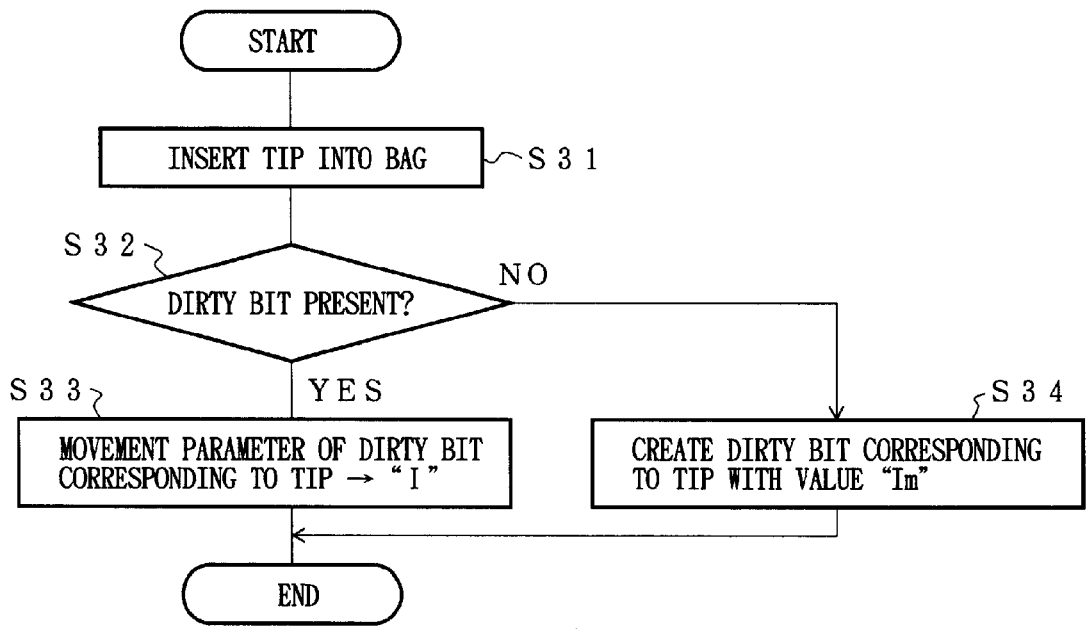
FIG. 33 is a flowchart showing an insertion process of tip contents, explaining a detailed operation in a non-synchronous period in the database system.

Meanwhile, when a tip T is to be inserted into the sharing bag SF by newly creating or by moving the tip T, as shown in FIG. 33, the tip addition processing section 42 (see FIG. 1) controls the bag managing section 32 in accordance with an instruction from the user operating section 22 so that the tip T belongs to the sharing bag SF (S31). Further, the tip addition processing section 42 in S32 judges whether a dirty bit list LD indicative of the sharing bag SF contains a dirty bit D corresponding to the tip T.

Here, when such a dirty bit D is contained, it indicates that the content update of the tip T has already been monitored, for example, as in the case where the tip T in the sharing bag SF has been moved in and out of it. Thus, the tip addition processing section 42 in S33 sets the movement parameter of the dirty bit D to "I". On the other hand, when the dirty bit D is not contained, it means that, for example, the tip T has never been contained in the sharing bag SF or the tip T has been newly created, and it indicates that whether the contents of the tip T have been updated during the non-synchronous period cannot be confirmed. Thus, the tip addition processing section 42 in S34 adds a dirty bit D with the value of "Im" indicative of the added tip T to the dirty bit list LD on the position after the sink limit Lim, for example, on the last position of the dirty bit list LD. Note that, in the case where there are plural dirty bit lists LD corresponding to the sharing bag SF, the processes from S32 to S34 are carried out with respect to all the dirty bit lists LD.

Figure 34:
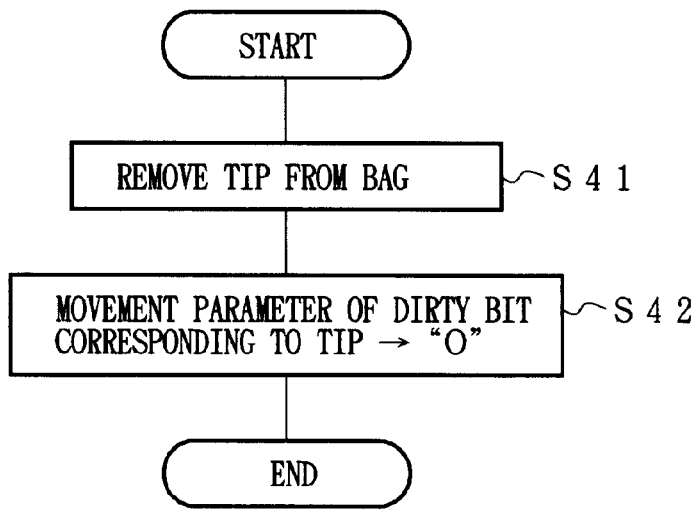
FIG. 34 is a flowchart showing a removing process of tip contents, explaining a detailed operation in a non-synchronous period in the database system.

Further, when a tip T is to be removed from the sharing bag SF, for example, by deleting or moving the tip T, as shown in FIG. 34, the tip deletion processing section 43 (see FIG. 1) controls the bag managing section 32 in accordance with an instruction from the user operating section 22 so that the tip T is removed from the sharing bag SF (S41). Here, in the present embodiment, the dirty bit D is maintained with respect to the tip T which has contained in the sharing bag SF even once during the non-synchronous period. Thus, the tip deletion processing section 43 in S42 updates the movement parameter of the dirty bit D corresponding to the tip T to "O" with respect to all the dirty bit lists LD indicative of the sharing bag SF. Note that, the update parameter remains unchanged.

Figure 35:
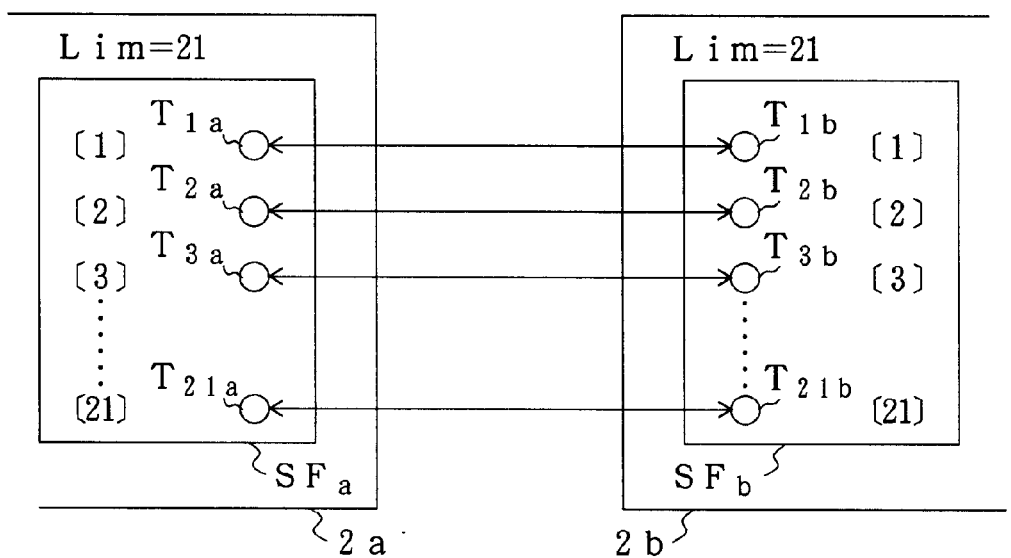
FIG. 35 is an explanatory drawing showing associations between tips immediately after the synchronous process in the database system.
Figure 36:
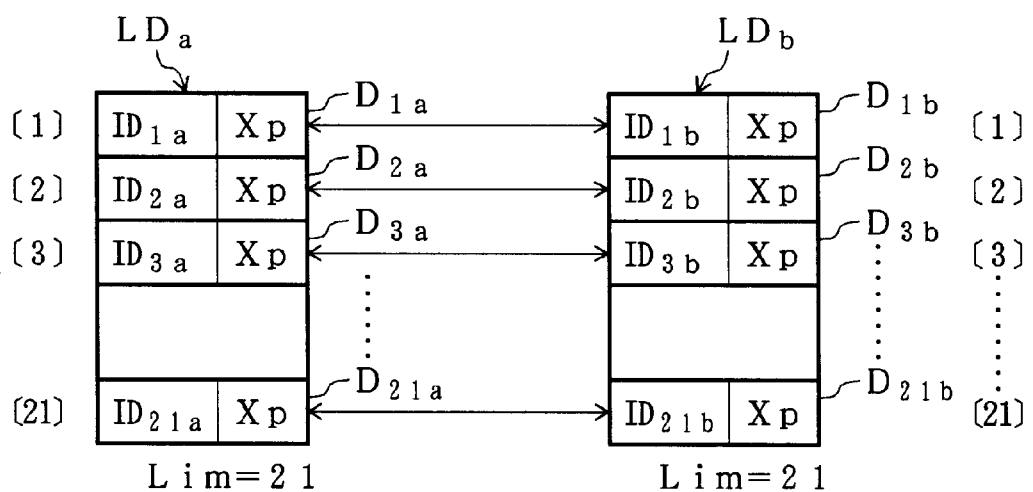
FIG. 36 is an explanatory drawing showing dirty bit lists immediately after a synchronous process in the database system.

For example, at the end of the synchronous process, as shown in FIG. 35, all the tips T in the sharing bags $SF_a$ and $SF_b$ are associated one to one with each other, and the contents of the corresponding tips T are set to be the same. Thus, as shown in FIG. 36, the sink limit Lim is the same as the length (number of dirty bits D) of the dirty bit list LD, and the corresponding dirty bits $D_a$ and $D_b$ are stored such that their orders are the same in their respective dirty bit lists LD. Also, the values of the dirty bits D are all set to "Xp".

Figure 37:
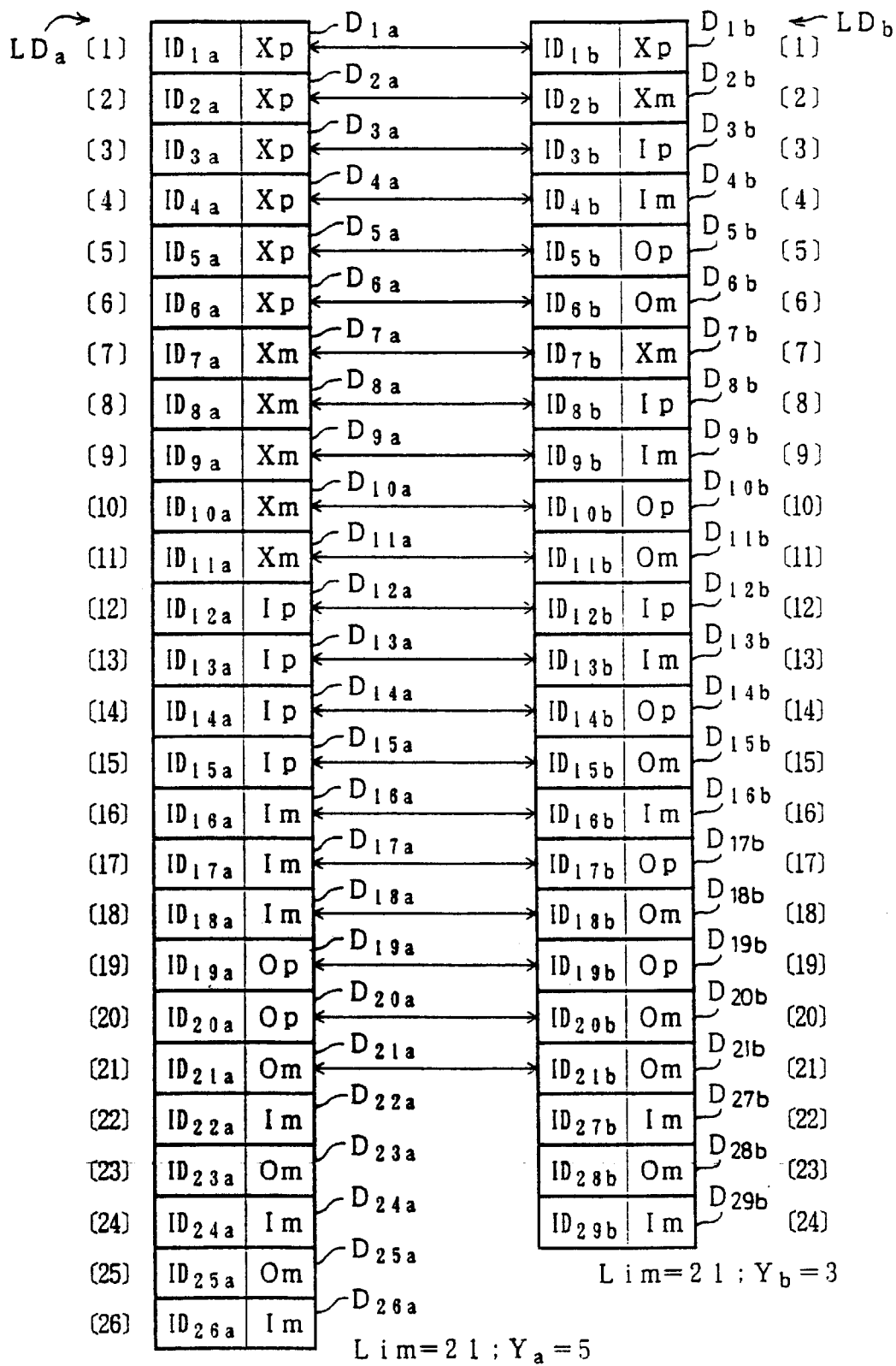
FIG. 37 is an explanatory drawing showing dirty bit lists immediately before the next synchronous process in the database system.

During the non-synchronous process, when the databases DB of the information processing devices 2 are independently modified, the tip update processing section 41, the tip addition processing section 42, and the tip deletion processing section 43 of each information processing device 2 update the dirty bit list LD. As a result, the values of the dirty bits D always indicate the states of the corresponding tips T in the non-synchronous period. Therefore, when the databases DB are independently updated, at the time immediately preceding a subsequent synchronous process, for example, as shown in FIG. 37, the dirty bit lists LD do not coincide with each other.

Nevertheless, in the dirty bit lists LD, the positions indicated by the sink limits Lim, and the dirty bits D above the sink limits Lim are not deleted even when the corresponding tips T are deleted and the same order is maintained during the non-synchronous period. Thus, the orders of the dirty bits D, such as dirty bits $D_{3ab}$ and $D_{3ba}$, indicative of associating tips T between the sharing bags $SF_a$ and $SF_b$ are maintained the same.

A dirty bit D after the sink limit Lim indicates a tip T which was newly added to the sharing bag SF during the non-synchronous period, and even when dirty bits D, for example, such as dirty bits $D_{22ab}$ and $D_{27ba}$, are stored on the same position, their respective tips T are not associated with each other. Such dirty bits D after the sink limit Lim indicate either "Im" or "Om", wherein "Om" indicates that a newly inserted tip T into the sharing bag SF does not currently belong to the sharing bag SF. Also, when the-number of tips T added is different, the lengths of the dirty bit lists LD are also different.

Figure 38:
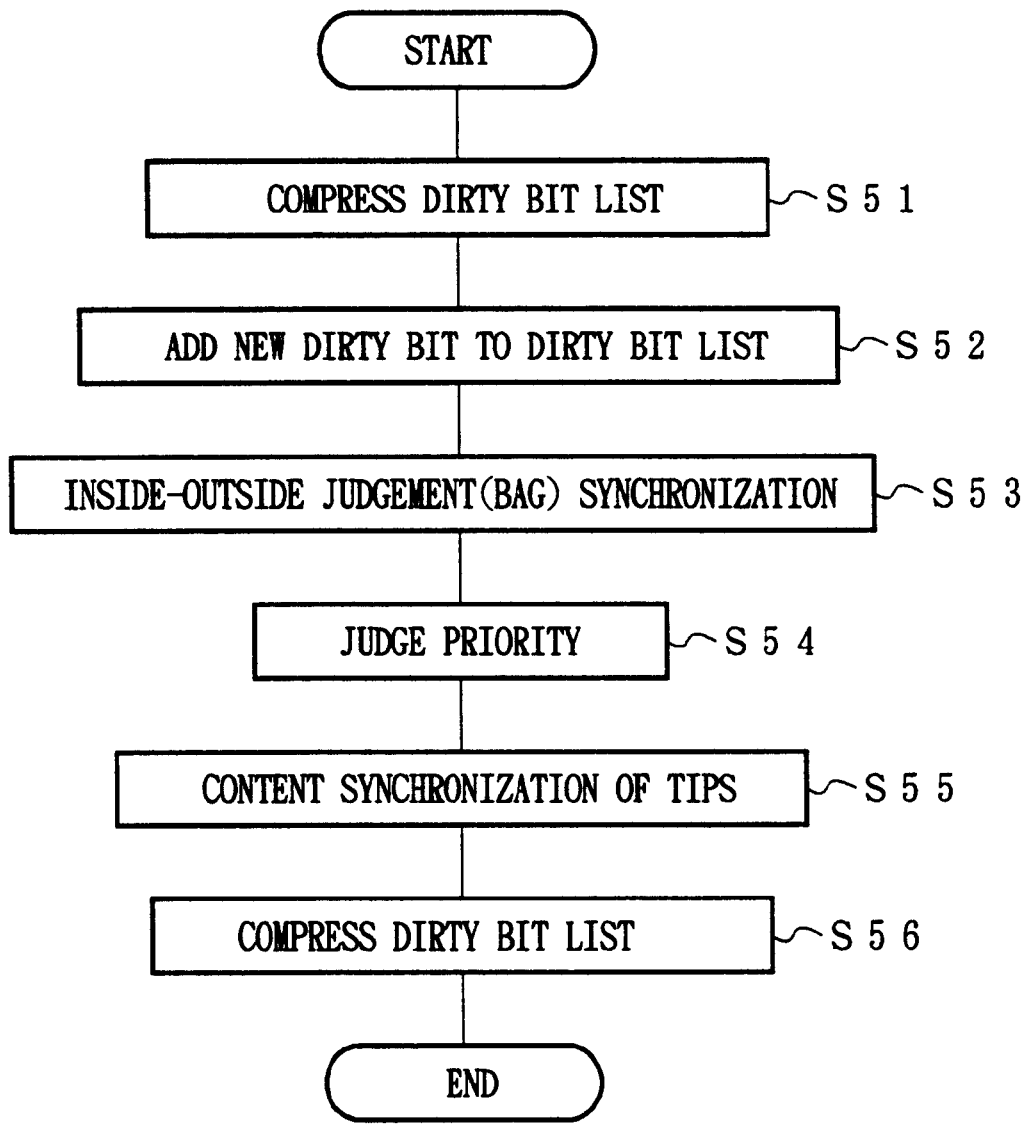
FIG. 38 is a flowchart explaining a detailed operation in the synchronous process in the database system.
Figure 39:
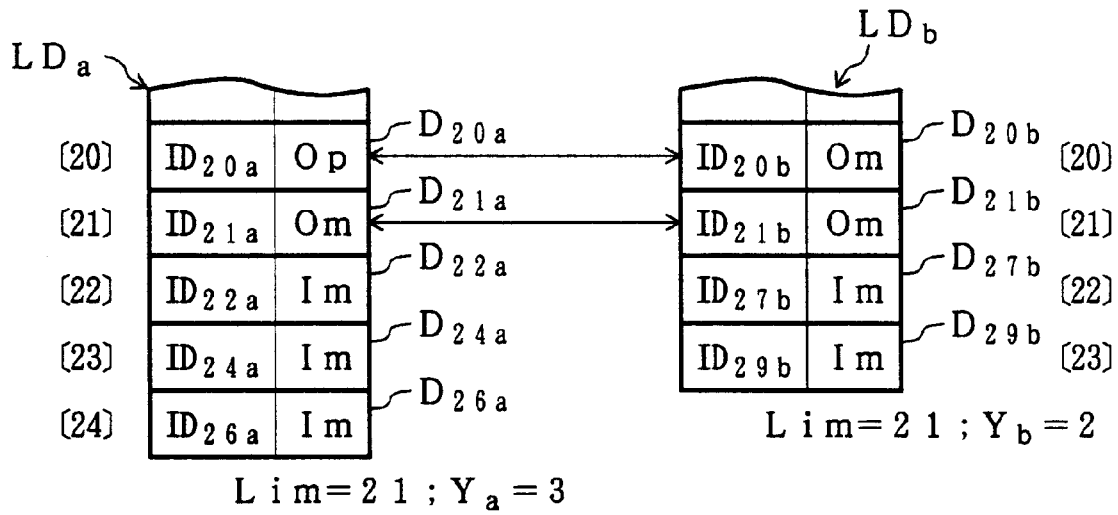
FIG. 39 is an explanatory drawing showing dirty bit lists after compression in the database system, explaining a state of operation in the synchronous process.

When the synchronous process is instructed in this state by an instruction of the user or by a sensor for detecting that the information processing devices 2 are ready to communicate, the synchronous process in S3 of FIG. 16 is carried out. To explain in more detail, as shown in FIG. 38, in S51, the synchronize processing section 51 of each information processing device 2 deletes dirty bits D whose movement parameter is "O" from the dirty bits D after the sink limit Lim of the dirty bit list LD. As a result, as shown in FIG. 39, the dirty bits D after the sink limit Lim only take the value of "Im" in the both dirty bit lists LD.

The tips T corresponding to the dirty bits D with the movement parameter of "O" were not contained in the sharing bag SF in the preceding synchronous process and are not contained either in the current synchronous process. Therefore, it is not required to send the contents of these tips T to the other information processing device 2 regardless of the state of the sharing bag SF of the other party. Thus, by deleting these tips T, the number of dirty bits D transmitted between the information processing devices 2a and 2b can be reduced in the subsequent processes.

Figure 40:
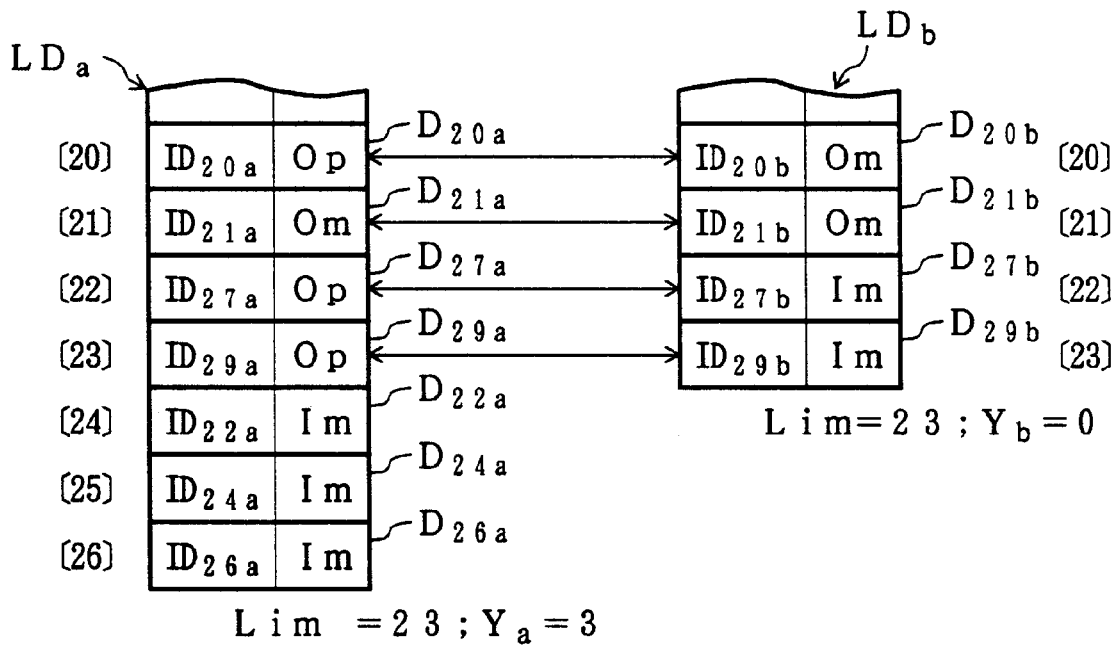
FIG. 40 is an explanatory drawing showing a state in which a dirty bit which was added in one information processing device is added to a dirty bit list of another information processing device, explaining another state of operation in the synchronous process in the-database system.

When compression of the dirty bit lists D is finished in S51, the dirty bits D after the sink limits Lim are sent in the both directions by the synchronize processing sections 51 between the both parties in S52 so as to create in each party dirty bits D which correspond to the dirty bits D sent from the other party. Specifically, the information processing device 2b sends the number $Y_{ba}$ of dirty bits D after the sink limit $Lim_{ba}$ of the dirty bit list $LD_{ba}$, and the dirty bits D with the value of "Op" sent from the information processing device 2b are inserted in the same-number as $Y_{ba}$ immediately after the sink limit $Lim_{ab}$ of the dirty bit list $LD_{ab}$ of the information processing device 2a. Further, the information processing devices 2a and 2b add the number $Y_{ba}$ to their respective sink limits Lim. As a result, as shown in FIG. 40, the dirty bits D corresponding to the tips T added in the information processing device 2b are also created in the information processing device 2a. In the same manner, the dirty bits D corresponding to the tips T added in the information processing device 2a are added to the information processing device 2b, thereby adjusting the sink limit Lim.

Here, as shown in FIG. 40, in the state where the dirty bits D corresponding to the tips T of the information processing device 2b are added to the dirty bit list $LD_{ab}$ of the information processing device 2a, the sink limit Lim has already been changed and is indicating the last position (here, sink limit Lim=23) of the dirty bit list $LD_{ba}$ of the information processing device 2b. Therefore, when adding dirty bits D corresponding to the tips T of the information processing device 2a, by adding these dirty bits D immediately after the sink limit Lim of the dirty bit list $LD_{ba}$, the dirty bits D corresponding to the tips T (such as $T_{22a}$, $T_{24a}$, and $T_{26a}$) which have been added to the information processing device 2a are ordered after the dirty bits D (such as $T_{27b}$ and $T_{29b}$) which have been added to the information processing device 2b, both in the dirty bit lists $LD_{ab}$ and $LD_{ba}$. As a result, the orders of associating dirty bits D coincide with each other between the dirty bit lists $LD_{ab}$ and $LD_{ba}$.

Figure 41:
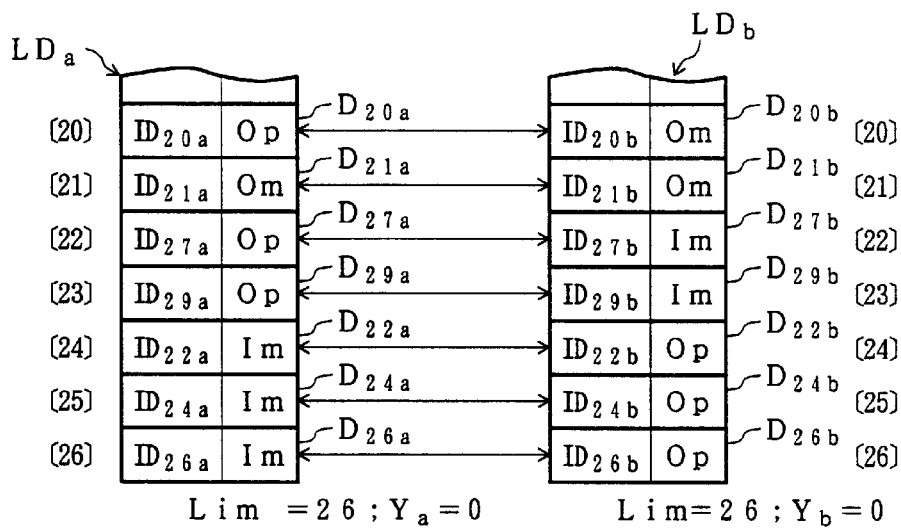
FIG. 41 is an explanatory drawing showing a state in which a dirty bit which was added in one information processing device is added to a dirty bit list of another information processing device, explaining yet another state of operation in the synchronous process in the database system.

As a result, as shown in FIG. 41, the lengths of the dirty bit lists $LD_{ab}$ and $LD_{ba}$ become the same, and the dirty bits D placed on the same position between the parties will come to indicate associating tips T. Also, the sink limits Lim and the lengths of the dirty bit lists LD become the same, and no dirty bit D exists after the sink limits Lim. Note that, here, only the dirty bit lists LD and the sink limits Lim are updated and it is not required to transmit the contents of tips T at this stage.

Note that, the above explanation described the case where the number $Y_{ab}$ ($Y_{ba}$) is sent or received. However, as long as the dirty bits D of the associating tips T are placed on the same position, the information sent or received is not just limited to the number $Y_a$ ($Y_b$). Also, in the above explanation, the dirty bit D having the value of "Op" is added. However, any value whose priority is after "Im" exhibits the same effect.

Figure 42:
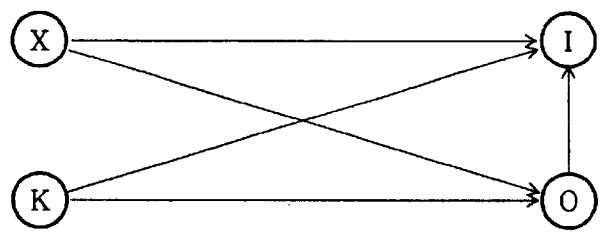
FIG. 42 is an explanatory drawing showing a priority of a movement parameter of the dirty bit, explaining a synchronous process in the database system.

When the dirty bits D have all been associated with each other in S52, the synchronize processing section 51 of each party in S53 decides whether a tip T corresponding to each dirty bit D should be placed in the sharing bag SF based on the dirty bits D transferred between the information processing devices 2a and 2b. In the case where the movement parameters of the dirty bits $D_{ab}$ and $D_{ba}$ are different, it is judged whether the tip $T_b$ should be placed in the sharing bag $SF_b$ using, for example, the priority rule as shown in FIG. 42. Note that, in FIG. 42, a priority is given towards the tip of the arrows.

Figure 43:
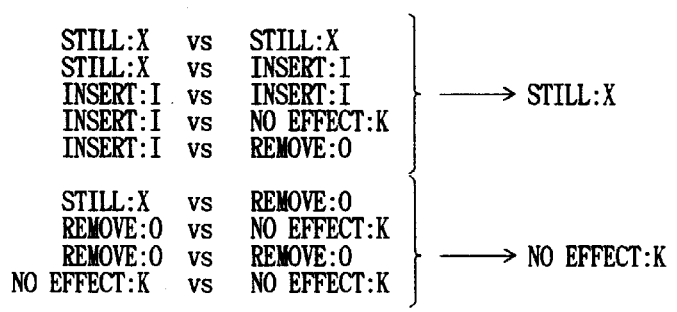
FIG. 43 is an explanatory drawing showing changes in dirty bit, explaining a synchronous process in the database system.

Specifically, the dirty bits D in the dirty bit list LD are successively sent out, for example, from the information processing device 2a to the information processing device 2b. The information processing device 2b compares the dirty bit $D_{ab}$ received and the dirty bit $D_{ba}$ of the dirty bit list $LD_{ba}$ whose positions are the same between the lists. When the combination of the movement parameters is either one of (X-X), (X-I), (I-I), (I-K), and (I-O) as shown in FIG. 43, the synchronize processing section 51 of the information processing device 2b judges that the tips T of the dirty bits D should be placed in the sharing bag SF so that the tips T corresponding to the dirty bits D are placed in their respective sharing bags SF. Also, the movement parameters of the both parties are set to "X".

On the other hand, when the combination of movement parameters is (X-O), (O-K), (O-O), or (K-K), the synchronize processing section 51 judges that the tips T are outside of the sharing bag SF so that, for example, the tips T of the both parties are removed from their respective sharing bags SF, and their dirty bits D are set to No Effect "K". Note that, when the information processing devices 2a and 2b are operating properly, the combination of (X-K) does not result. Thus, this is judged as an error and an error process is carried out, in which the user is asked to send instructions, for example.

Removing of the receiver's tips T or setting of dirty bits D may be carried out by the synchronize processing section 51 of the receiver by the dirty bits D sent from the sending end before they are updated, or by transmitting the result of judgment of the sending end to the receiving end. In either case, the receiver's dirty bits D and tips T are specified by the dirty bits D of the sending end or by the order of sending the results of judgment, and no special information for specifying the dirty bits D or tips T is sent. Therefore, the volume of data transmitted in the inside-outside judgment is significantly small. As a result, as shown in FIG. 32, all the dirty bits D of the dirty bit lists LD are set to have the movement parameter of either "X" or "K".

Note that, the tips T whose movement parameter is not "X", namely tips T which were judged to be outside of the sharing bag SF or tips T judged to be errors are not subjected to the tip synchronous process in S54 and S55, and priority judgment of the update parameter or sending of tip T contents is not carried out.

Then, the synchronize processing section 51 in S54 compares the update parameters of the dirty bits D of the both parties with respect to the tips T (whose movement parameter is "X") which have been judged to be inside the sharing bag SF in the bag synchronization in S53 so as to determine respective priorities of the corresponding tips T. The priority of the tips T is determined, as shown in FIG. 33, by the update parameter, and Update "m" is given a higher priority than Maintain "p", thus deciding whether the contents of the tips T should be transferred and deciding transfer direction.

Figure 44:
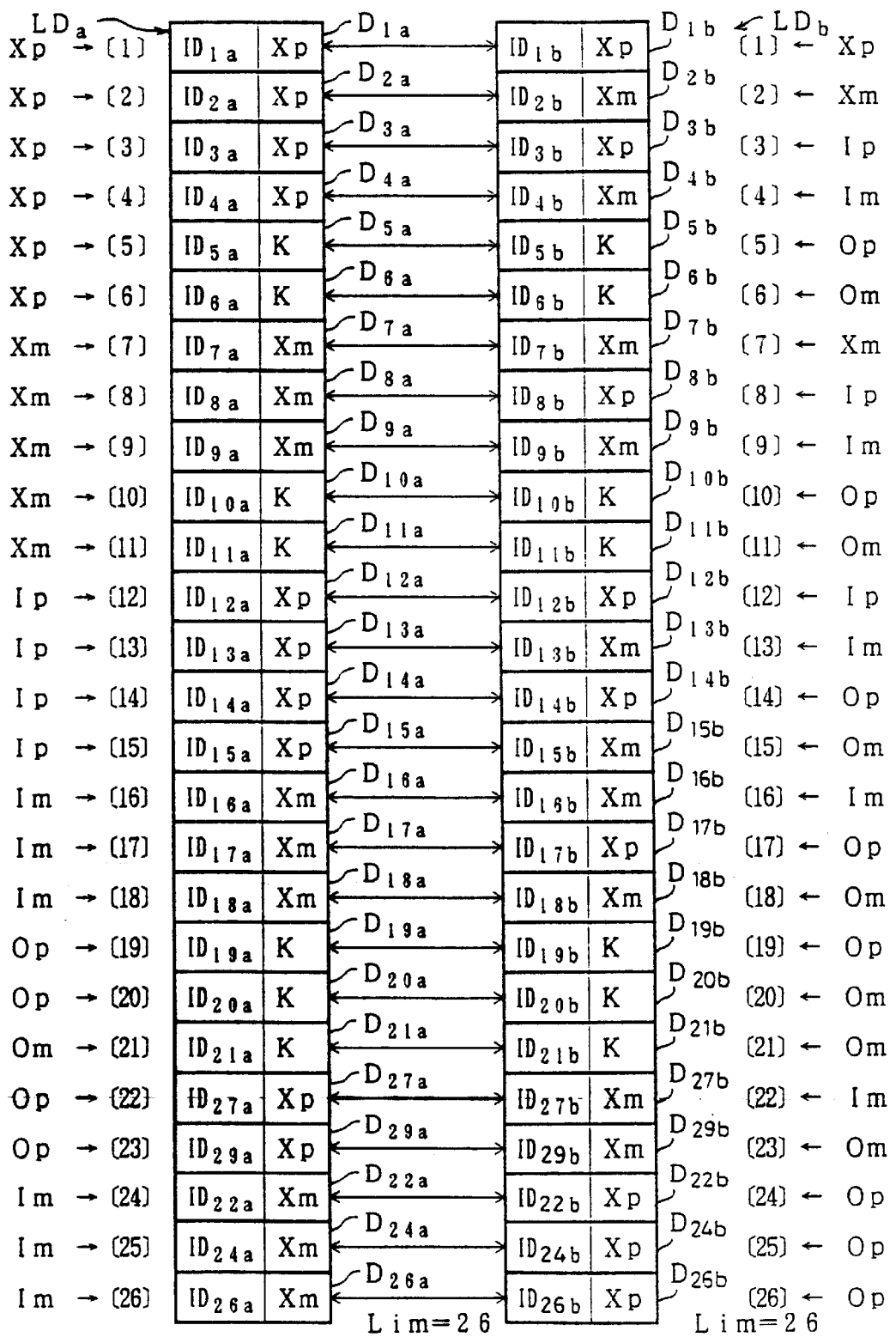
FIG. 44 is an explanatory drawing showing dirty bit lists at the time when an inside-outside synchronous process is finished, explaining a synchronous process in the database system.
Figures 45, 46:
FIG. 45 is an explanatory drawing showing a priority of an update parameter of the dirty bit, explaining a synchronous process in the database system.
FIG. 46 is an explanatory drawing showing a change in update parameter of the dirty bit, explaining a synchronous process in the database system.
Figure 47:
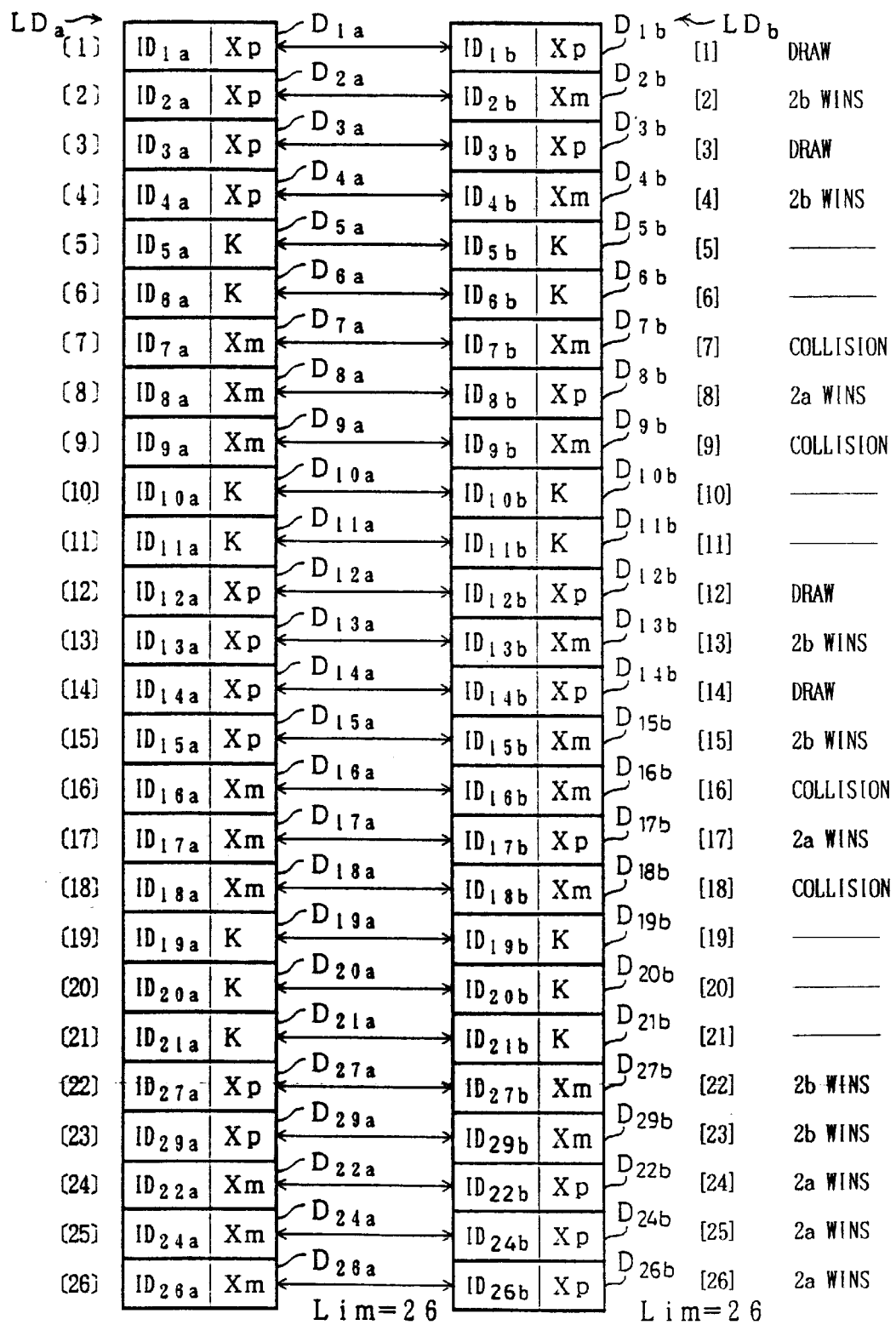
FIG. 47 is an explanatory drawing showing a priority judgment by the dirty bits, explaining a synchronous process in the database system.

Specifically, as shown in FIG. 46, the synchronize processing section 51 compares the dirty bits $D_{ab}$ and $D_{ba}$, and when the combination of the update parameters is (p-p), judges that it is not required to sent the contents of the tips T. Also, when the combination is (p-m), it is judged that the update parameter "m" has the priority so as to judge that the contents of the tips T should be sent from the information processing device 2 of the priority side to the information processing device 2 of the non-priority side. Thus, when the dirty bit lists LD have the values as shown in FIG. 44, a priority side is judged as shown in FIG. 47. Note that, in S54, when the combination is (m-m), that is, when the tips T have been updated on the both sides, a collision of tips T is judged. In such a case, as will be mentioned later, a priority side is determined by a predetermined priority rule, for example, by referring to information other than the dirty bits D, such as the contents of tips T (update time or predetermined keyfield), the side which has instructed the synchronous process, the side which has promoted sharing setting, or the side which has been set beforehand, or by asking the user. Note that, in the case where the tips T collide, the tip T of one party may be added to the sharing bag SF of the other party.

Figure 48:
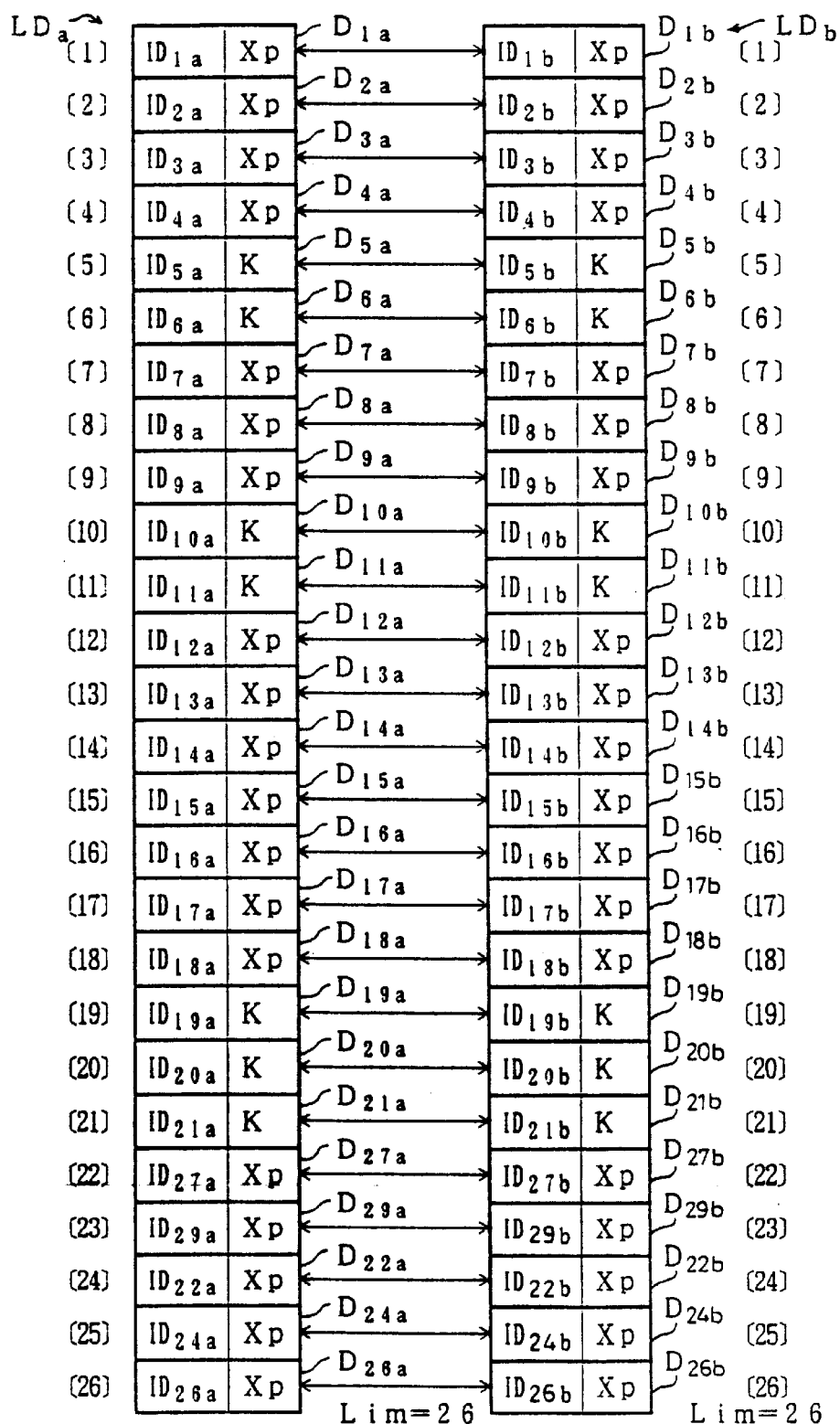
FIG. 48 is an explanatory drawing showing dirty bit lists after a data content synchronous process, explaining a synchronous process in the database system.

When the priority of the tips T is judged and it is decided that the contents of the tips T are required to be sent in S54, the synchronize processing section 51 in S55 sends the contents of the tips T on the priority side to the non-priority side so that the contents of the tip T on the non-priority side are replaced with the contents of the tip T-on the priority side. Thus, the contents of the tips on the both sides coincide and the update parameters of their respective dirty bits D are set to "p". As a result, as shown in FIG. 48, all the dirty bits D in the dirty bit lists LD are set to either "Xp" or "K".

Figure 49:
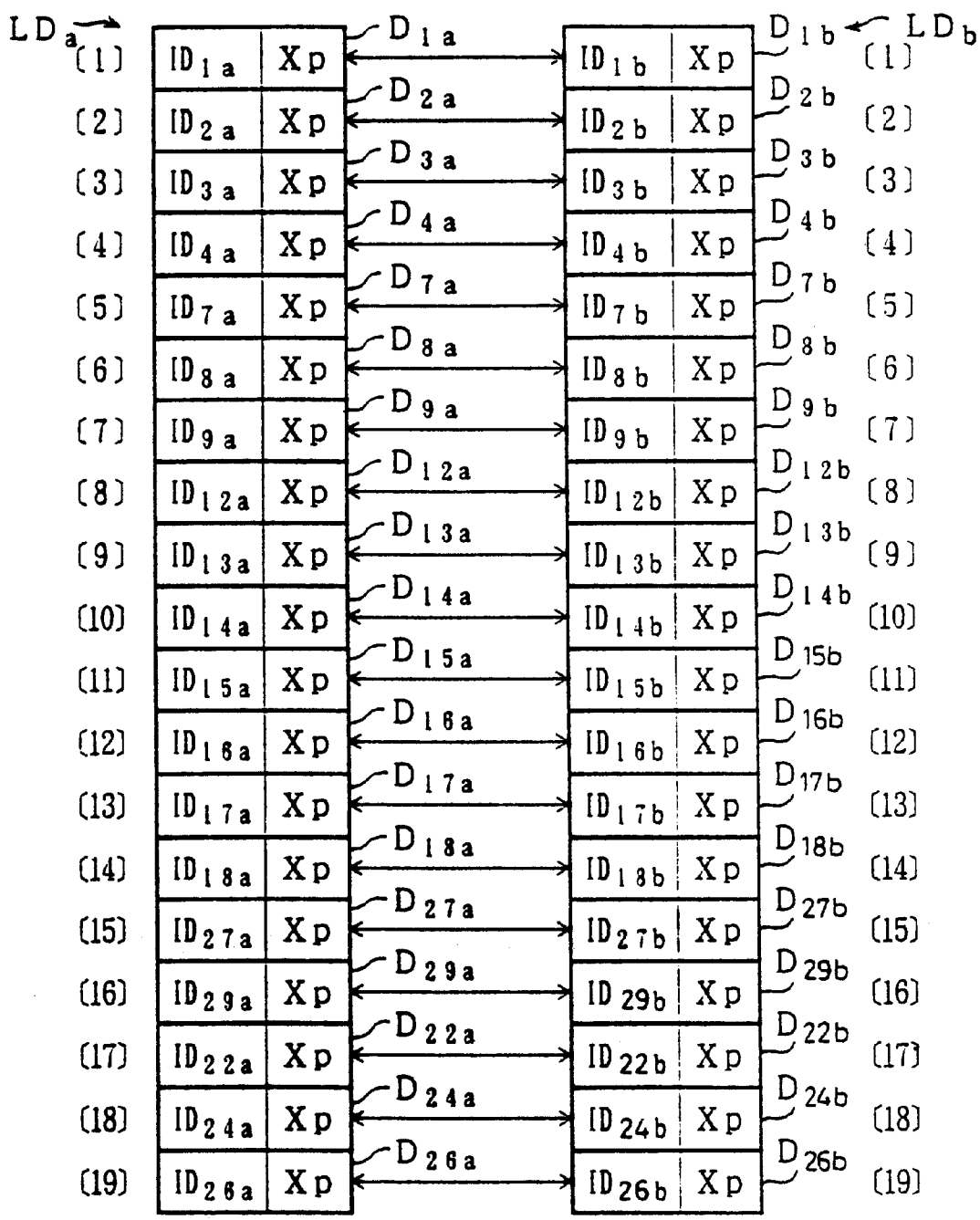
FIG. 49 is an explanatory drawing showing dirty bit lists which were further compressed after the data content synchronous process, explaining a synchronous process in the database system.

Then, when the tip synchronization is finished in S54 and S55, compression of the dirty bit lists LD is carried out in S56 on the both sides, and the dirty bits D having the value of "K" are deleted from their respective dirty bit lists LD. For example, in FIG. 48, seven dirty bits D on the 5th, 6th, 10th, 11th, 19th, 20th, and 21st positions are deleted from their respective dirty bit lists LD. As a result, as shown in FIG. 49, all the dirty bits D become "Xp" and the sink limit Lim is updated in accordance with the number of the dirty bits D. Note that, in the example of FIG. 49, even though the order of dirty bits D having the value of "Xp" is not changed, provided that the positions of associating dirty bits D are the same between the dirty bit lists LD on the both sides, the order may be changed.

By the synchronous process of S51 through S56, the number of tips T and the contents of associating tips T become the same between the sharing bags SF on the both sides. As a result, even when the database 1 is independently modified in one of the information processing devices 2, by carrying out the synchronous process at the time when the information processing devices 2 are ready to communicate, it is possible to find a coincidence in the sharing bags SF. Therefore, even when the database 1 is composed the information processing devices 2 which are brought into communications at different times, data can be matched properly.

Further, in the above synchronous process, before sending the contents of the tips T in S55, the dirty bits D are compared with each other between the information processing devices 2a and 2b in S53 and S54, and whether it is needed to send the contents, and transfer direction are determined per tip T. Thus, with regard to the tips T for which content transfer is judged to be unnecessary, content transfer can be omitted. Here, in the present embodiment, update of contents is monitored with respect to the tips T having the dirty bits D. Therefore, content transfer can be omitted with respect to not only the tips T which have been neither moved nor updated but also the tips T which have existed in the sharing bag SF in the previous synchronous process and are existing in the sharing bag SF in the current synchronous process and which have not been updated during the non-synchronous period.

Also, in the present embodiment, because the association of the tips T is stored as the order of dirty bits D, the association can be stored without storing IDs indicative of the tips T of the other party. Also, because the associating tips T can be specified without sending the IDs, it is possible to reduce the data volume transferred between the information processing devices 2a and 2b when sending and receiving the dirty bits D and also the memory space required for storing the dirty bits D.

Note that, in the present embodiment, the dirty bits D are created with respect to the tips T which have been contained even once in the sharing bag SF during a non-synchronous period. However, not limiting to this, as long as the dirty bits D are created with respect to the tips T which were contained in the sharing bag SF at the time the preceding synchronous process has finished, it is possible, as with the present embodiment, to omit sending of the contents of the tips T which were only moved as described above. As in the present embodiment, when also creating dirty bits D with respect to the tips T which are currently contained in the sharing bag SF, it is possible to increase the search speed for the tips T which were newly inserted during a non-synchronous period, and to create a list of tips T contained in the sharing bag SF from the tree structure of FIG. 7 by extracting only the tips T whose dirty bits D have the movement parameters of either "X" or "I". As a result, the lists of the tips T can be deleted, thereby reducing the memory space.

Note that, individual processes, for example, such as addition of tips T, may be carried out by the synchronize processing section 51 of either information processing device 2. For example, all processes may be carried out by the synchronize processing section 51 of one party, or they may be shared by the both parties.

Figure 50:
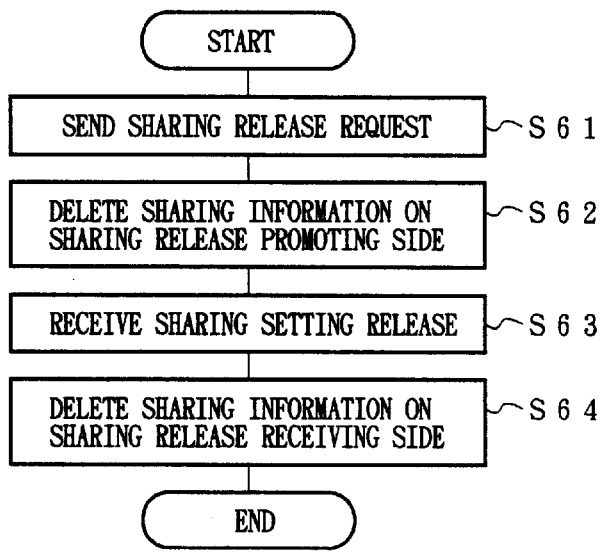
FIG. 50 is a flowchart explaining in detail how sharing is released in the database system.

The process in the non-synchronous period as shown in S2 of FIG. 16 and the described synchronous process of S3 are alternately repeated, and when the synchronous process is no longer required in the subsequent processes, the sharing setting is cancelled in S4. To explain a model (tip copying model) in which bags F and tips T remain in the both information processing devices 2a and 2b as an example of the sharing release. As shown in FIG. 50, a sharing release processing section 53 of the information processing device 2a in S61 sends a sharing release request to the sharing release processing section 53 of the information processing device 2b. The sharing release request includes information indicative of the sharing bags SF of the sending end, for example, such as a combination of its bag IDs and the IDs of the receiving end, and information indicative of the sharing bags SF of the receiving end, corresponding to the sharing bags SF of the sending end.

Further, the sharing release processing section 53 of the sharing release promoting side in S62 deletes sharing information prepared in the sharing setting, for example, such as dirty bit lists LD and the sink limit Lim in accordance with the combination of the bag IDs, and the bag IDs of the sharing partner registered in the sharing party list LS. In the information processing device 2b to be the sharing release receiving side, the sharing release processing section 53 deletes the sharing information stored therein based on the sharing release request received (S63, S64). Note that, in FIG. 50, the authentication of the sharing party is not shown. However, as with sharing setting, whether to release the sharing may be decided by the sharing release receiving side in accordance with the contents of the sharing release request.

As a result, the sharing bags $SF_a$ and $SF_b$, which had been shared between the information processing devices 2a and 2b become non-sharing bags $F_a$ and $F_b$, respectively. In the sharing release of the tip copying model, when sharing release is instructed, only the sharing setting between the sharing bags $SF_a$ and $SF_b$ is released and the tips T contained therein remain in the bags $F_a$ and $F_b$, respectively.

Note that, the model of sharing release is not just limited to the tip copying model and a variety of other models can be adopted. For example, releasing sharing setting, it is possible to adopt a model (tip unbalanced model) in which tips T are maintained in the bag F of one party whereas tips T are deleted in the bag F of the other party, or a model (tip erased model) in which tips T are deleted from the bags F of the both parties. In the tip copying model and the tip unbalanced model, sharing may be released after the synchronous process when sharing release is instructed. In such a case, the tips T can be matched at the time of the sharing release without particularly instructing the synchronous process. Also, when tips T are to be removed as in the tip unbalanced model and the tip erased model, an empty bag F, from which tips T have been removed, may be deleted. In any case, when the information processing device 2 can select a plurality of sharing release models, as with the model selection for deciding a priority side, it is preferable that the model of sharing release is set as an option at the time of the sharing setting in S1 of FIG. 16.

Note that, in the present embodiment, the associations are stored as the orders of the dirty bits D. However, not limiting to this, associating tips T may be specified, for example, by the information indicative of the tips T of the sharing partner, such as the tip ID. However, in this case, in the synchronous process, it is required to send out the tip ID of the sharing partner in addition to the dirty bits D, and thus potentially increasing transferred data volume.

Further, the data volume of the tip ID of the sharing partner is increased as the size of the database DB of the sharing partner becomes larger. Thus, in the case where the information processing devices 2 making up the database system 1 are not equivalent as exemplified in particular by the server/client model, the memory space required for storing associations is increased in the information processing device 2 for which reduction in memory space is strongly desired as in the device of the client side.

In contrast, in the present embodiment, the associations of tips T are stored as the order of information which relates to the tips T of each device, making it possible to store the associations regardless of the size of the database DB of the sharing partner and the storing method of tips T. As a result, the memory space required for storing associations can be reduced as compared with the case where tips T are specified by the information indicative of the tips T of the sharing partner, and it is also possible to reduce the data volume transferred in the synchronous process.

Further, in the present embodiment, the order of dirty bit D is stored in the form of the dirty bit list LD. However, not limiting to this, for example, a list indicative of order may be additionally provided with the dirty bit list LD, or information indicative of order may be stored together with dirty bits D per each tip T. However, the dirty bits D and order are prepared for each pair of the sharing bags SF, and it is often difficult to predict the number of sharing partners at the time when a database DB is created. Thus, it is preferable that the dirty bits D and order are prepared separately from the contents of the tips T. Nonetheless, when they are stored separately, it would require additional information indicative of corresponding tips T and required memory space is increased. Thus, to further reduce required memory space, associations are stored as the order of storing dirty bits D.

Second Embodiment

Figure 51:
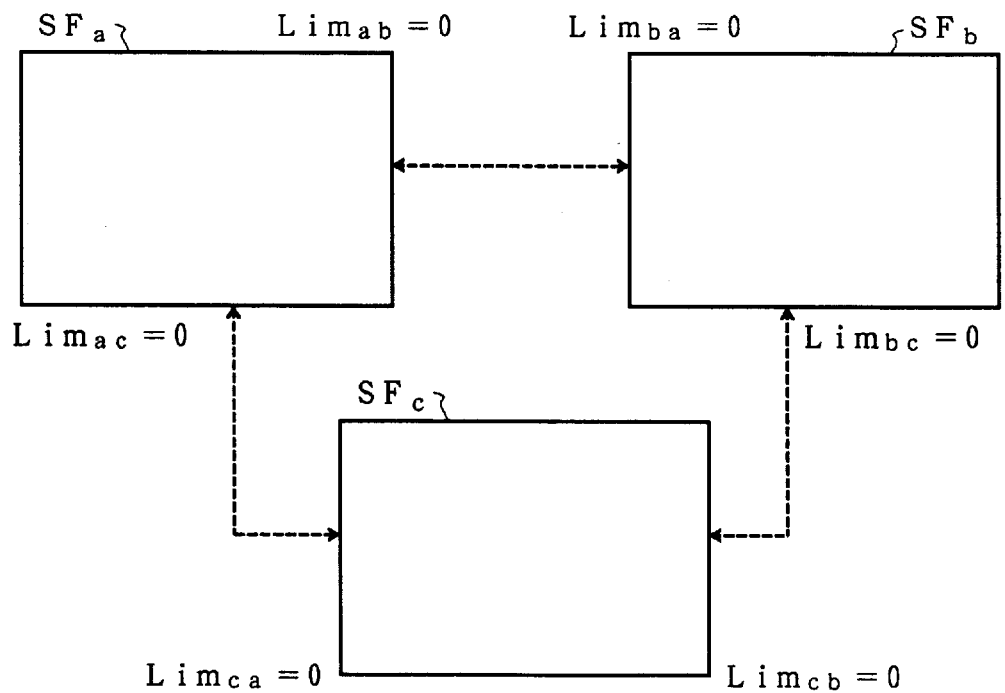
FIG. 51 is an explanatory drawing showing a state in which sharing between sharing bags is in the form of a loop in the database system.
Figure 52:
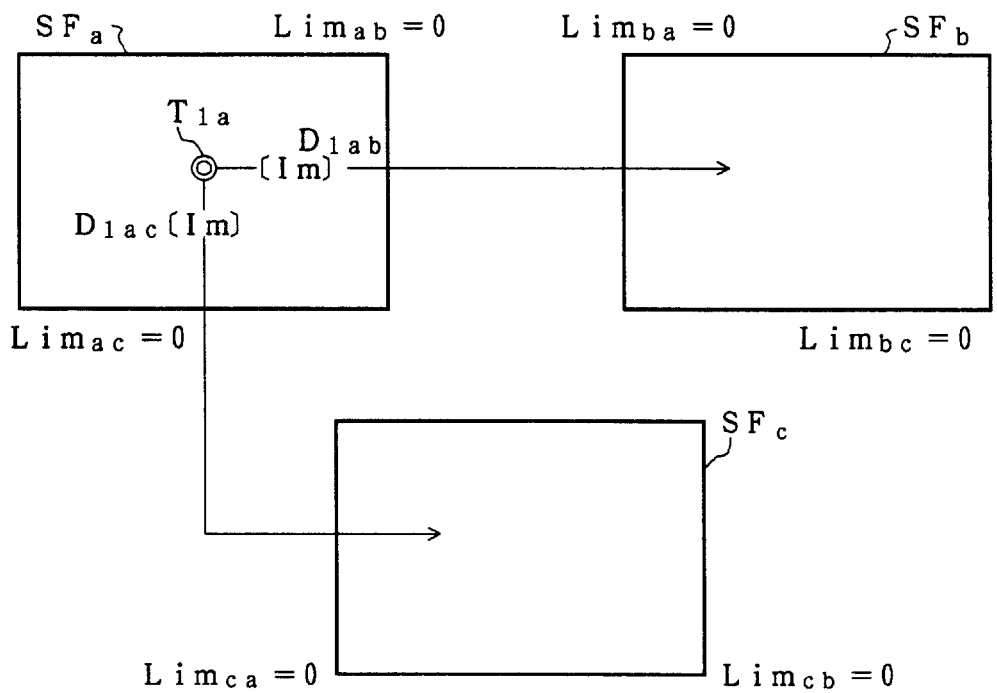
FIG. 52 is an explanatory drawing showing a case where a tip is added in one of the sharing bags of FIG. 51.
Figure 53:
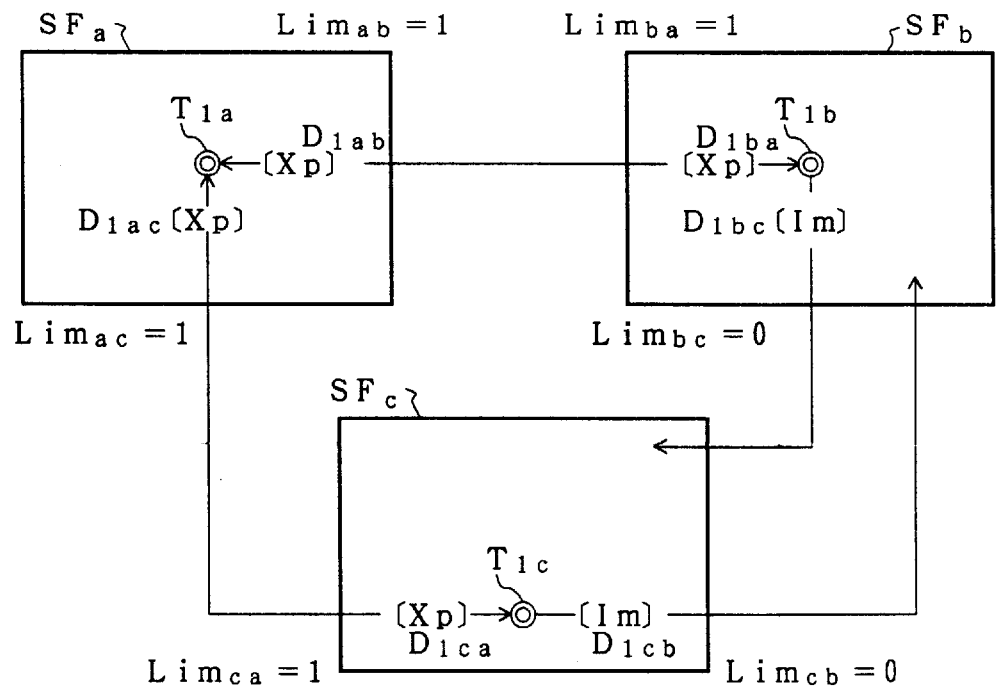
FIG. 53 is an explanatory drawing showing a synchronous process after FIG. 52.

In the database system 1 as described above, tips T are associated with each other only between two sharing bags SF, and thus when sharing is set in the form of a loop, the following problem might occur. Namely, in the database system 1, as shown in FIG. 51, because sharing is set in pairs, between sharing bags $SF_a$ and $SF_b$, between sharing bags $SF_b$ and $SF_c$, and between sharing bags $SF_c$ and $SF_a$, as shown in FIG. 52, when tip $T_{1a}$ is added to the sharing bag $SF_a$ and by the subsequent synchronous processes between the sharing bag $SF_a$ and the sharing bag $SF_b$ and between the sharing bag $SF_a$ and the sharing bag $SF_c$, as shown in FIG. 53, tip $T_{1b}$ ($T_{1c}$) having the same contents as that of the tip $T_{1a}$ is added to the sharing bag $SF_b$ ($SF_c$). Here, the sink limits $Lim_{ab}$ and $Lim_{ba}$ and sink limits $Lim_{ac}$ and $Lim_{ca}$ all become "1", and the dirty bits $D_{1ab}$ and $D_{1ba}$ and dirty bits $D_{1ac}$ and $D_{1ca}$ all become "Xp" indicative of Still/Maintain.

Here, as a result of the synchronous process, tips $T_{1b}$ and $T_{1c}$ have been added to the sharing bags $SF_b$ and $SF_c$, respectively, and at this stage, no synchronous process has been carried out between the sharing bags $SF_b$ and $SF_c$. Thus, the dirty bits $D_{1bc}$ and $D_{1cb}$ of the sharing bags $SF_b$ and $SF_c$ are both set to "Im" indicative of Insert/Update. Further, because the tips $T_{1b}$ and $T_{1c}$ are independently added to the sharing bags $SF_b$ and $SF_c$, respectively, the sink limits $Lim_{bc}$ and $Lim_{cb}$ in their respective dirty bit lists $LD_{bc}$ and $LD_{cb}$ are unchanged from "0".

Figures 54, 55:
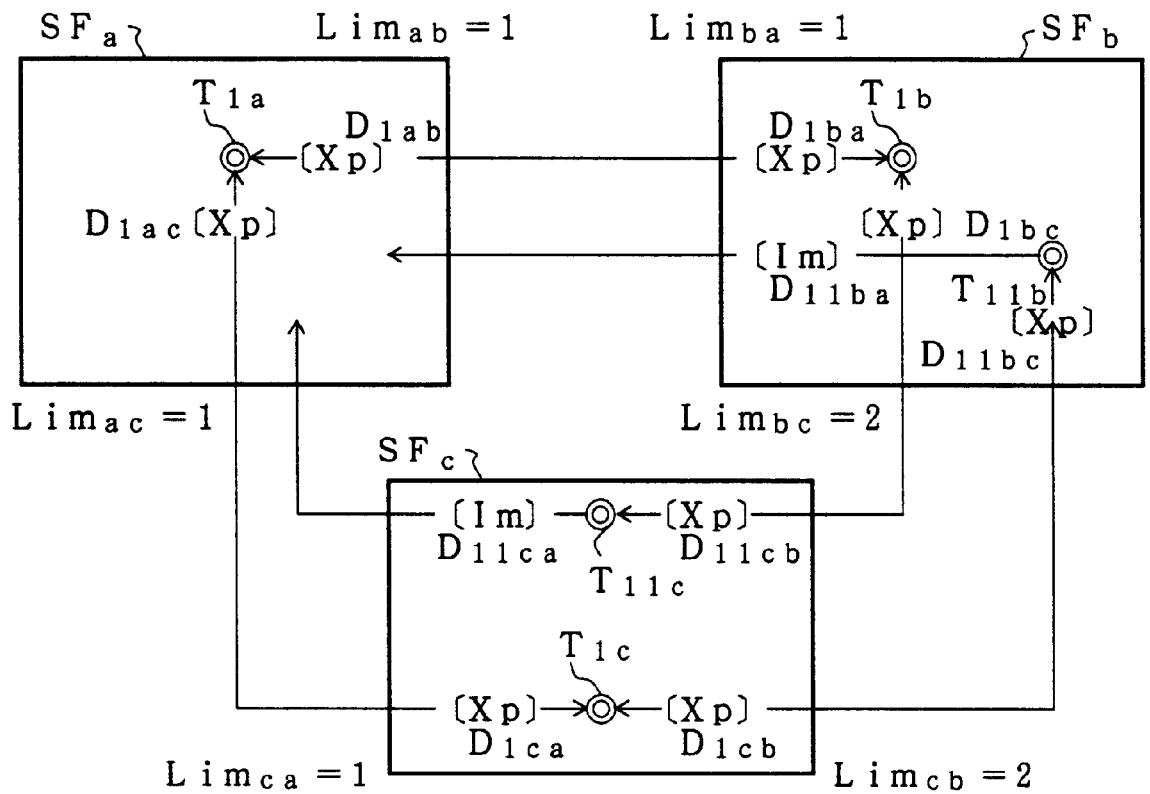
FIG. 54 is an explanatory drawing showing a further synchronous process after FIG. 52.
FIG. 55 is an explanatory drawing showing a format of a sink ID in a database system in accordance with another embodiment of the present invention.
Figure 56:
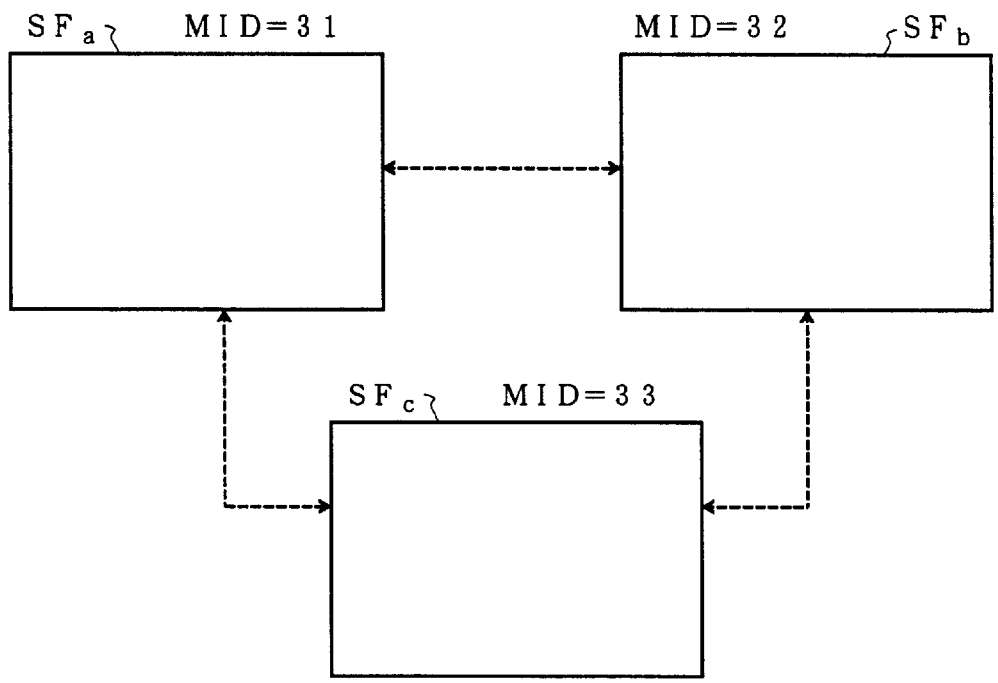
FIG. 56 is an explanatory drawing showing a state where sharing between sharing bags is in the form of a loop in the database system.

When the synchronous process is carried out between the sharing bags $SF_b$ and $SF_c$ in this state, because the dirty bit $D_{1bc}$ ($D_{1cb}$) is placed after the sink limit $Lim_{bc}$ ($Lim_{cb}$), the tips $T_{1b}$ and $T_{1c}$ are regarded as tips T which have not been associated with, i.e., tips T which have been added independently to the information processing devices 2b and 2c during a non-synchronous period. As a result, as shown in FIG. 54, the synchronize processing section 51 of the information processing device 2b adds to the sharing bag $SF_b$ tip $T_{11b}$ having the same contents as that of tip $T_{1c}$, and the synchronize processing section 51 of the information processing device 2c adds to the sharing bag $SF_c$ tip $T_{11c}$ having the same contents as that of the tip $T_{1b}$, regardless of the fact that the tips $T_{1b}$ and $T_{1c}$ associated with the same tip $T_{1a}$.

Here, while the sharing bags $SF_b$ and $SF_c$ are synchronized with each other where the tips $T_{11b}$ and $11_{11c}$ are added, they are not synchronized with the sharing bag $SF_a$. Thus, the dirty bits $D_{11ba}$ and $D_{11ca}$ are set to "Im" indicative of Insert/Update, and they are placed after sink limits $Lim_{ba}$ and $Lim_{ca}$. As a result, when the synchronous process is carried out in a pair between the sharing bags $SF_b$ and $SF_a$ (or between sharing bags $SF_c$ and $SF_a$), a tip T having the same contents as that of tip $T_{11b}$ ($T_{11c}$) is added to the sharing bag $SF_a$ in the same manner as above.

Thus, in the arrangement of the database system 1, when sharing is set in the form of a loop, tips T are duplicated in every synchronous process and tips T in each sharing bag SF have a potential danger of proliferation.

In contrast, in a database system 6 in accordance with the present embodiment, each tip T is given a sink ID (SID) which is common between associating tips T and is different between tips T which are not associated with each other so as to solve the problem of proliferating tips T. In the following, an association method using SID will be referred to as a star model to distinguish it from the association method using only the sink tag (pair model). Note that, the elements of the database system in accordance with the present embodiment are the same as those of the database system 1, and the only difference is the method of storing associations and the operation of the synchronous process, and thus elements having the same functions will be given the same reference numerals and explanations thereof are omitted here.

Specifically, to manage SID given to each tip T, the tip managing section 51 stores SID, for example, as shown in FIG. 55, as a combination of a distinct number (device number MID) for identifying an information processing device 7 and a distinct number (tip number) which is given to each tip T of the information processing device 7. Here, all information processing devices 7 which may be subjected to a synchronous process are given different values of device number MID in advance, and thus by giving a distinct tip number to each tip T of the device, the information processing device 7 can create SIDs which are distinct in the database system 6 even in a non-synchronous period. Note that, the tip managing section 31 in accordance with the present embodiment corresponds to data managing number storing means and data managing number setting means of the claims.

To the tip T newly added in a sharing bag SF by an instruction of the user, the tip addition processing section 42 adds a value as a tip number of the SID which is different from the tip number of any of other tips T in the information processing device 7. Further, the synchronize processing section 51 judges association of tips T based on their SIDs, in addition to or in replacement of the sink tag, and adds to a tip T which was added by the synchronous process the same SID value as that of the original tip T.

Figure 57:
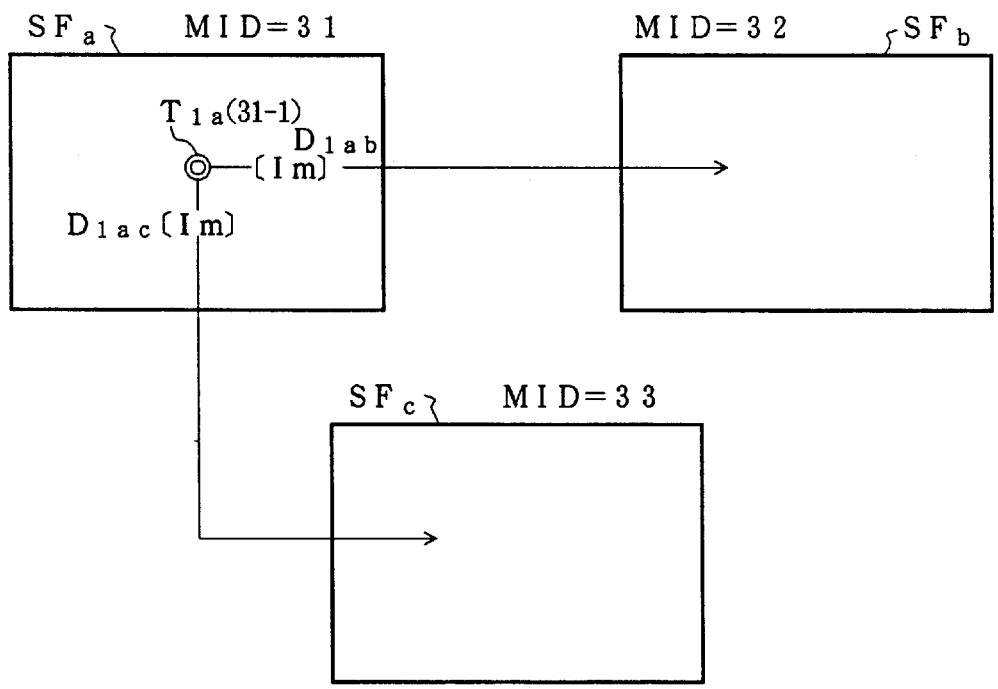
FIG. 57 is an explanatory drawing showing a state in which a tip is added in one of the sharing bags of FIG. 56.

In the database system 6 of the foregoing arrangement, as in FIG. 52, when a new tip $T_{1a}$ is added to the sharing bag $SF_a$, as shown in FIG. 57, the tip addition processing section 42 sets the value of the dirty bits $D_{1ab}$ and $D_{1ac}$ corresponding to the tip $T_{1a}$ to "Im" indicative of Insert/Update. Also, as an SID of the tip $T_{1a}$, its device number MID ("31" in this example) and a tip number ("1" in this example) which is different from the tip number of any other tips T of the device are given. Note that, in FIG. 57, SID is shown in brackets as in "(31-1)".

Figure 58:
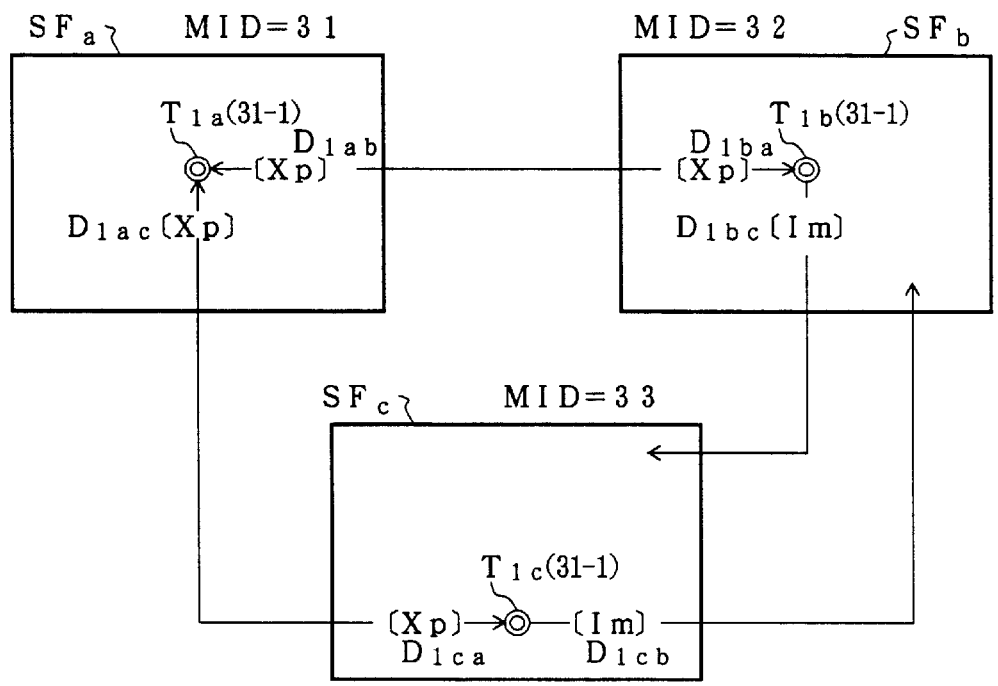
FIG. 58 is an explanatory drawing showing a synchronous process after FIG. 57.

Here, as in FIG. 53, when the synchronous process is carried out between sharing bags $SF_a$ and $SF_b$ and between sharing bags $SF_a$ and $SF_c$, as shown in FIG. 58, tip $T_{1b}$ and tip $T_{1c}$ are created in the sharing bags $SF_b$ and $SF_c$, respectively, as the tips T having the same contents as that of the tip $T_{1a}$. Also, as in FIG. 53, the dirty bits $D_{1ab}$, $D_{1ba}$, $D_{1ac}$, and $D_{1ca}$ are set to "Xp", and the dirty bits $D_{1bc}$ and $D_{1cb}$ are set to "Im". However, in the present embodiment, unlike FIG. 53, the SIDs of the tips $T_{1b}$ and $T_{1c}$ are set to the same SID value (31-1 in this example) as that of the tip $T_{1a}$.

Here, when the sharing bags $SF_b$ and $SF_c$ are brought into the synchronous process, the process as described in FIG. 38 is carried out. However, in the present embodiment, when adding a new dirty bit D to the dirty bit list LD in S52, the SIDs are compared and when a dirty bit D having the same SID has already been included in the dirty bit list LD, the dirty bits D are judged to be in association with each other and the dirty bit D is not added. The dirty bit D is added only when there are no dirty bits D having the same SID.

For example, in FIG. 58, the SID of the tip $T_{1b}$ and the SID of the tip $T_{1c}$ have the same value (31-1). Thus, the synchronize processing section 51 of the information processing device 2b (2c) does not add the dirty bit $D_{1cb}$ ($D_{1bc}$) to the dirty bit list $LD_{bc}$ ($LD_{cb}$). Note that, in the present embodiment, because the sink tag is also employed, the dirty bits $D_{1bc}$ and $D_{1cb}$ are placed in the same position in their respective dirty bit lists $LD_{bc}$ and $LD_{cb}$.

Figure 59:
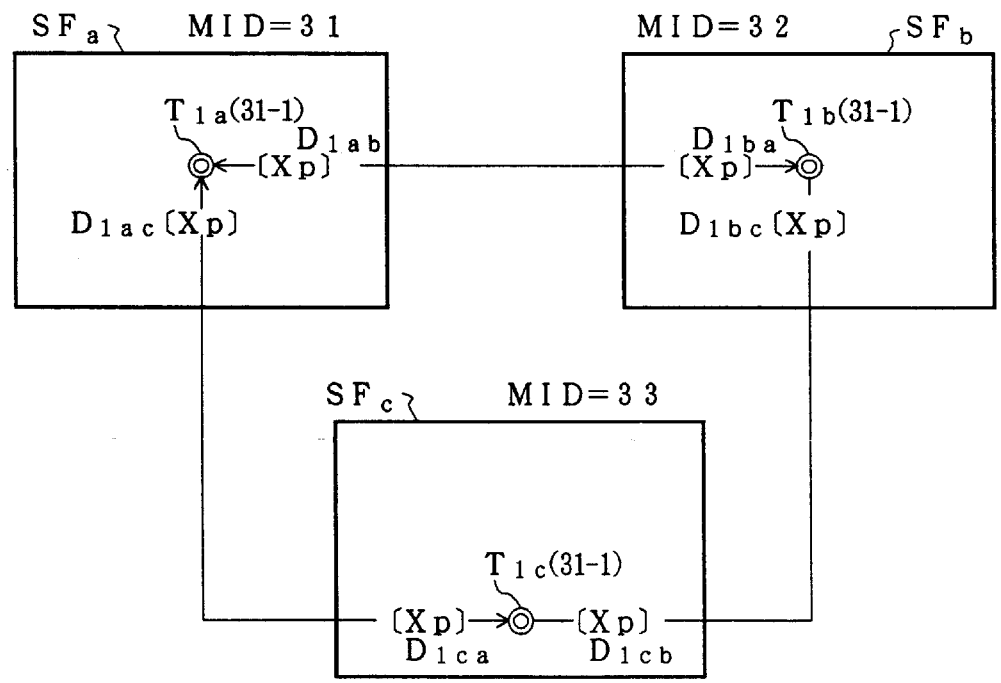
FIG. 59 is an explanatory drawing showing a further synchronous process after FIG. 58.

Thereafter, the process after S53 is carried out, and as shown in FIG. 59, the contents of the sharing bags $SF_b$ and $SF_c$ become the same. In the present embodiment, as long as SIDs are the same, even a tip T which was added during a non-synchronous period is regarded as a tip T having an association and it is not added. Thus, unlike FIG. 54, even when sharing is set in the form of a loop, the problem of proliferating tips T does not occur and unnecessary increase in data volume in the database DB can be prevented, thus reducing the memory space required for each information processing device 2 and the volume of data transferred in the synchronous process.

The information processing device 2 only needs to maintain SID of each tip T during sharing of the sharing bags SF, and after the release of sharing in S4 of FIG. 16, it is not required to maintain SID. However, considering the case where sharing may be set again after it was once released, it is preferable, when there is enough memory space, that the information processing device 2 maintains the SID of each tip T even after sharing is released and uses this SID as the SID of the tip T when sharing is set again.

Note that, in the foregoing description, as with the First Embodiment, associating tips T are stored in such a manner that the positions of their dirty bits D are the same in their respective dirty bit lists LD. However, without limiting to this arrangement, it is possible alternatively, for example, to store dirty bits D in arbitrary positions provided that SIDs of associating tips T are compared to judge if they are associated with each other indeed. However, by storing dirty bits D in the same positions as with the First Embodiment, it is possible to reduce the data volume transferred or processed during the synchronous process.

Third Embodiment

As described in the Second Embodiment, the problem of proliferating tips T can be solved by associating the tips T using the star model. However, as described below, depending on the method of deciding a priority side, the contents of tips T may be transferred back and forth between information processing devices 7 in the synchronous processes even after a coincidence is found in the contents of associating tips T.

Specifically, as shown in FIG. 58, when the synchronous process is carried out between the sharing bags $SF_a$ and $SF_b$ and between the sharing bags $SF_a$ and $SF_c$ but not between the sharing bags $SF_b$ and $SF_c$, the dirty bit $D_{1bc}$ of the tip $T_{1b}$ and the dirty bit $D_{1cb}$ of the tip $T_{1c}$ are both set to "Im" indicative of Insert/Update in accordance with the dirty bit $D_{1ba}$ and the dirty bit $D_{1ca}$.

Here, when the sharing bags $SF_b$ and $SF_c$ are brought into the synchronous process, in the bag synchronous process in S53 of FIG. 38, the tip $T_{1b}$ ($T_{1c}$) is placed in the sharing bag $SF_b$ ($SF_c$), and the dirty bits $D_{1bc}$ and $D_{1cb}$ are both set to "Xm" indicative of Still/Update. Thus, in the priority judging in S54, it is judged that the tips $T_b$ and $T_c$ have been independently updated, i.e., a collision is judged, and a priority side is judged in accordance with predetermined rules, for example, such as judgment by a predetermined information processing device 7 or by an information processing device 7 which has promoted sharing setting, or judgment by the last updated time of the tips T. For example, when a priority is given to the tip $T_{1c}$ over tip $T_{1b}$, in the content synchronization in S55, the contents of the tip $T_{1c}$ is transferred from the information processing device 7c to the information processing device 7b. As a result, the contents of the tip $T_{1b}$ is updated to be the same as that of the tip $T_{1c}$, and the values of the dirty bits $D_{1bc}$ and $D_{1cb}$ are set to "Xp" indicative of Still/Maintain.

Figure 60:
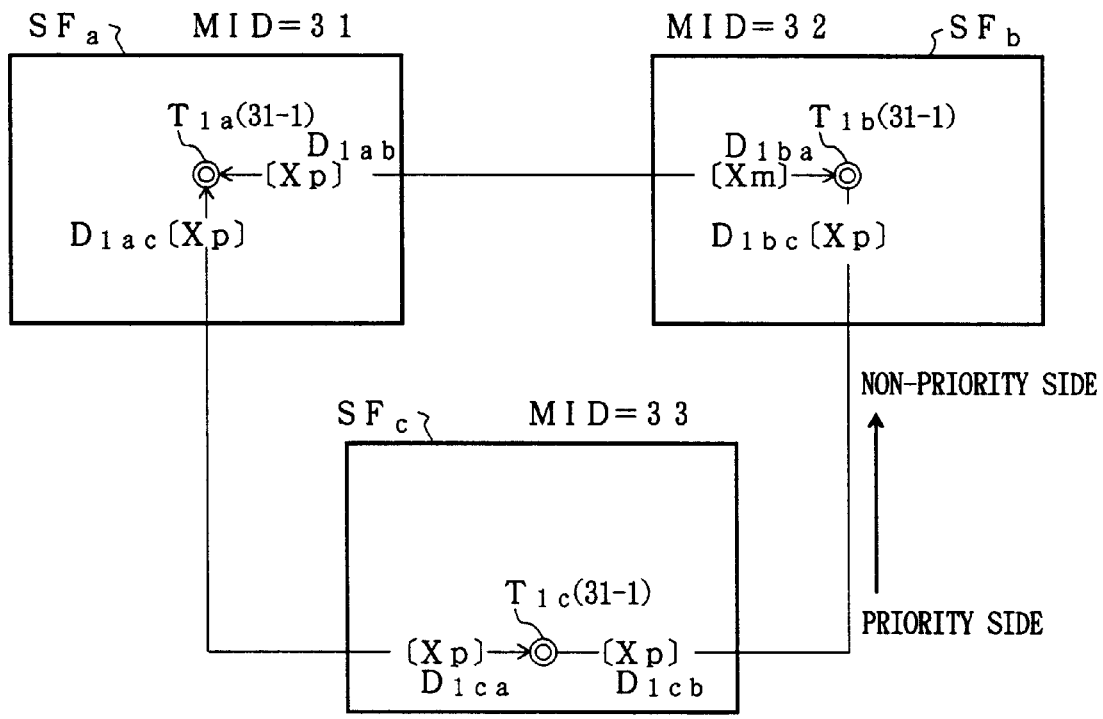
FIG. 60 is an explanatory drawing showing how update of a dirty bit is transferred in the database system.

However, as described, a change in dirty bit D is transferred to other dirty bit lists LD, and as shown in FIG. 60, the dirty bit $D_{1ba}$ which relates to the sharing bag $SF_a$ is changed to "Xm" in the information processing device 7b. As a result, by the synchronous process between the sharing bags $SF_a$ and $SF_b$, not only the contents of the tip $T_{1b}$ are transferred again to the information processing device 7a but also the dirty bit $D_{1ac}$ which relates to the sharing bag $SF_c$ is changed in the information processing device 7a.

As a result, despite the fact that the contents of the tips T are the same, the contents of the tips T are transferred in the synchronous process, and a change in dirty bit D is transferred one after another, increasing the data volume transmitted or processed during the synchronous process. Note that, in the following, the former problem will be referred to as the problem of matching judgment in a looping sharing relationship, and the latter problem will be referred to as the problem of updated information transfer in a looping sharing relationship.

In order to solve the problem of updated information transfer in a looping sharing relationship, the present embodiment describes a database system 8 in which an information processing device 9 makes judgment as to whether the contents of tips T are the same before transferring a change in dirty bit D in a synchronous process to another dirty bit D.

Figure 61:
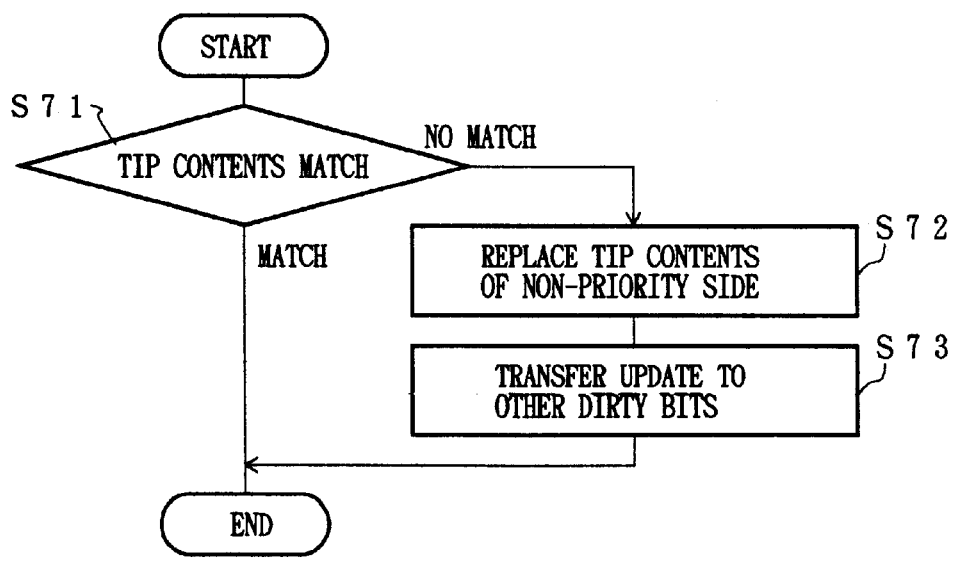
FIG. 61 is a flowchart showing an operation in the transfer of update of a dirty bit in the database system, showing yet another embodiment of the present invention.

Specifically, in the information processing device 9 in accordance with the present embodiment, as shown in S71 in FIG. 61, the synchronize processing section 51 judges in S55 in FIG. 38 whether a tip T (e.g. tip $T_{1c}$) which has been sent to and a tip T (e.g. tip $T_{1b}$) which already exists are the same. When it is judged in S71 that the tips T are different, the synchronize processing section 51 in S72 replaces the contents of the preexisting tip T with the contents of the tip T which has been sent, and in S73 changes a dirty bit D (e.g., $D_{1ba}$) corresponding to the pre-existing tip T. On the other hand, when the tips T are judged to be the same in S71, S72 and S73 are not carried out and the dirty bit D is not changed. Note that, the dirty bits $D_{1ab}$ and $D_{1ba}$ relating to the synchronous process are set to "Xp" indicative of Still/Maintain regardless of whether they coincide or not.

Figure 62:
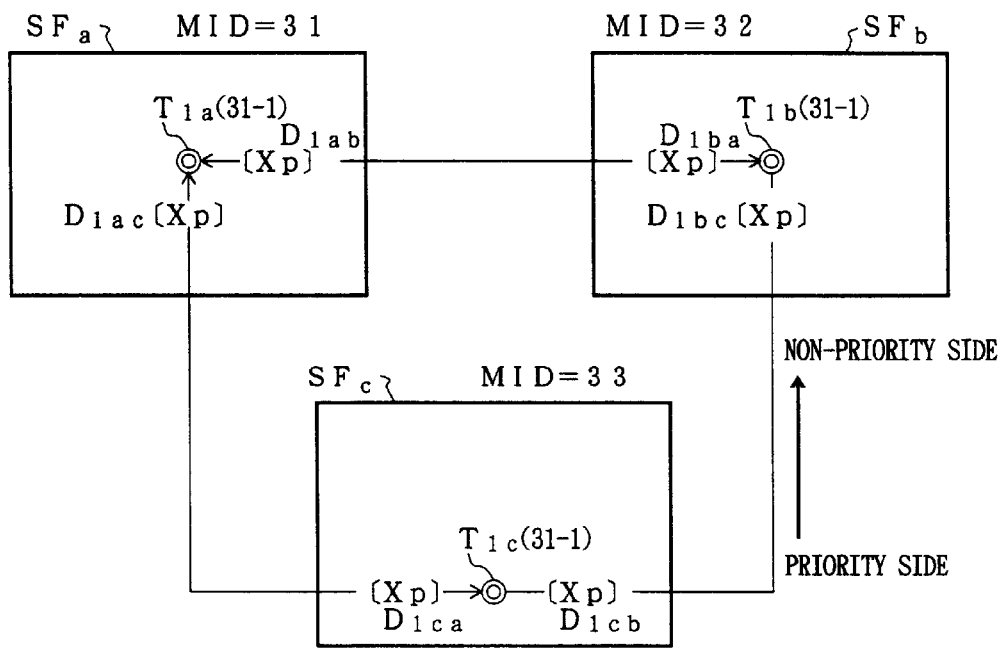
FIG. 62 is an explanatory drawing showing how update of a dirty bit is transferred in the database system.

Thus, for example, when the synchronous process is carried out between the sharing bags $SF_b$ and $SF_c$ in the state as shown in FIG. 5, even though the tip $T_{1c}$ has the priority over the tip $T_{1b}$, as shown in FIG. 62, the dirty bit $D_{1ba}$ which relates to the sharing bag $SF_a$ is maintained at "Xp".

In this manner, in the information processing device 9 in accordance with the present embodiment, when the contents of the tips T are the same between the priority side and the non-priority side, the dirty bit D of the tip T which was judged to be the non-priority side is not transferred to devices in different sharing relationships. Thus, the above problem of updated information transfer in a looping sharing relationship can be avoided and in the synchronous process it is possible to reduce data volume transferred between information processing devices 9 and also data volume processed in each information processing device 9.

The judgment for deciding whether the contents of the tips T are the same in S71 may be based on, for example, all the contents of the tips T. However, to reduce data volume transferred in the synchronous process, it is preferable, for example, that the judgment be based upon comparison of partial contents of the tips T, such as last updated time or last update party, or update ID, which is set to have a different value for every update.

Figure 63:
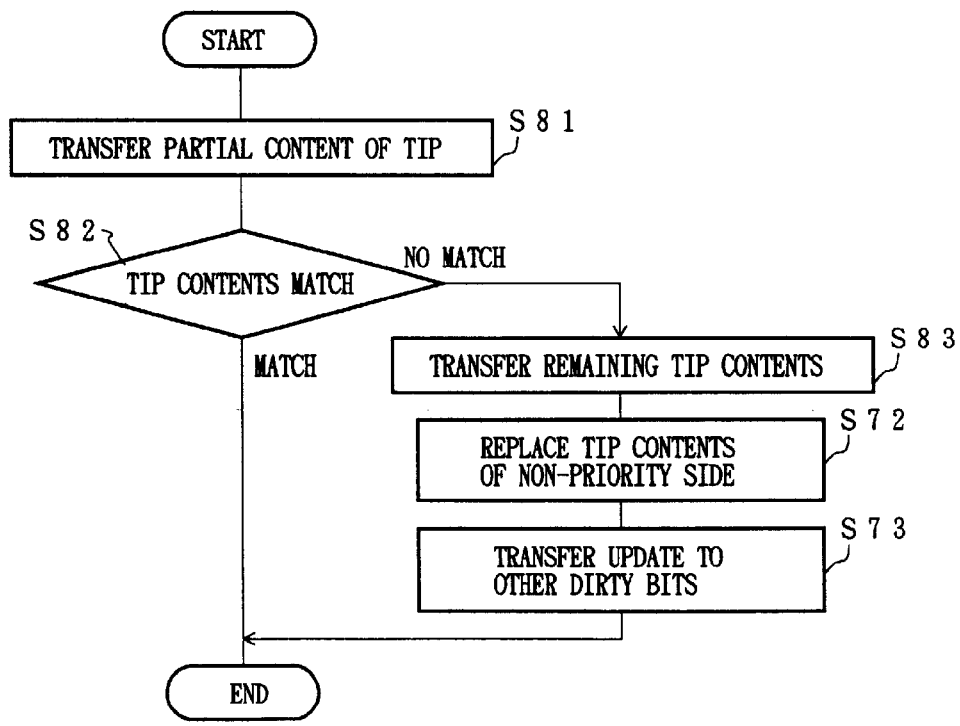
FIG. 63 is a flowchart showing an operation of the transfer of update of a dirty bit, showing a modification example of the database system.

In this case, as shown in FIG. 63, a partial content of the tip T is transferred by the synchronize processing section 51 in advance in S81 and it is brought into comparison in S82. Remaining contents are transferred in S83 only when the tips T did not coincide in S82, and as in S72 and S73, the contents of the tip T and the dirty bit D are updated. On the other hand, when the tips T are judged to be the same in S82, the synchronize processing section 51 does not transfer the remaining contents. As a result, it is possible to solve not only the problem of updated information transfer in a looping sharing relationship but also the problem of matching judgment in a looping sharing relationship, thus reducing transferred data volume required for matching judgment in the synchronous process and improving transfer efficiency in the synchronous process.

Figures 66, 67:
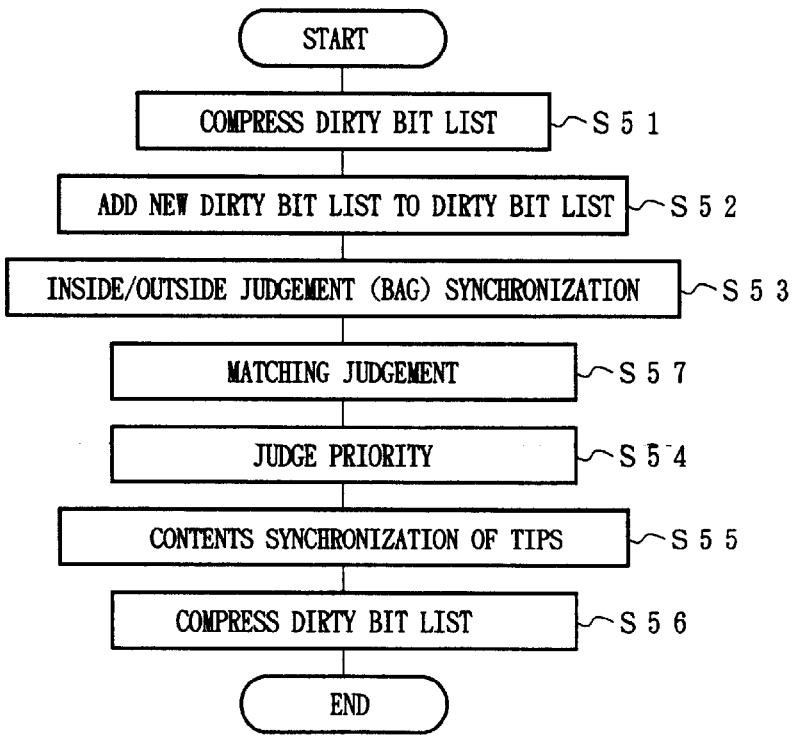
FIG. 66 is an explanatory drawing showing a process and transfer direction of tips when the database system employs update ID as a reference for matching judgment.
FIG. 67 is a flowchart showing the entire synchronous process, showing yet another modification example of the database system.

For example, when matching judgment is based on the last updated time, as indicated by Time 7:00 in FIG. 64, transfer of tips T is omitted when the last updated times are the same between the parties at the time of the synchronous process. Note that, here, the database managing section 23 corresponds to last updated time storing means of the claims. Meanwhile, when matching judgment is based on the last update party, as indicated by Time 7:00 in FIG. 65, transfer of tips T is omitted when the last update parties are the same between the parties at the time of the synchronous process. In the same manner, when matching judgment is based on update ID which is set to have a different value for every update, for example, such as a value which increases by a certain increment in every update, as indicated by Time 7:00 in FIG. 66, transfer of tips T having the same update ID at the time of the synchronous process is omitted. Here, the database managing section 23 corresponds to update identification information storing means of the claims.

Here, by the addition of information such as the last updated time, last update party, or update ID, the memory space required for the information processing device 9 is increased. However, the data volume of these information is sufficiently small as compared with the contents of the tips T and it does not pose much of a problem. Further, these information is updated in accordance with any modification on tips T in a non-synchronous period, which increases the data volume processed in each information processing device 9. However, as described, because the transfer rate through communication lines used in the synchronous process is considerably slower than the access rate within a device in a non-synchronous period, the overall processing time can be reduced.

Further, when the partial content is the last update party, i.e., when only the information processing device 9 (or its user) which first added "m" as an update parameter of the dirty bit D is used, even when update was made for a number of times by the same person, they cannot be distinguished from one another. Meanwhile, the last updated time and update ID are independently set for each information processing device 9, and thus they might have the same value when they are updated independently between different information processing devices 9. Therefore, rather than using these parameters by themselves, it is more preferable that they are used in combination of two parameters, for example, between the last updated time and last update party, between the last updated time and update ID, or between the last update party and update ID which is independently added per update party, or, alternatively, in combination of three parameters. Note that, when using only one parameter, last updates time is preferable to reduce memory space. In this case, update may be made at the same time; however, if the time is set accurately in seconds, matching judgment of tips T can be made accurately, which is sufficient for practical applications.

When matching judgment as in S71 and S82 is to be based on partial contents of tips T, the judgment is to be made before all the contents of the tips T are transferred so as to reduce transferred data volume. Further, as shown in S57 of FIG. 67, it is preferable that the matching judgment be made before the priority judgment (S54) in FIG. 41. In this way, the process of judging a priority side can be omitted entirely at the time when a coincidence is found, thus further reducing the processed data volume during the synchronous process.

Fourth Embodiment

The present embodiment describes a database system 10 for solving the problem of updated information transfer in a looping sharing relationship, in which an information processing device 11 adds information of last update party to each tip T, and a dirty bit D is not transferred to the device of the last update party.

In the present embodiment, a partial content of the tip T includes information of last update party, and when contents of the tip T are changed by modification during a non-synchronous period, a tip update processing section 41 of the information processing device 11 sets the information of last update party of the tip T stored in the tip managing section 31 to a value indicative of the device, for example, such as the device number MID. Note that, in the present embodiment, the tip managing section 31 corresponds to update party storing means of the claims.

With this arrangement, as with the Second Embodiment, when the sharing bags $SF_b$ and $SF_c$ are brought into the synchronous process after the synchronous process between the sharing bags $SF_a$ and $SF_b$ and between the sharing bags $SF_a$ and $SF_c$, as shown in FIG. 60, the dirty bit $D_{1ba}$ which relates to the sharing bag $SF_a$ is changed to "Xm" in the information processing device 11b.

Figure 68:
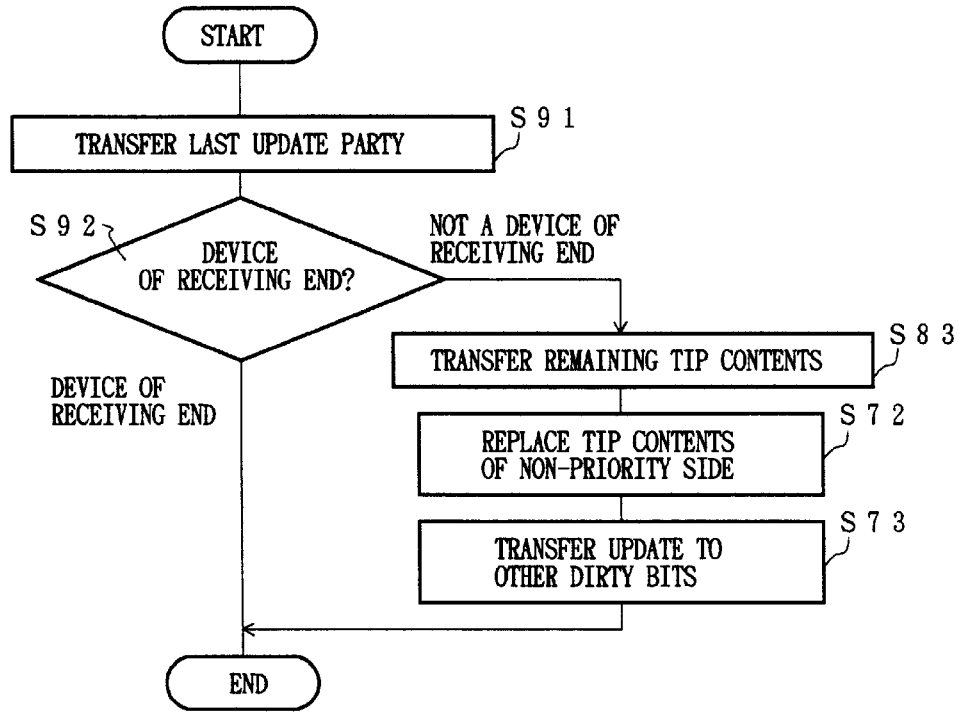
FIG. 68 is a flowchart showing an operation of transferring update of a dirty bit in the database system, showing yet another embodiment of the present invention.

However, unlike the Second Embodiment, each of the tips $T_{1a}$ to $T_{1c}$ stores information of last update party (e.g., 31) as a partial content, and as shown in FIG. 68, the synchronize processing section 51 in S92 compares the information of last update party with that of the sharing partner sent in S91. When the information of last update party of the sending end indicates the device of the receiving end, the modification to the tip T has already been reflected in the dirty bit D. Thus, even when the dirty bit D is changed in the synchronous process, the dirty bits D which relates to other sharing bags SF are not changed. In particular, when the information of last update party indicates the device of the receiving end and when the tip T of the device of the receiving end has not been updated in a non-synchronous period, it means that the tips T are the same between the sending end and the receiving end, and thus transfer of tip contents can be omitted entirely. Note that, if the judgment in S92 is such that the information of last update party does not indicate the device of the receiving end, the processes of S83, and S72 and S73 are carried out, and all the contents of the tip T are transferred and a change in dirty bit D is transferred to the dirty bits D which relates to other sharing bags SF.

Figure 69:
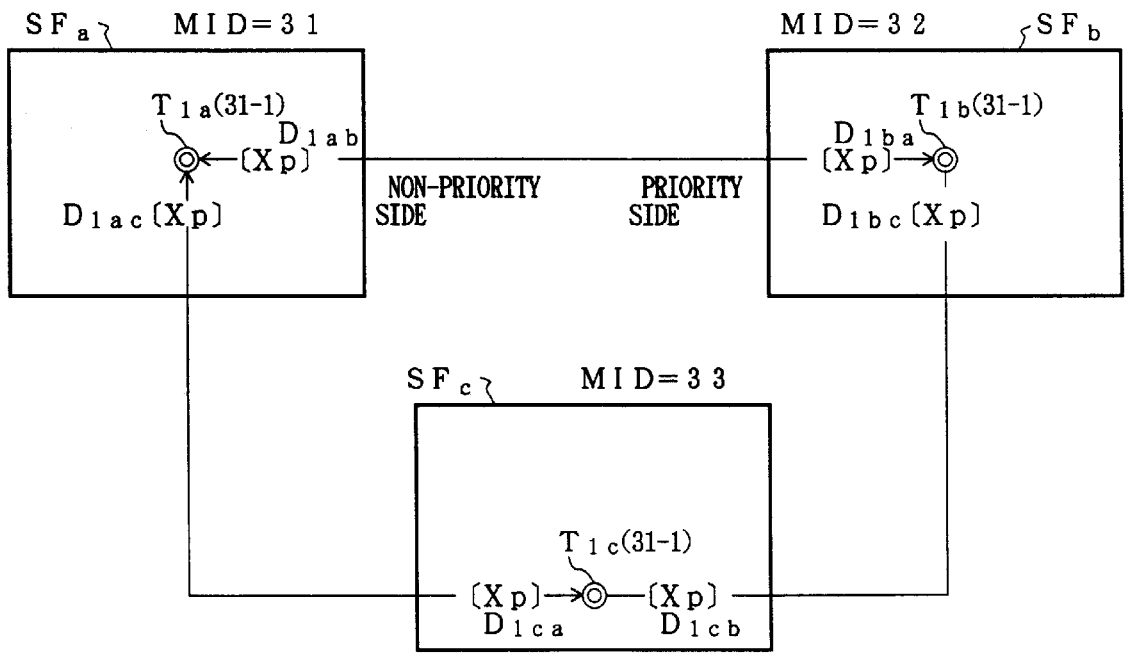
FIG. 69 is an explanatory drawing showing transfer of update of a dirty bit in the database system.

As a result, even when the synchronous process is carried out between the sharing bags $SF_a$ and $SF_b$ in the state as shown in FIG. 63 for example, the synchronize processing section 51 of the information processing device 11a, as shown in FIG. 69, does not transfer the change in dirty bit $D_{1ab}$ to the dirty bit $D_{1ac}$ and the dirty bit $D_{1ac}$ is maintained at "Xp".

Thus, even when the sharing relationships are in the form of a loop, it is ensured that transfer of dirty bit D is stopped in the information processing device 11 of the last update party, preventing further transfer. As a result, the problem of updated information transfer in a looping sharing relationship can be solved, thus reducing data volume transferred during the synchronous process.

Further, in this case, unlike the Third Embodiment, even when one of the information processing devices 11 fails to stop transfer of dirty bit D, it can be stopped in the information processing device 11 of the last update party. Thus, for example, even when there is an information processing device which cannot stop transfer of dirty bit D in the database system 10, it can be stopped by the other information processing devices 11. Thus, for example, when the database system 10 includes an information processing device which cannot update data, this information processing device does not need to stop transfer of dirty bit D, thus simplifying operation.

Fifth Embodiment

The Fourth Embodiment described the case where the tips T includes information of last update party. However, the problem of updated information transfer in a looping sharing relationship can also be solved by the arrangement of the present embodiment as described below, that is, by having a list (transfer list) of all the information processing devices through which information has been transferred after the last update party, and by preventing transfer of dirty bit D if the information processing device which received the list is included in the list.

Specifically, in a database system 12 in accordance with the present embodiment, tips T include the transfer list, and when a tip T is changed, the data processing section 24 of each information processing device 13 initializes the transfer list to be included in the list. Thus, for example, when tip $T_{1a}$ is added in the sharing bag $SF_a$, as indicated by [ ] in FIG. 70, the transfer list of the tip $T_{1a}$ includes only the value [31] indicative of the device. Note that, the transfer list is stored as a partial content of the tip T and the tip managing section 31 corresponds to transfer list storing means of the claims.

Figure 71:
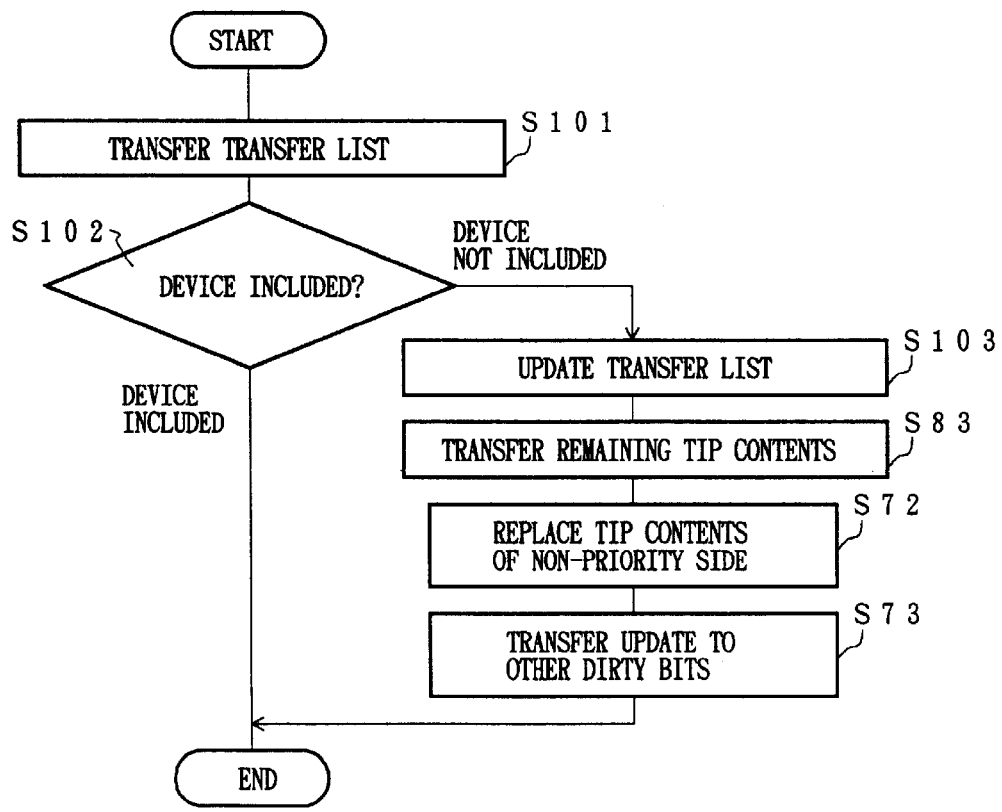
FIG. 71 is a flowchart showing an operation of transfer of update of a dirty bit in the database system.

Then, when sharing bags SF are brought into the synchronous process, the synchronize processing section 51 of the information processing device 13 on the receiving end judges, as shown in FIG. 71, whether the transfer list received in S101 includes a value indicative of the device (S102). When it is included, it means that the modification to the tip T has already been reflected in the tip T and dirty bit D of the device. Thus, even when the dirty bit D is changed in the synchronous process, the dirty bits D which relate to other sharing bags SF are not changed. In particular, when the device is included in the list and when the tip T has not been changed in the device during a non-synchronous period, it means that the tips T are the same between the sending end and the receiving end, and thus transfer of the tip contents can be omitted entirely. On the other hand, when the list does not include a value indicative of the device, the transfer list is updated and a value indicative of the device is updated in the list. Further, as in FIG. 68, in S83, and S72 and S73, all the contents of the tip T are transferred and other dirty bits D which relate to the tip T are changed.

Figure 70:
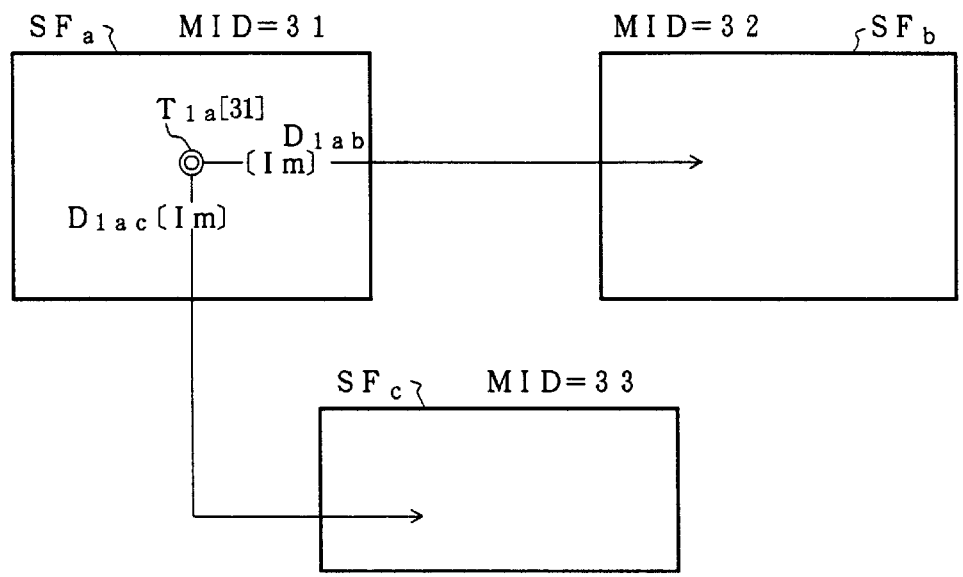
FIG. 70 is an explanatory drawing showing the case where a tip is added in one of the sharing bags of the database system, showing still another embodiment of the present invention.
Figure 72:
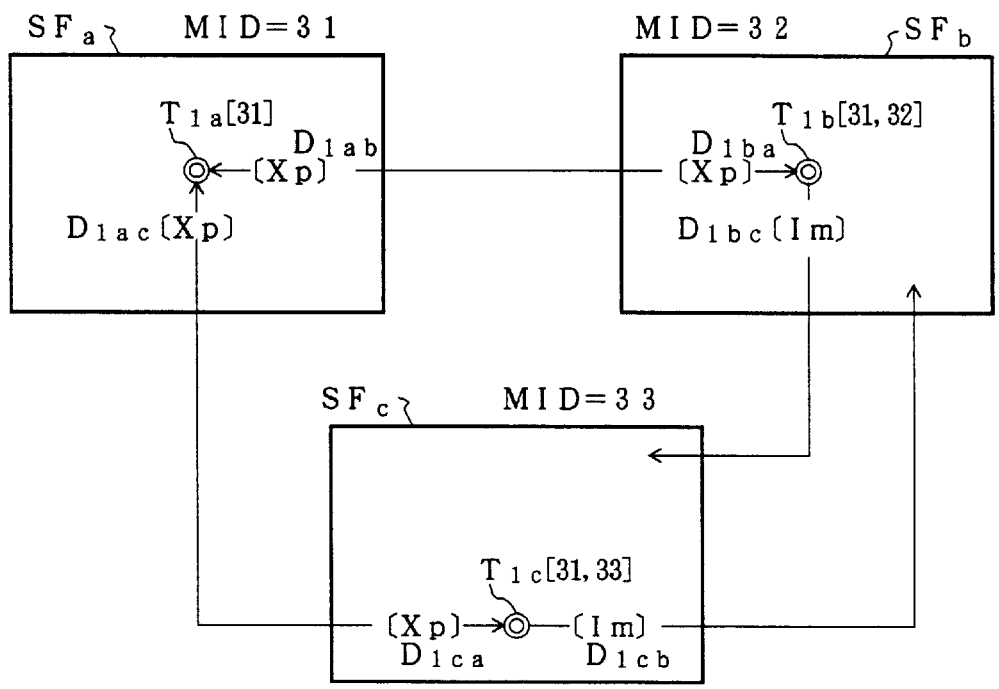
FIG. 72 is an explanatory drawing showing a synchronous process after FIG. 70.
Figure 73:
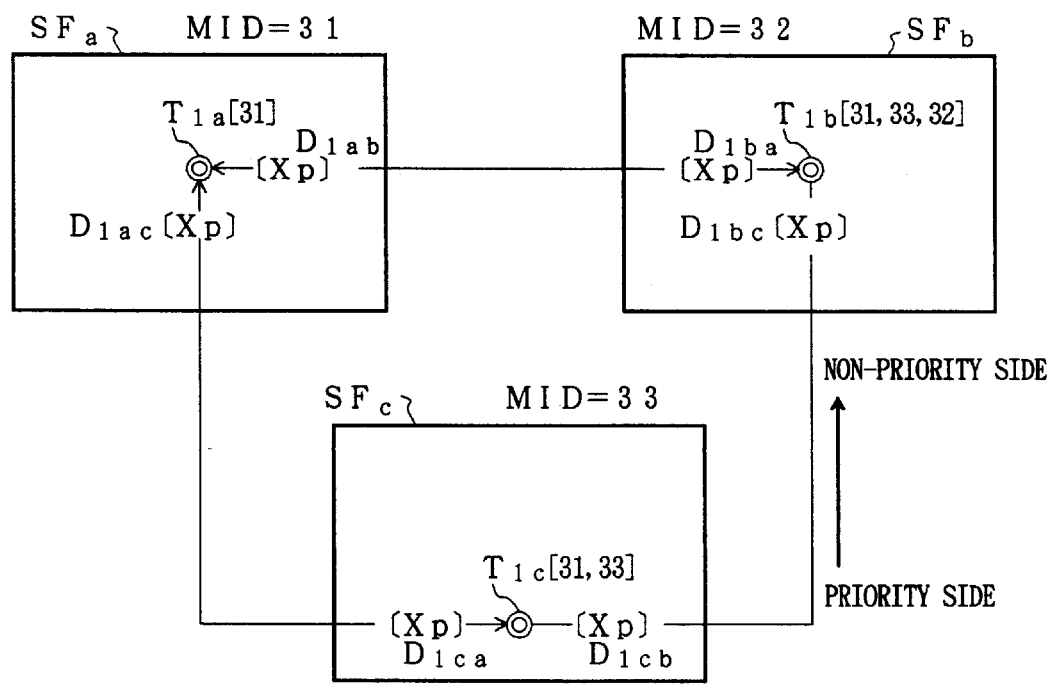
FIG. 73 is an explanatory drawing showing a further synchronous process after FIG. 72.

Thus, when the sharing bags $SF_a$ and $SF_b$ and the sharing bags $SF_a$ and $SF_c$ are brought into the synchronous process in the state as shown in FIG. 70 for example, the transfer list of the tip $T_{1b}$ becomes [31.32] and the transfer list of the tip $T_{1c}$ becomes [31.33] as shown in FIG. 72. Further, when the sharing bags $SF_b$ and $SF_c$ are brought into the synchronous process in this state and a priority is given to the tip $T_{1c}$ over tip $T_{1b}$, the contents of the tip $T_{1c}$ is transferred to the information processing device 13b and the tip $T_{1b}$ is updated to have the same contents as that of the tip $T_{1c}$. In the information processing device 13b of the receiving end, a value [32] indicative of the device is added to the transfer list of the tip $T_{1b}$, and as shown in FIG. 73, the transfer list becomes [31.33.32].

Even when the synchronous process is carried out between the sharing bags $SF_a$ and $SF_b$ in this state, a value [31] indicative of the information processing device 11a is included in the transfer list. Thus, the synchronize processing section 51 of the information processing device 11a does not transfer the change in dirty bit $D_{1ab}$ to the dirty bit $D_{1ac}$, and the dirty bit $D_{1ac}$ is maintained at "Xp", thereby solving the problem of updated information transfer in a looping sharing relationship, as with the Fourth Embodiment.

Further, in the present embodiment, when the value of the device is included in the transfer list received in the synchronous process, transfer of a change in dirty bit D is stopped. Thus, unlike the Fourth Embodiment, transfer of dirty bit D can also be stopped by the party other than the last update party, thereby solving the foregoing problem even when the database system 10 includes an information processing device which cannot stop transfer of dirty bit D.

Note that, in the above description, when updating the tip T, each information processing device 11 initializes the transfer list so as to be included in the list, and the device of the receiving end is included in the list when updating the transfer list. However, not limiting to this, the transfer list may be initialized when updating the tips T and the device of the sending end may be added in the list when updating the transfer list. In either case, the same effect can be obtained if the transfer list received include values indicative of all the information processing devices through which the data transferred after the last update party.

Figure 74:
FIG. 74 is an explanatory drawing showing one example of how tips are modified, showing a modification example of the database system.

Incidentally, in the information processing device 2 (7, 9, and 11; will be represented by 2 hereinafter), when judging whether tips T should be included in sharing bags SF in S53 of FIG. 38, judgment is based on the comparison rule as shown in FIG. 46. However, as another comparison rule, for example, the contents of each tip T may include information of last moved time and when a tip T with more recent last moved time is included in the sharing bag SF, the tips T are placed within the sharing bags SF, and if not, the tips T are placed outside of the sharing bags SF. In such a case, for example, as shown in FIG. 74, when tips $T_{1a}$ and $T_{1b}$ are moved, since the tip $T_{1b}$ has more recent last moved time, the tip $T_{1b}$ is placed outside of the sharing bag $SF_b$ at the time of the next synchronous process. Thus, unlike the case of the comparison rule as shown in FIG. 46, in S53, the tip $T_{1a}$ ($T_{1b}$) is placed outside of the sharing bags $SF_a$ ($SF_b$)

Further, as yet another comparison rule, for example, the contents of each tip T may include information of the number of times it was moved ("moved number" hereinafter), and whether tips T should be placed outside of the sharing bags SF may be decided in accordance with a tip T with a greater moved number. In the example of FIG. 74, tip $T_{1b}$ has the greater moved number and thus it is placed outside of the sharing bag $SF_b$. Thus, tip $T_{1a}$ ($T_{1b}$) is placed outside of the sharing bag $SF_a$ ($SF_b$) in the next synchronous process.

In general, an user of the information processing device 2 tends to modify tips T which he/she considers to be more important, for example, by referring to, updating, or moving such tips T. Also, tips T considered to be less important are modified less often, and thus tips T of currently less importance tend to have a longer duration since they were last moved. Thus, by making judgment based on the moved number or last moved time, it is possible to carry out the inside/outside judgment of a tip T of current interest in accordance with the demand of the user of each information processing device 2. Note that, in the present embodiment, the last moved time or the moved number is stored as a partial content of the tips T, and thus the tip managing section 31 corresponds to moved time storing means and moved number storing means of the claims.

Which comparison rule to use to carry out the inside/outside judgment often depends on the use of the database system 1 (6, 8, and 10; will be represented by 1 hereinafter), or the user. Thus, it is preferable that the synchronize processing section 51 of each information processing device 2 prepares in advance a plurality of comparison rules, and the inside/outside judgment be carried out by one of these comparison rules. However, the synchronous process may not be carried out property when the comparison rules are different between parties in communications. Thus, it is preferable that the comparison rule be decided at the time when the parties are ready to communicate, for example, at the time of the sharing setting. This prevents the information processing devices 2 from changing the comparison rule independently, thus, preventing a synchronous process error caused by disagreement of comparison rules.

The database system 1 having the described arrangement has its use, for example, in a situation where all the address information needed for service persons of a company are managed entirely by the information processing device 2 provided as a server in the company, and the information processing device 2 as a portable information terminal is distributed to each service person. Here, the combination of address information needed for each service person is different and some of the address information are often common to a number of service persons. Thus, by storing all the address information in the database DB and by managing a combination of address information needed for each service person in the form of a bag F, the address information can be managed without losing matching, which is difficult, for example, when address information of each service person is to be stored in a different database DB. Further, since the information processing device 2 only needs to store a single bag F of the information processing device 2, the memory space can be reduced compared with the case where the entire address information is stored.

Note that, in the described embodiments, the explanations are based on the case where the tip T individually indicates an address. Yet, evidently, the data to be indicated by the tips T can be freely set depending on the use of the database. Also, the above explanation is based on the case where the tips T have the same attribute A, and the tips T having the same sharing party are gathered in the sharing bag SF. However, not limiting to this, it is possible, for example, to provide a sharing bag SF per combination of the sharing party and the application. For example, in the case where applications of address book, phone book, and mail address database exist, the tips T used for the address book have attributes which indicate name, phone number, mail address, address, and work place. Also, the tips T used for the phone book have attributes which indicate name and phone number, and the tips T used for the mail address database have attributes which indicate name and mail address. Further, the tips T are gathered in a bag F indicative the application used. For example, the tips T used for the phone book also belong to a bag F indicative of the address book. In such a case, when renewing the entire address book, sharing setting is made with respect to the bag F indicative of the address book, and when changing only the bag F of the phone book, sharing setting is made with respect to the bag F and the synchronous process is carried out. In this manner, by allocating the bag F per application used, the synchronous process can be carried out for each use.

In the described embodiments, the dirty bits D are provided per combination of sharing bags SF between parties. However, as long as the duration of the non-synchronous period is the same, the dirty bit list LD (dirty bits D) can be shared between a plurality of sharing bags SF.

Note that, in the described embodiments, the explanations were given through the case where, for example, each information processing device 2 is provided with the synchronize processing section 51. However, the elements, such as the synchronize processing section 51 and the sharing setting processing section 52, which come into operation only when the information processing devices 2 are in communications need to be provided only in one of the information processing devices 2. Also, for example, the synchronize processing section 51 may be separated into two parts: a part which detects a collision of tips T; and a part which decides the priority side, which are separately provided in the information processing devices 2. As long as these parts are combined at the time when communications are made, the same effect can be obtained.

As described, the database managing device in accordance with the preset invention is a database managing device which includes a synchronize processing section for finding a coincidence of contents of associating data with other database managing devices which are to be brought into communications with the database managing device, and which includes a first database and can update data in the first database in a non-synchronous period between synchronous processes, and the database managing device of the present invention includes: a sharing region associating section for associating a first sharing region making up at least a portion of the first database with a second sharing region for storing second data to be associated with first data in the first sharing region, the second sharing region being at least a portion of a second database which is stored in each of the other database managing devices; and a state information storing section for storing state information indicative of an update state of the first data in the non-synchronous period per each combination of the first sharing region and the second sharing region of one of the other database managing devices, wherein the synchronize processing section carries out a synchronous process between the first sharing region and the second sharing region of one of the other database managing devices one at a time based on the state information associated with the first sharing region and the second sharing region so as to find a coincidence of the two sharing regions, and the synchronize processing section updates the state information relating to the second sharing region and transfers the updated state information to state information associated with other second sharing regions. Note that, the state information is indicative of the first data with regard to at least one of content update, deletion and addition, movement in and out of the first sharing region.

With this arrangement, associating data between three or more database managing devices are placed in their respective sharing regions as determined beforehand by the sharing region associating section. Meanwhile, the state information storing section stores state information of the first data in the first sharing region for each combination of the sharing region (first sharing region) and a sharing region (second sharing region) of a sharing party.

For example, when the database managing device (first database managing device) is brought into communication with one of the other database managing devices (second database managing device) via cable, modem, or infrared ray, the synchronize processing section communicates with only one second database managing device, and carries out a synchronous process to find a coincidence between the first and second sharing regions, and updates state information which relates to the both sharing regions. Thus, even when the first and second database managing devices are connected to each other discontinuously, it is possible to match the data contents between the two database managing devices.

Further, when the state information of the first data is updated, the state information which corresponds to the first data and which relates to the other second sharing region is updated in accordance with the update of the state information of the first data.

With this arrangement, different state information is provided for each second database managing device, and a change in one state information is transferred to the other state information, making it possible to carry out the synchronous process of data among three or more database managing devices even though the synchronous process based on state information is carried out only between two database managing devices. As a result, the synchronous process can be carried out without fail even when the timing of synchronous process is different for each combination of the database managing devices.

Further, by repeating the synchronous process for each different combination, data can be matched for each combination and the state information is transferred subsequently. Thus, unlike the client/server system, it is not required at all to associate all database managing devices with a specific database managing device (server). As a result, when constructing a database system from database managing devices, less restriction of is imposed on the database system with regard to data association.

Further, associating data are placed in the first sharing region, and data are associated with each other in the unit of sharing regions. Also, the synchronous process is carried out based on the state information. Thus, compared with the synchronous process in which associations are made per data or first and second data are exchanged, data volume transferred between the database managing devices in the synchronous process can be reduced.

Further, in addition to the foregoing arrangement, it is preferable that the database managing device includes: a data managing number storing section for storing a data managing number which corresponds to each data contained in the first sharing region; and a data managing number setting section for setting the data managing number, the data managing number setting section setting a data managing number for a combination of a database managing number having a value different from that of any of the other database managing devices and a data number having a different value from that of any other data contained at least in the first sharing region with respect to data newly added in the first sharing region by a process other than the synchronous process, and, with respect to data which was added in the synchronous process, the data managing number setting section setting a data managing number which has already been given to the newly added data in the other database managing device, wherein the synchronize processing section specifies the associating data between the databases based on the data managing number.

With this arrangement, the database managing number is distinct within the database system, and the data number is also distinct within the database managing device, making it possible for the data managing number setting section to set a data managing number which is distinct in the database system regardless of whether it is ready to communicate with the other database managing devices. Further, even when data are transferred subsequently by the synchronous process, the same data managing number is used for the associating data.

Thus, it is ensured that associating data are specified even when the associations of the sharing regions are in the form of a loop. As a result, increase in data which is caused as the data are erroneously specified can be prevented and transferred data volume in the synchronous process can be reduced.

Further, as described, the database managing device in accordance with the present invention is a database managing device which includes a synchronize processing section for finding a coincidence of contents of associating data with other database managing devices which are to be brought into communications with the database managing device, and which includes a first database and can update data in the first database in a non-synchronous period between synchronous processes, and the database managing device of the present invention includes: a sharing region associating section for associating a first sharing region making up at least a portion of the first database with a second sharing region for storing second data to be associated with first data in the first sharing region, the second sharing region being at least a portion of a second database which is stored in each of the other database managing devices; and a data managing number storing section for storing a data managing number which corresponds to the first data. The database managing device further includes: a data managing number setting section for setting the data managing number, the data managing number setting section setting a data managing number for a combination of a database managing number having a value different from that of any of the other database managing devices and a data number having a different value from that of any other data contained at least in the first sharing region with respect to data newly added in the first sharing region by a process other than the synchronous process, and, with respect to data which was added in the synchronous process, the data managing number setting section setting a data managing number which has already been given to the newly added data in the other database managing device; and a state information storing section for storing state information indicative of an update state in a non-synchronous period per each combination of the first sharing region and the second sharing region with respect to the first data contained even once in the first sharing region during the non-synchronous period, wherein the synchronize processing section specifies, based on the data managing number, the first and second data associating with each other so as to find a coincidence in contents of the first and second data referring to the state information.

With this arrangement, the state information indicative of an update state in a non-synchronous period is stored with respect to the first data contained in the first sharing region even once in the non-synchronous period. Thus, even when the first data was moved in and out of the first sharing region during the non-synchronous period, presence or absence of update can be identified by referring to the state information, making it possible to omit transfer of data which was not updated. Further, since the data managing number storing section and data managing number setting section are provided as with the foregoing database managing device, a distinct data managing number can be provided regardless of whether the database managing device is in communication with the other database managing device, and the synchronize processing section can identify any association of data with ease by referring to the data managing number. Further, as with the foregoing database managing device having the sharing region associating section, associating data are placed in the first sharing region and data are associated with each other in the unit of sharing regions, and the synchronous process is carried out based on the state information. As a result, it is possible to reduce transferred data volume between database managing devices in the synchronous process.

Further, in the database managing device having the data number storing section, it is preferable that the data managing number storing section maintains a data managing number of data even after the data is placed outside of the first sharing region, and when the data placed outside of the first sharing region is placed inside the first sharing region while its data managing number is being stored in the data managing number storing section, the data managing number setting section sets the data managing number stored in the data managing number storing section for the data.

With this arrangement, even when data having a data managing number is placed outside of the first sharing region, for example, by data movement or cancellation of sharing relationship, the data managing number storing section stores the data managing number of the data. Then, when the data are later placed again in the first sharing region, for example, by data movement or setting of a new sharing region, the data managing number previously used is used again.

With this arrangement, the synchronize processing section can specify associations of data even when data are placed again in the first sharing region after once being placed outside of the first sharing region. As a result, increase in data which is caused as data are erroneously specified can be prevented and transferred data volume during the synchronous process can be reduced.

Further, the database managing device having the data managing number storing section and which transfers update of state information to the state information which relates to the other second sharing region may have an arrangement in which the synchronize processing section judges whether there is a coincidence in contents of the first data and the second data having the same data managing number, and if coincidence is found, stops transfer of the state information.

With this arrangement, even when associations of the sharing regions are in the form of a loop, as long as the contents of the first and second data are the same, transfer of state information can be stopped. As a result, transfer of unnecessary state information can be prevented, thus reducing transferred data volume during the synchronous process.

Further, the database managing device which transfers update may also include a last update party storing section for storing a last update party of the first data, wherein the synchronize processing section receives a last update party of each data from a sharing party, and when the last update party is the database processing device, stops transfer of the state information of the data.

With this arrangement, when the database managing device is the last update party received from the sharing partner, the state information indicative of update of the second data has already been stored in the state information storing section. Thus, in this case, by stopping transfer of the state information by the synchronize processing section, transfer of unnecessary state information can be prevented, thus reducing transferred data volume during the synchronous process.

Further, transfer of unnecessary state information can be prevented at the time of the synchronous process with the database managing device of the last update party. Thus, unlike the foregoing arrangement in which transfer of the state information is prevented when the first data and second data have the same contents, it is possible to stop transfer of unnecessary state information without judging whether to stop transfer of state information by all the database managing devices within the database system.

Further, the database managing device which transfers update may also include a transfer list storing section for storing a transfer list indicative of the last update party and all database managing devices through which information has been transferred since the last update party when transferring the first data while maintaining its contents, wherein the synchronize processing section receives a transfer list of each data from a sharing party, and when the database managing device is included in the transfer list, stops transfer of the state information of the data.

Note that, when the database managing device is included in the transfer list, the transfer list is initialized so as to include only the database managing device at the time of update, and the database managing device of the receiving end is added to the list at the time of data transfer. On the other hand, when the database managing device is not included in the transfer list, the transfer list is initialized to empty at the time of update, and the database managing device of the sending end is included in the list at the time of data transfer.

With this arrangement, when the database managing device is included in the transfer list received from a sharing party, the state information indicative of update of the second data has already been stored in the state information storing section. Thus, in this case, by stopping transfer of the state information, transfer of unnecessary state information can be prevented as with the case where the last update party is transferred, thus reducing transferred data volume during the synchronous process.

Further, with the described arrangement, it is possible to stop transfer of unnecessary state information at the time of the synchronous process not only with the device of the last update party but a database managing device of the transfer path without judging whether to stop transfer of the state information by all the database managing devices within the database system.

Further, as described, the database managing device in accordance with the present invention is a database managing device which includes a synchronize processing section for finding a coincidence of contents of associating data with other database managing devices which are to be brought into communications with the database managing device, and which includes a first database and can update data in the first database in a non-synchronous period between synchronous processes, and the database managing device of the present invention includes: a sharing region associating section for associating a first sharing region making up at least a portion of the first database with a second sharing region for storing second data to be associated with first data in the first sharing region, the second sharing region being at least a portion of a second database which is stored in each of the other database managing devices, wherein when finding a coincidence between the first sharing region and the second sharing region, the synchronize processing section carries out a synchronous process with the second sharing region of one of the other database managing devices at a different time from a synchronous process with another second sharing region, and carries out the synchronous process with the second sharing region one at a time.

With this arrangement, the first sharing.region is associated with other second sharing regions, and the synchronous process is carried out between two database managing devices. Here, by repeating the synchronous process of each combination, data are matched with each other per each combination, making it possible to carry out the synchronous process without fail even with three or more database managing devices. As a result, as with the database managing device which transfers update of state information, the synchronous process can be carried out without fail even when the timing of the synchronous process is different for each combination of the database managing devices, and it is possible to construct a database system on which less restriction is imposed with respect to associations of data.

Further, as described, the database managing device in accordance with the present invention is a database managing device which includes a synchronize processing section for finding a coincidence of contents of associating data with another database managing device which is to be brought into communications with the database managing device, and which includes a database and can update data in the database in a non-synchronous period between synchronous processes, and the database managing device of the present invention includes: a sub-set setting section for setting, as a portion of the database, a first sub-set which stores data associated with data of the another database managing device; and a sub-set associating section for associating the first sub-set with a second sub-set of the another database managing device, which stores data to be associated with the data in the first sub-set; and a moved time storing section for storing last moved time with respect to data which was moved in and out of the first sub-set, wherein a first synchronize processing section as the synchronize processing section decides whether to place other associating data in their respective sub-sets in accordance with more recent last updated time when finding a coincidence between the first sub-set and the second sub-set.

With this arrangement, associating data are placed in the first sub-set, and data are associated with each other in a unit of sub-sets. Further, when associating data are moved in and out of each sub-set, the data are placed either inside or outside of each sub-set. Thus, even when the synchronous process is carried out after data are moved in and out of the sub-set, increase in number of data can be reduced compared with the case where data are placed both inside and outside of the sub-set, thus reducing transferred data volume during the synchronous process.

Further, in general, data which the user of the database managing device does not regard to be important is not modified, and thus the elapsed time since the last moved time tends to be long. Therefore, by making the decision based on more recent last moved time, inside/outside judgment of the sub-set can be made in accordance with data of associating data which the user regards to be more important, thus allowing a synchronous process which is in more conformity with the user's demand.

Also, as described, the database managing device in accordance with the present invention includes a moved number storing section, instead of the moved time storing section, for storing the number of times data was moved in and out of the first sub-set in a non-synchronous period, and a second synchronize processing section, provided as a synchronize processing, section in replacement of the first synchronize processing section, which decides whether to place other associating data in their respective sub-sets in accordance with data with the greatest moved number when finding a coincidence between the first sub-set and the second sub-set.

Here, in general, data which the user of the database managing device regards to be less important is not modified, and the number of times that data is moved tends to be less. Thus, by making inside/outside judgment of the sub-set based on the number of times data was moved, as with the case where the moved time is stored, it is possible to reduce transferred data volume during the synchronous process, thus realizing a synchronous process which is in more conformity with the demand of the user.

Note that, the way to make inside/outside judgment of the sub-set, by focusing more on the number of moved times or last moved time depends on the use of the database system or the user, and it is preferable that the synchronize processing section carries out the synchronous process by selecting one of several methods available for making judgment.

Further, as described, the database managing device in accordance with the present invention is a database managing device which includes a synchronize processing section for finding a coincidence of contents of associating data with another database managing device which is to be brought into communications with the database managing device, and which includes a first database and can update data in the first database in a non-synchronous period between synchronous processes, and the database managing device includes: a sharing region associating section for associating a first sharing region making up at least a portion of the first-database with a second sharing region for storing second data to be associated with first data in the first sharing region, the second sharing region being at least a portion of a second database which is stored in each of the another database managing device; and a state information storing section for storing state information indicative of an update state of the first data in the non-synchronous period per each combination of the first sharing region and the second sharing region of the another database managing device, wherein when carrying out the synchronous process to find a coincidence between the first and second sharing regions, the synchronize processing section confirms presence or absence of any update by sending and receiving the state information, and when update is made in a plurality of sharing regions, judges whether the data are the same, for example, based on a partial content of data, last update time, last update party, or update ID for which a different value is set in each update, and decides whether to replace remaining of the associating data with data contents of which party.

With this arrangement, when data are updated in a plurality of sharing regions, after judging whether the data are the same, priority data is selected out from the associating data and remaining data (non-priority data) is replaced with the contents of the priority data. Thus, compared with the case where data are all added as separate data to each database, increase in number of data can be prevented and transferred data volume during the synchronous process can be reduced. Further, because judgment of priority side is not conducted when coincidence of data is found, processed data volume in the synchronous process can be reduced.

Here, even though the synchronize processing section can employ various methods of finding a coincidence of data, the synchronize processing section may make a judgment of finding a coincidence of data based on additional information which makes up a portion of each data.

With this arrangement, matching of data is judged based on additional information having a small data volume with respect to the entire data volume of the data contents, for example, such as last update time, last update party, or update ID for which a different value is given in each update, thereby reducing processed data volume during the synchronous process.

Further, as another judging method, the database managing device may include an update party storing section for storing, as the additional information, last update party of the first data, wherein the synchronize processing section judges that the first data and the second data are the same when the last update party of the second data received from a sharing party is the database managing device and when the first data has not been updated.

With this arrangement, it is possible to judge whether data are the same by transferring the last update party and by judging whether the first data has been updated. Also, in many cases, the data indicative of the last update party has a data volume which is considerably smaller than that of data contents, making it possible to make a matching judgment without transferring a large volume of data.

Further, as yet another judging method, the database managing device may further include a transfer list storing section for storing, as the additional information, a transfer list indicative of a last update party and all database managing devices through which information has been transferred since the last update party when transferring the first data while maintaining its contents, wherein the synchronize processing section judges that the first data and the second data are the same when the transfer list of the second data received from a sharing party includes the database managing device and when the first data has not been updated.

With this arrangement, it is possible to judge whether data are the same by transferring the transfer list and by judging whether the first data has been updated. Also, in many cases, the transfer list has a data volume which is considerably smaller than that of data contents, making it possible to make a matching judgment without transferring a large volume of data.

Further, as still another judging method, the database managing device may include an updated identification information storing section for storing, as the additional information, updated identification information which is set to have a different value in each update with respect to the first data, wherein the synchronize processing section judges that the first data and the second data are the same when the updated identification information is the same.

With this arrangement, matching of data is judged based on additional information having a small data volume with respect to the entire data volume of the data contents, thus reducing processed data volume during the synchronous process.

Further, yet another judging method, the database managing device may include a last updated time storing section for storing, as the additional information, last updated time with respect to the first data, wherein the synchronize processing section judges that the first data and the second data are the same when the last updated time is the same.

With this arrangement, matching of data is judged based on additional information having a small data volume with respect to the entire data volume of the data contents, thus reducing processed data volume during the synchronous process.

Note that, the described database managing devices may be realized as hardware, or by execution of a computer program which performs the same operation.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A database managing device which includes synchronous process means for finding a coincidence of contents of associating data with other database managing devices which are to be brought into communications with said database managing device, and which includes a first database and can update data in the first database in a non-synchronous period between synchronous processes, said database managing device comprising:
   sharing region associating means for associating a first sharing region making up at least a portion of the first database with a second sharing region for storing second data to be associated with first data in the first sharing region, the second sharing region being at least a portion of a second database which is stored in each of the other database managing devices; and
   state information storing means for storing state information indicative of an update state of the first data in the non-synchronous period per each combination of the first sharing region and the second sharing region of one of the other database managing devices,
   wherein said database managing device communicates and carries out a synchronous process with the other database managing devices with no central server being provided therebetween, and the synchronous process means carries out the synchronous process between the first sharing region and the second sharing region of one of the other database managing devices one at a time based on the state information associated with the first sharing region and the second sharing region so as to find a coincidence of the two sharing regions, and the synchronous process means updates the state information relating to the second sharing region and transfers the updated state information to state information associated with other second sharing regions.

2. The database managing device as set forth in claim 1, comprising:
   data managing number storing means for storing a data managing number which corresponds to each data contained in the first sharing region; and
   data managing number setting means for setting the data managing number, said data managing number setting means setting a data managing number for a combination of a database managing number having a value different from that of any of the other database managing devices and a data number having a different value from that of any other data contained at least in the first sharing region with respect to data newly added in the first sharing region by a process other than the synchronous process, and, with respect to data which was added in the synchronous process, said data managing number setting means setting a data managing number which has already been given to the newly added data in the other database managing device,
   wherein said synchronous process means specifies the associating data between the databases based on the data managing number.

3. The data managing device as set forth in claim 2, wherein:
   said data managing number storing means maintains a data managing number of data even after the data is placed outside of the first sharing region, and
   when the data placed outside of the first sharing region is placed inside the first sharing region while its data managing number is being stored in the data managing number storing means, said data managing number setting means sets the data managing number stored in the data managing number storing means for the data.

4. The database managing device as set forth in claim 2, wherein:
   said synchronous process means judges whether there is a coincidence in contents of the first data and the second data having the same data managing number, and if coincidence is found, stops transfer of the state information.

5. The database managing device as set forth in claim 2, further comprising:
   last update party storing means for storing a last update party of the first data,
   wherein said synchronous process means receives a last update party of each data from a sharing party, and when the last update party is said database processing device, stops transfer of the state information of the data.

6. The database managing device as set forth in claim 2, further comprising:
   transfer list storing means for storing a transfer list indicative of a last update party and all database managing devices through which information has been transferred since the last update party when transferring the first data while maintaining its contents,
   wherein said synchronous process means receives a transfer list of each data from a sharing party, and when said database managing device is included in the transfer list, stops transfer of the state information of the data.

7. The database managing device of claim 1, wherein when carrying out the synchronous process to find a coincidence between the first and second sharing regions, said synchronous process means confirms presence or absence of any update by sending and receiving the state information, and when update is made in a plurality of sharing regions, judges whether the data are the same and decides whether to replace remaining of the associating data with data contents of which party.

8. The database managing device as set forth in claim 7, wherein said synchronous process means judges whether the data are the same based on additional information making up a portion of each data.

9. The database managing device as set forth in claim 8, further comprising:

update party storing means for storing, as the additional information, last update party of the first data, wherein said synchronous process means judges that the first data and the second data are the same when the last update party of the second data received from a sharing party is said database managing device and when the first data has not been updated.

10. The database managing device as set forth in claim 8, further comprising:

transfer list storing means for storing, as the additional information, a transfer list indicative of a last update party and all database managing devices through which information has been transferred since the last update party when transferring the first data while maintaining its contents, wherein said synchronous process means judges that the first data and the second data are the same when the transfer list of the second data received from a sharing party includes said database managing device and when the first data has not been updated.

11. The database managing device as set forth in claim 8, further comprising:

updated identification information storing means for storing, as the additional information, updated identification information which is set to have a different value in each update with respect to the first data, wherein said synchronous process means judges that the first data and the second data are the same when the updated identification information is the same.

12. The database managing device as set forth in claim 8, further comprising:

last updated time storing means for storing, as the additional information, last updated time with respect to the first data, wherein said synchronous process means judges that the first data and the second data are the same when the last updated time is the same.

13. The device of claim 1, further comprising update means for monitoring operations on the first data so as to update, in the non-synchronous period, the state information of the first data among the state information stored in the state information storing means.

14. A database managing device which includes synchronous process means for finding a coincidence of contents of associating data with other database managing devices which are to be brought into communications with said database managing device, and which includes a first database and can update data in the first database in a non-synchronous period between synchronous processes, said database managing device comprising:

sharing region associating means for associating a first sharing region making up at least a portion of the first database with a second sharing region for storing second data to be associated with first data in the first sharing region, the second sharing region being at least a portion of a second database which is stored in each of the other database managing devices;

data managing number storing means for storing a data managing number which corresponds to the first data;

data managing number setting means for setting the data managing number, said data managing number setting means setting a data managing number for a combination of a database managing number having a value different from that of any of the other database managing devices and a data number having a different value from that of any other data contained at least in the first sharing region with respect to data newly added in the first sharing region by a process other than the synchronous process, and, with respect to data which was added in the synchronous process, said data managing number setting means setting a data managing number which has already been given to the newly added data in the other database managing device;

state information storing means for storing state information indicative of an update state in a non-synchronous period per each combination of the first sharing region and the second sharing region with respect to the first data contained even once in the first sharing region during the non-synchronous period, wherein said synchronous process means specifies, based on the data managing number, the first and second data associating with each other so as to find a coincidence in contents of the first and second data referring to the state information, wherein said data managing number storing means maintains a data managing number of data even after the data is placed outside of the first sharing region, and when the data placed outside of the first sharing region is placed inside the first sharing region while its data managing number is being stored in the data managing number storing means, said data managing number setting means sets the data managing number stored in the data managing number storing means for the data.

15. The device of claim 14, further comprising update means for monitoring operations on the data whose data managing number is stored in the data managing number storing means so as to update, in the non-synchronous period, state information of the data among the state information stored in the state information storing means.

16. A recording medium recording a database managing program which can update data within its first database in a non-synchronous period between synchronous processes, and which finds a coincidence of contents of associating data with other database managing devices which are to be brought into communications with said database managing program, said recording medium recording a program for operating a computer, the program being recorded in the form of:

sharing region associating means for associating a first sharing region making up at least a portion of the first database with a second sharing region for storing second data to be associated with first data in the first sharing region, the second sharing region being at least a portion of a second database which is stored in each of the other database managing devices;

data managing number storing means for storing a data managing number which corresponds to the first data; and data managing number setting means for setting the data managing number, said data managing number setting means setting a data managing number for a combination of a database managing number having a value different from that of any of the other database managing devices and a data number having a different value from that of any other data contained at least in the first sharing region with respect to data newly added in the first sharing region by a process other than the synchronous process, and, with respect to data which was added in the synchronous process, said data managing number setting means setting a data managing number which has already been given to the newly added data in the other database managing device; and state information storing means for storing state information indicative of an update state in a non-synchronous period per each combination of the first and second sharing regions with respect to the first data contained even once in the first sharing region during the non-synchronous period, wherein the program for operating a computer includes a program of synchronous process means which specifies, based on the data managing number, the first and second data associating with each other so as to find a coincidence in contents of the first and second data referring to the state information, wherein said data managing number storing means maintains a data managing number of data even after the data is placed outside of the first sharing region, and when the data placed outside of the first sharing region is placed inside the first sharing region while its data managing number is being stored in the data managing number storing means, said data managing number setting means sets the data managing number stored in the data managing number storing means for the data.

17. A recording medium recording a database managing program which can update data within its first database in a non-synchronous period between synchronous processes, and which finds a coincidence of contents of associating data with other database managing devices which are to be brought into communications with said database managing program, said recording medium recording a program for operating a computer, the program being recorded in the form of:

synchronous process means for finding a coincidence of contents of associating data with the other database managing devices which are to be brought into communications with said database managing program; and sharing region associating means for associating a first sharing region making up at least a portion of the first database with a second sharing region for storing second data to be associated with first data in the first sharing region, the second sharing region being at least a portion of a second database which is stored in each of the other database managing devices, wherein the program for operating a computer includes a program of synchronous process means which carries out a synchronous process with the second sharing region of one of the other database managing devices at a different time from a synchronous process with another second sharing region when finding a coincidence between the first sharing region and the second sharing region, and carries out the synchronous process with the second sharing region one at a time, so that said program enables a database managing device using the program to communicate and carry out the synchronous process with the other database managing devices with no central server being provided therebetween.

18. A database managing device which includes synchronous process means for finding a coincidence of contents of associating data with another database managing device which is to be brought into communications with said database managing device, and which includes a database and can update data in the database in a non-synchronous period between synchronous processes, said database managing device comprising:

sub-set setting means for setting, as a portion of the database, a first sub-set which stores data associated with data of the another database managing device;

sub-set associating means for associating the first sub-set with a second sub-set of the another database managing device, which stores data to be associated with the data in the first sub-set;

moved time storing means for storing last moved time with respect to data which was moved in and out of the first sub-set, and wherein first synchronous process means as the synchronous process means decides whether to place other associating data in their respective sub-sets in accordance with more recent last updated time when finding a coincidence between the first sub-set and the second sub-set.

19. The device of claim 18, further comprising update means for monitoring operations on data whose data managing number is stored in data managing number storing means so as to update, in the non-synchronous period, state information of the data among state information stored in the state information storing means.

20. A recording medium recording a database managing program which can update data within its first database in a non-synchronous period between synchronous processes and which finds a coincidence of contents of associating data with another database managing device which is to be brought into communications with said database managing program, said recording medium recording a program for operating a computer, the program being recorded in the form of:

synchronous process means for finding a coincidence of contents of associating data with the another database managing device which is to be brought into communications with said database managing program;

sub-set setting means for setting, as a portion of the first database, a first sub-set which stores data associated with data of the another database managing device;

sub-set associating means for associating the first sub-set with a second sub-set of the another database managing device which stores data to be associated with the data in the first sub-set; and moved time storing means for storing last moved time with respect to data which was moved in and out of the first sub-set, wherein the program for operating a computer includes a program of first synchronous process means as the synchronous process means which decides whether to place other associating data in their respective sub-sets in accordance with more recent last updated time when finding a coincidence between the first sub-set and the second sub-set.

21. A database managing device which includes synchronous process means for finding a coincidence of contents of associating data with another database managing device which is to be brought into communications with said database managing device, and which includes a database and can update data in the database in a non-synchronous period between synchronous processes, said database managing device comprising:

sub-set setting means for setting, as a portion of the database, a first sub-set which stores data associated with data of the another database managing device; and sub-set associating means for associating the first sub-set with a second sub-set of the another database managing device, which stores data to be associated with the data in the first sub-set; and moved number storing means for storing the number of times data was moved in and out of the first sub-set in the non-synchronous period, wherein second synchronous process means as the synchronous process means decides whether to place other associating data in their respective sub-sets in accordance with data with the greatest moved number when finding a coincidence between the first sub-set and the second sub-set.

22. The device of claim 21, further comprising update means for monitoring operations on data whose data managing number is stored in data managing number storing means so as to update, in the non-synchronous period, state information of the data among state information stored in the state information storing means.

23. A recording medium recording a database managing program which can update data within its first database in a non-synchronous period between synchronous processes, and which finds a coincidence of contents of associating data with another database managing device which is to be brought into communications with said database managing program, said recording medium recording a program for operating a computer, the program being recorded in the form of:

synchronous process means for finding a coincidence of contents of associating data with the another database managing device which is to be brought into communications with said database managing program;

sub-set setting means for setting, as a portion of the database, a first sub-set which stores data associated with data of the another database managing device;

sub-set associating means for associating the first sub-set with a second sub-set of the another database managing device, which stores data to be associated with the data in the first sub-set; and moved number storing means for storing the number of times data was moved in and out of the first sub-set in the non-synchronous period, wherein the program for operating a computer includes a program of second synchronous process means as the synchronous process means which decides whether to place other associating data in their respective sub-sets in accordance with data with the greatest moved number when finding a coincidence between the first sub-set and the second sub-set.

24. A recording medium recording a database managing program which can update data within its first database in a non-synchronous period between synchronous processes, and which finds a coincidence of contents of associating data with another database managing device to be brought into communications with said database managing program, said recording medium recording a program for operating a computer, the program being recorded in the form of:

synchronous process means for finding a coincidence of contents of associating data with the another database managing device which is to be brought into communications with said database managing program;

sharing region associating means for associating a first sharing region making up at least a portion of the first database with a second sharing region for storing second data to be associated with first data in the first sharing region, the second sharing region being at least a portion of a second database which is stored in the another database managing device; and state information storing means for storing state information indicative of an update state of the first data in the non-synchronous period per each combination of the first sharing region and the second sharing region, wherein the program for operating a computer includes a program of the synchronous process means which confirms presence or absence of any update by sending and receiving the state information when carrying out the synchronous process to find a coincidence between the first and second sharing regions, and when update is made in a plurality of sharing regions, judges whether the data are the same and decides whether to replace remaining of the associating data with data contents of which party, transfer list storing means for storing, as the additional information, a transfer list indicative of a last update party and database managing devices through which information has been transferred since the last update party when transferring the first data while maintaining its contents, and wherein said synchronous process means judges that the first data and the second data are the same when the transfer list of the second data received from a sharing party includes said database managing device and when the first data has not been updated.

25. A database system comprising a plurality of database managing devices, each of the database managing devices comprising synchronous process means for finding a coincidence of contents of associating data with other database managing devices which are to be brought into communications with said database managing device, and which includes a first database and can update data in the first database in a non-synchronous period between synchronous processes, said database managing device comprising:

sharing region associating means for associating a first sharing region making up at least a portion of the first database with a second sharing region for storing second data to be associated with first data in the first sharing region, the second sharing region being at least a portion of a second database which is stored in each of the other database managing devices; and state information storing means for storing state information indicative of an update state of the first data in the non-synchronous period per each combination of the first sharing region and the second sharing region of one of the other database managing devices, wherein said database managing device communicates and carries out a synchronous process with the other database managing devices with no central server being provided therebetween, and the synchronous process means carries out the synchronous process between the first sharing region and the second sharing region of one of the other database managing devices one at a time based on the state information associated with the first sharing region and the second sharing region so as to find a coincidence of the two sharing regions, and the synchronous process means updates the state information relating to the second sharing region and transfers the updated state information to state information associated with other second sharing regions.

26. A database managing device comprising synchronous process means for finding a coincidence of contents of associating data with another database managing device which is to be brought into communications with said database managing device, and which includes a first database and can update data in the first database in a non-synchronous period between synchronous processes, said database managing device comprising:
- sharing region associating means for associating a first sharing region making up at least a portion of the first database with a second sharing region for storing second data to be associated with first data in the first sharing region, the second sharing region being at least a portion of a second database which is stored in the another database managing device; and
- state information storing means for storing state information indicative of an update state of the first data in the non-synchronous period per each combination of the first sharing region and the second sharing region of the another database managing device,
- wherein when carrying out the synchronous process to find a coincidence between the first and second sharing regions, said synchronous process means confirms presence or absence of any update by sending and receiving the state information, and when update is made in a plurality of sharing regions, judges whether the data are the same and decides whether to replace remaining of the associating data with data contents of which party,
- wherein said synchronous process means judges whether the data are the same based on additional information making up a portion of each data,
- transfer list storing means for storing, as the additional information, a transfer list indicative of a last update party and all database managing devices through which information has been transferred since the last update party when transferring the first data while maintaining its contents, and
- wherein said synchronous process means judges that the first data and the second data are the same when the transfer list of the second data received from a sharing party includes said database managing devices and when the first data has not been updated.

27. A database managing device comprises synchronous process means for finding a coincidence of contents of associating data with another database managing device which is to be brought into communications with said database managing device, and which includes a first database and can update data in the first database in a non-synchronous period between synchronous process,
said database managing device comprising:
- sharing region associating means for associating a first sharing region making up at least a portion of the first database with a second sharing region for storing second data to be associated with first data in the first sharing region, the second sharing region being at least a portion of a second database which is stored in the another database managing device; and
- state information storing means for storing state information indicative of an update state of the first data in the non-synchronous period per each combination of the first sharing region and the second sharing region of the another database managing device,
- wherein when carrying out the synchronous process to find a coincidence between the first and second sharing regions, said synchronous process means confirms presence or absence of any update by sending and receiving the state information, and when update is made in a plurality of sharing regions, judges whether the data are the same and decides whether to replace remaining of the associating data with data contents of which party,
- wherein said synchronous process means judge whether the data are the same based on additional making up a portion of each data,
- updated identification information storing means for storing, as the additional information, updated identification information which is set to have a different value in each update with respect to the first data, and
- wherein said synchronous process means judges that the first data and the second data are the same when the updated identification information is the same.

28. A database managing device comprising synchronous process means for finding a coincidence of contents of associating data with another database managing device which is to be brought into communications with said database managing device, and which includes a first database and can update data in the first database in a non-synchronous period between synchronous processes,
said database managing device comprising:
- sharing region associating means for associating a first sharing region making up at least a portion of the first database with a second sharing region for storing second data to be associated with first data in the first sharing region, the second sharing region being at least a portion of a second database which is stored in the another database managing device; and
- state information storing means for storing state information indicative of an update state of the first data in the non-synchronous period per each combination of the first sharing region and the second sharing region of the another database managing device,
- wherein when carrying out the synchronous process to find a coincidence between the first and second sharing regions, said synchronous process means confirms presence or absence of any update by sending and receiving the state information, and when update is made in a plurality of sharing regions, judges whether the data are the same and decides whether to replace remaining of the associating data with data contents of which party,
- wherein said synchronous process means judges whether the data are the same based on additional information making up a portion of each data,
- last updated time storing means for storing, as the additional information, last updated time with respect to the first data, and
- wherein said synchronous process means judges that the first data and the second data are the same when the last updated time is the same.

29. A method of operating a database managing device comprising:
- providing a synchronous process for finding a coincidence of contents of associating data with other database managing devices which are to be brought into communications with said database managing device, and wherein the database managing device includes a first database and can update data in the first database in a non-synchronous period between synchronous processes,
- a sharing region associating process for associating a first sharing region making up at least a portion of the first database with a second sharing region for storing second data to be associated with first data in the first sharing region, the second sharing region being at least a portion of a second database which is stored in other database managing devices;
- storing state information indicative of an update state of the first data in the non-synchronous period per a combination of the first sharing region and the second sharing region of one of the other database managing devices, wherein said database managing device communicates and carries out a synchronous process with other database managing devices and the synchronous process means carries out the synchronous process between the first sharing region and the second sharing region of one of the other database managing devices one at a time based on the state information associated with the first sharing region and the second sharing region so as to find a coincidence of the two sharing regions, and the synchronous process updates the state information relating to the second sharing region and transfers the updated state information to state information associated with other second sharing regions.

* * * * *